United States Patent
Umehara

(10) Patent No.: US 12,489,600 B2
(45) Date of Patent: Dec. 2, 2025

(54) COMMUNICATION APPARATUS, X-RAY CT APPARATUS, AND COMMUNICATION METHOD

(71) Applicant: CANON MEDICAL SYSTEMS CORPORATION, Tochigi (JP)

(72) Inventor: Makoto Umehara, Yaita (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 104 days.

(21) Appl. No.: 18/585,216

(22) Filed: Feb. 23, 2024

(65) Prior Publication Data

US 2024/0313941 A1   Sep. 19, 2024

(30) Foreign Application Priority Data

Mar. 17, 2023  (JP) ................. 2023-042720

(51) Int. Cl.
| | |
|---|---|
| *H04L 7/00* | (2006.01) |
| *H03K 5/135* | (2006.01) |
| *H03K 5/22* | (2006.01) |
| *H04L 7/033* | (2006.01) |

(52) U.S. Cl.
CPC ............ *H04L 7/033* (2013.01); *H03K 5/135* (2013.01); *H03K 5/22* (2013.01)

(58) Field of Classification Search
CPC .......... H03K 5/22; H03K 5/135; H04L 7/033
See application file for complete search history.

(56) References Cited

U.S. PATENT DOCUMENTS

| | | | |
|---|---|---|---|
| 6,553,091 B2 * | 4/2003 | Takanashi | A61B 6/035 378/207 |
| 9,804,274 B2 * | 10/2017 | Moskal | A61B 6/032 |
| 12,193,867 B2 * | 1/2025 | Kim | G06T 1/0007 |
| 2015/0305697 A1 * | 10/2015 | Tamura | A61B 6/035 378/5 |

FOREIGN PATENT DOCUMENTS

JP    2022-41842 A    3/2022

* cited by examiner

*Primary Examiner* — Dac V Ha
(74) *Attorney, Agent, or Firm* — Oblon, McClelland, Maier & Neustadt, L.L.P.

(57) ABSTRACT

A communication apparatus according to an embodiment of the present disclosure includes: a ring-shaped transmission path which is disposed in one of a fixed part and a rotating part and includes a plurality of transmission paths each configured to transmit transmission data including a transmission signal and a clock signal; a first coupler disposed in the other of the fixed part and the rotating part and configured to receive the transmission data from one of the plurality of transmission paths; a determining unit configured to determine a regenerated clock signal based on the clock signal in accordance with a reception position in which the first coupler receives the transmission data from the one of the transmission paths; and a data generating unit configured to generate reception data on the basis of the transmission signal received by the first coupler and the regenerated clock signal.

19 Claims, 26 Drawing Sheets

FIG.8A
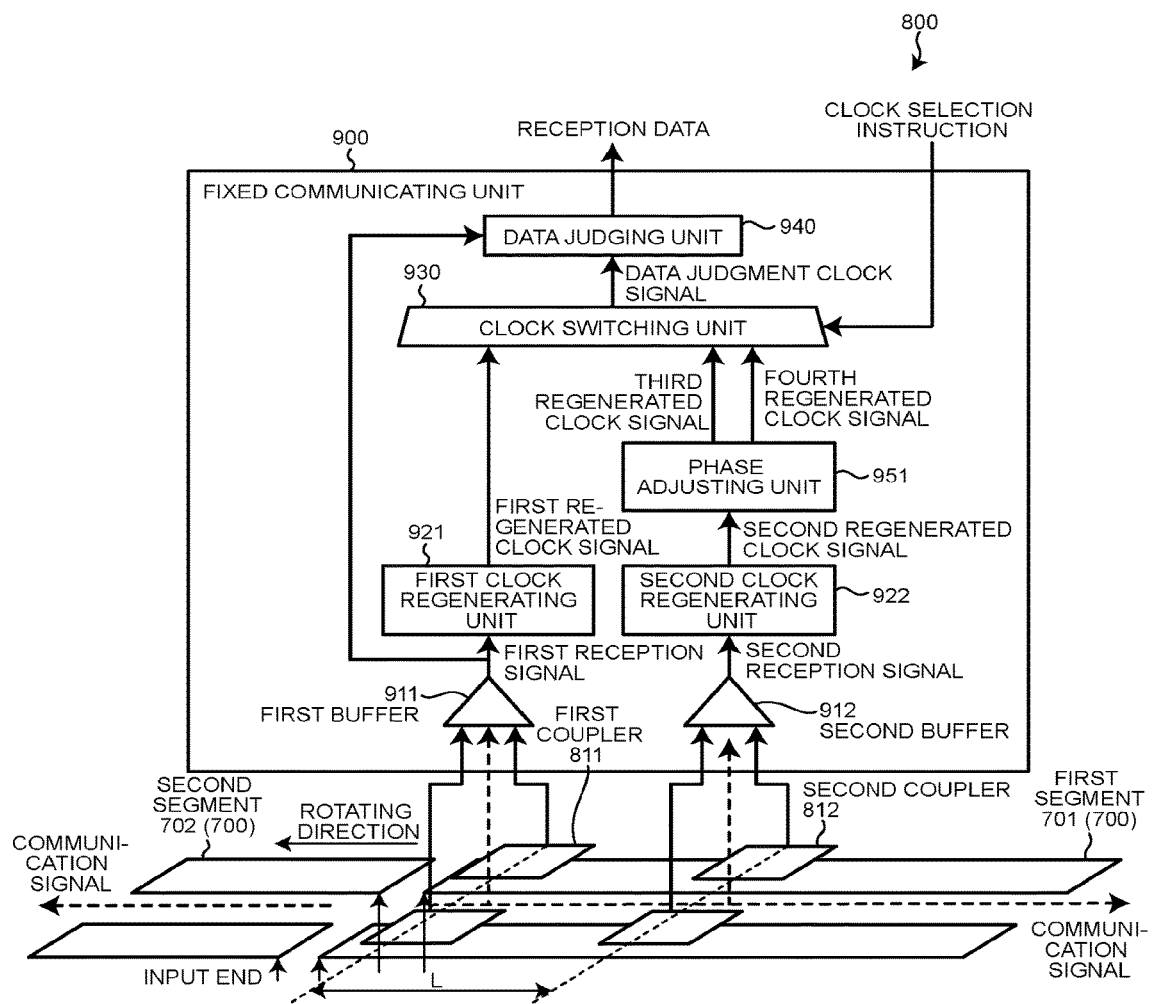
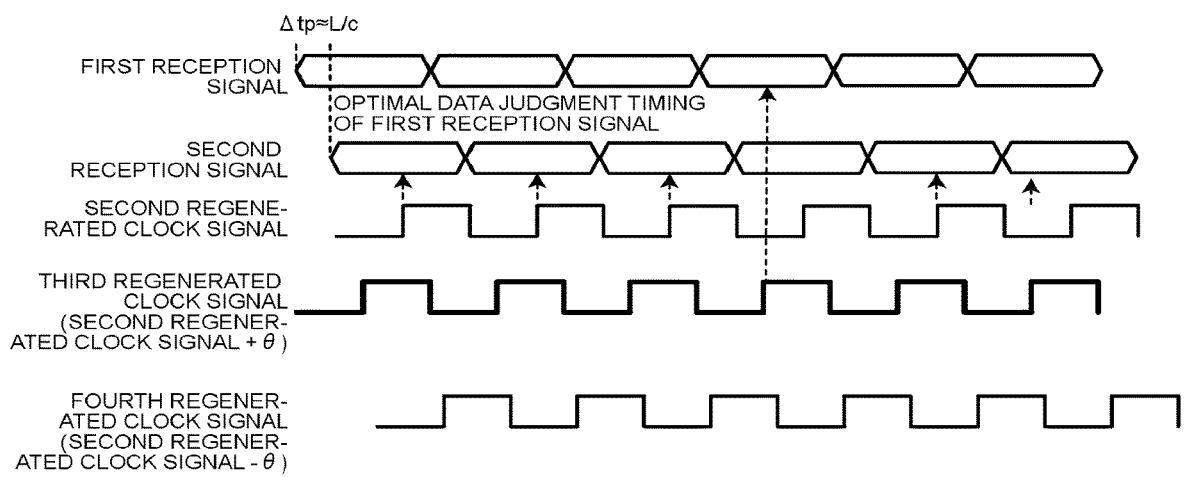

FIG.8B
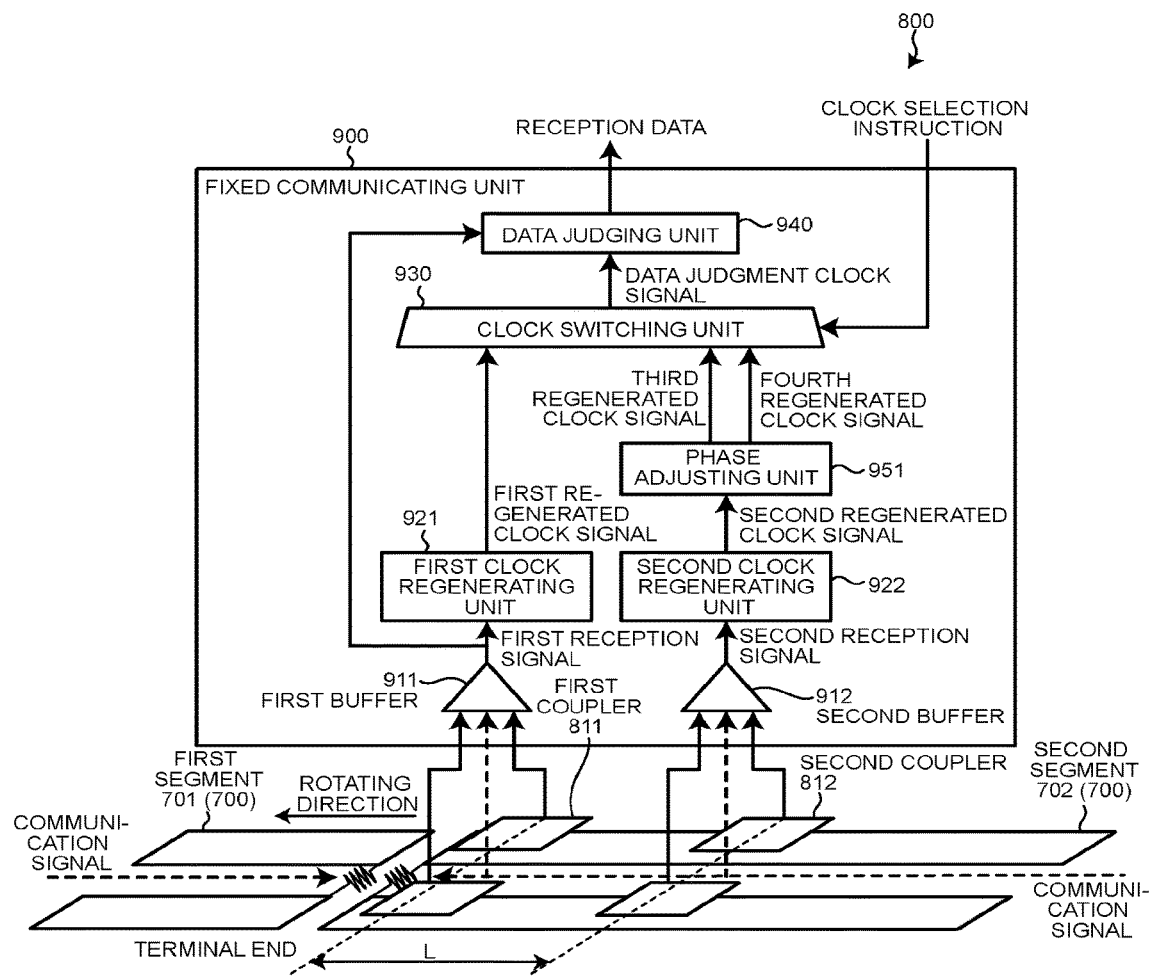
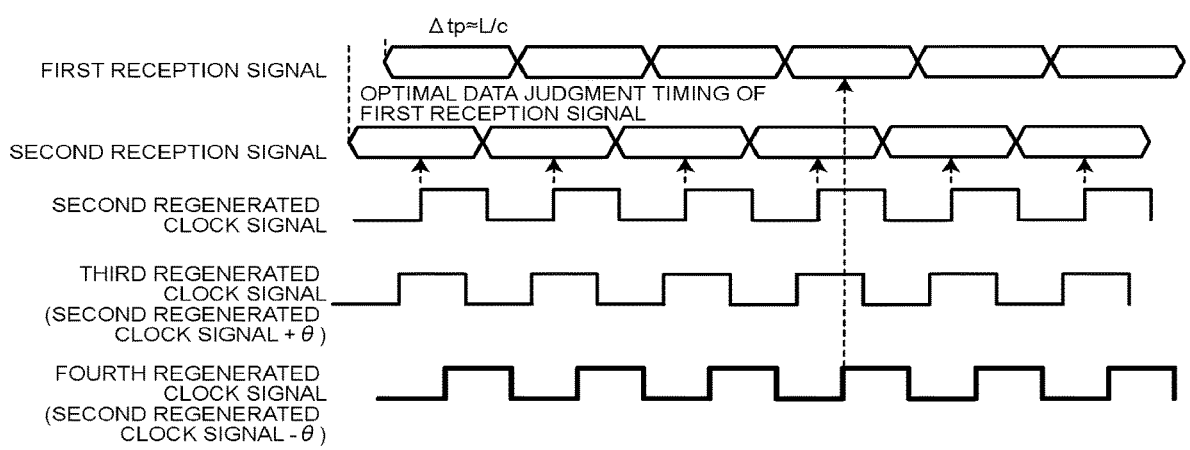

COMMUNICATION APPARATUS, X-RAY CT APPARATUS, AND COMMUNICATION METHOD

CROSS-REFERENCE TO RELATED APPLICATIONS

This application is based upon and claims the benefit of priority from Japanese Patent Application No. 2023-042720, filed on Mar. 17, 2023; the entire contents of which are incorporated herein by reference.

FIELD

Embodiments described herein relate generally to a communication apparatus, an X-ray Computed Tomography (CT) apparatus, and a communication method.

BACKGROUND

Conventionally, as a technique for reducing impacts of a Doppler shift that may occur in wireless communication in a rotating part, a wireless system is known in which a plurality of reception antennas are provided so that one of the reception antennas having the smallest doppler shift amount is selected on the basis of a rotation angle. This wireless system is effective for a system in which wireless communication based on a radiated electromagnetic field is performed while wireless signals having mutually-different Doppler shift amounts are received in accordance with the positions of reception antennas.

In such a system in which wireless communication based on a radiated electromagnetic field is performed, the Doppler shift amount varies in accordance with the positions of the reception antennas. Thus, this system is effective with the abovementioned wireless system. However, in a wireless system in which wireless communication based on an electromagnetic near field is performed by using a ring-shaped transmission path, because the absolute value of the Doppler shift amount is constant regardless of the positions of the reception antennas, there is a possibility that the abovementioned wireless system may be unable to reduce the impacts of the Doppler shift.

BRIEF DESCRIPTION OF THE DRAWINGS

FIG. 8A is a chart for explaining an operation of the communication apparatus according to the third embodiment;

FIG. 8B is another chart for explaining the operation of the communication apparatus according to the third embodiment;

DETAILED DESCRIPTION

A communication apparatus according to an embodiment of the present disclosure includes a ring-shaped transmission path, a first coupler, a determining unit, and a data generating unit. The ring-shaped transmission path is disposed in one of a fixed part and a rotating part and includes a plurality of transmission paths each configured to transmit transmission data including a transmission signal and a clock signal.

The first coupler is disposed in the other of the fixed part and the rotating part and configured to receive the transmission data from one of the plurality of transmission paths. The determining unit is configured to determine a regenerated clock signal based on the clock signal in accordance with a reception position in which the first coupler receives the transmission data from the one of the transmission paths. The data generating unit is configured to generate reception data on the basis of the transmission signal received by the first coupler and the regenerated clock signal.

In the following sections, exemplary embodiments of a communication apparatus and an X-ray Computed Tomography (CT) apparatus will be explained in detail, with reference to the accompanying drawings. Possible embodiments are not limited to the embodiments described below. Further, the description of each of the embodiment is, in principle, similarly applicable to any other embodiment.

A communication system configured with communication apparatuses according to at least one aspect of the embodiments of the present disclosure is applicable to an X-ray Computed Tomography (CT) apparatus, for example.

First Embodiment

Figure 1:
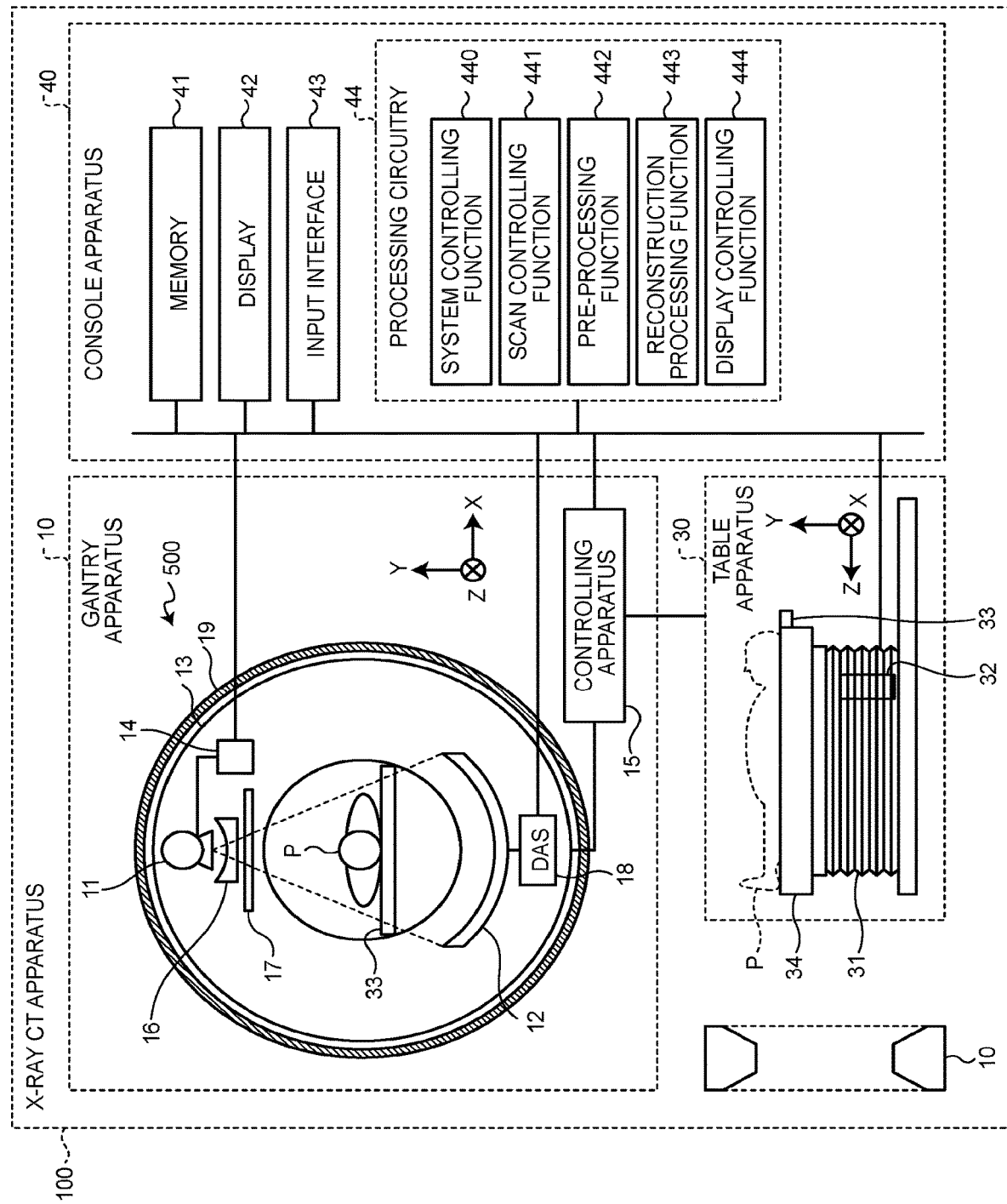
FIG. 1 is a diagram illustrating an exemplary configuration of an X-ray CT apparatus to which a communication system configured with communication apparatuses according to an embodiment of the present disclosure is applied.

FIG. 1 is a diagram illustrating an exemplary configuration of an X-ray CT apparatus 100 to which a communication system configured with communication apparatuses according to an embodiment of the present disclosure is applied. The X-ray CT apparatus 100 is configured to acquire CT image data of an examined subject (hereinafter, a "patient"). More specifically, the X-ray CT apparatus 100 is configured to cause an X-ray tube and an X-ray detector to make a turning movement while the patient is substantially at the center and to acquire projection data by detecting X-rays that have passed through the patient. Further, the X-ray CT apparatus 100 is configured to generate the CT image data on the basis of the acquired projection data. As illustrated in FIG. 1, the X-ray CT apparatus 100 includes a gantry apparatus 10, a table apparatus 30, and a console apparatus 40.

In the present embodiment, a rotation axis of a rotating frame 13 in a non-tilt state or the longitudinal direction of a tabletop 33 of the table apparatus 30 is defined as a Z-axis direction. Further, the axial direction orthogonal to the Z-axis direction and extending parallel to a floor surface is defined as an X-axis direction. The axial direction orthogonal to the Z-axis direction and extending perpendicularly to the floor surface is defined as a Y-axis direction. Although FIG. 1 depicts the gantry apparatus 10 from multiple directions for the sake of convenience in the explanation, the X-ray CT apparatus 100 includes the single gantry apparatus 10.

The gantry apparatus 10 includes an X-ray tube 11, an X-ray detector 12, the rotating frame 13, an X-ray high-voltage apparatus 14, a controlling apparatus 15, a wedge 16, a collimator 17, a Data Acquisition System (DAS) 18, and a fixed frame 19.

The X-ray tube 11 is a vacuum tube having a negative pole (a filament) configured to generate thermo electrons and a positive pole (a target or an anode) configured to generate X-rays in response to collision of thermo electrons thereon. The X-ray tube 11 is configured to generate X-rays to be radiated onto the patient P, by causing the thermo electrons to be emitted from the negative pole toward the positive pole, with application of high voltage from the X-ray high-voltage apparatus 14. For instance, examples of the X-ray tube 11 include a rotating anode X-ray tube configured to generate the X-rays by having the thermo electrons emitted onto a rotating anode.

The wedge 16 is a filter for adjusting the amount of the X-rays emitted from the X-ray tube 11. More specifically, the wedge 16 is a filter configured to pass and attenuate the X-rays emitted from the X-ray tube 11 so that the X-rays emitted from the X-ray tube 11 onto the patient P has a predetermined distribution. For example, the wedge 16 may be a wedge filter or a bow-tie filter and is a filter obtained by processing aluminum or the like so as to have a predetermined target angle and a predetermined thickness.

The collimator 17 is configured with lead plates or the like for narrowing down a radiation range of the X-rays that have passed through the wedge 16 and is configured to form a slit with a combination of the plurality of lead plates or the like. The collimator 17 may be referred to as an X-ray limiter. Further, although FIG. 1 illustrates an example in which the wedge 16 is arranged between the X-ray tube 11 and the collimator 17, the collimator 17 may be arranged between the X-ray tube 11 and the wedge 16. In that situation, the wedge 16 is configured to pass and attenuate the X-rays which were emitted from the X-ray tube 11 and of which the radiation range has been restricted by the collimator 17.

The X-ray detector 12 includes a plurality of detecting elements configured to detect X-rays. Each of the detecting elements included in the X-ray detector 12 is configured to detect the X-rays that were emitted from the X-ray tube 11 and have passed through the patient P and is configured to output a signal corresponding to a detected X-ray amount to the DAS 18. The X-ray detector 12 includes, for example, a plurality of arrays of detecting elements in each of which a plurality of detecting elements are arranged in a channel direction along an arc centered on a focal point of the X-ray tube 11. The X-ray detector 12 has a structure in which the plurality of arrays of detecting elements are arranged in a row direction (a slice direction), while each array has the plurality of detecting elements arranged in the channel direction.

For example, the X-ray detector 12 is an indirect conversion-type detector including a grid, a scintillator array, and an optical sensor array. The scintillator array includes a plurality of scintillators. Each of the scintillators includes a scintillator crystal that outputs light in a photon quantity corresponding to the amount of X-rays that have become incident thereto. The grid is arranged on a surface of the scintillator array positioned on the X-ray incident side and includes an X-ray blocking board that absorbs scattered X-rays. The grid may be referred to as a collimator (a one-dimensional collimator or a two-dimensional collimator). The optical sensor array has a function of converting the amounts of light from the scintillators into corresponding electrical signals and includes optical sensors such as photodiodes, for example. Alternatively, the X-ray detector 12 may be a direct conversion-type detector including semiconductor elements configured to convert incident X-rays into electrical signals.

The X-ray high-voltage apparatus 14 includes: a high-voltage generating apparatus including electrical circuitry such as a transformer and a rectifier or the like and configured to generate the high voltage to be applied to the X-ray tube 11; and an X-ray controlling apparatus configured to control output voltage corresponding to the X-rays to be generated by the X-ray tube 11. The high-voltage generating apparatus may be of a transformer type or an inverter type. Further, the X-ray high-voltage apparatus 14 may be provided for the rotating frame 13 or may be provided for the fixed frame 19. In the present example, the fixed frame 19 is a frame configured to rotatably support the rotating frame 13 and has a rotating mechanism for causing the rotating frame 13 to rotate. The rotating frame 13 and the fixed frame 19 are examples of the "rotating part" and the "fixed part", respectively.

The DAS 18 is configured to acquire a signal of the X-rays detected by the detecting elements included in the X-ray detector 12. For example, while including an amplifier configured to perform an amplifying process on the electrical signals output from the detecting elements and an Analog/Digital (A/D) converter configured to convert the electrical signals into digital signals, the DAS 18 is configured to generate detection data. The DAS 18 is realized by using a processor, for example. The DAS 18 is an example of the "data acquisition apparatus".

The rotating frame 13 is an annular frame configured to support the X-ray tube 11 and the X-ray detector 12 so as to oppose each other and to cause the controlling apparatus 15 to rotate the X-ray tube 11 and the X-ray detector 12. For example, the rotating frame 13 is cast by using aluminum as a material thereof. In addition to the X-ray tube 11 and the X-ray detector 12, the rotating frame 13 may be configured to further support the X-ray high-voltage apparatus 14, the wedge 16, the collimator 17, the DAS 18, and/or the like. In addition, the rotating frame 13 may be configured to further support other various elements that are not illustrated in FIG. 1.

The rotating frame 13 and the fixed frame 19 being a non-rotating part of the gantry apparatus 10 are each provided with a communication apparatus. For example, data (the acquired signal of the X-rays) generated by the DAS 18 is transmitted via wireless communication from the communication apparatus provided for the rotating frame 13 to the communication apparatus provided for the fixed frame 19 and is further transferred to the console apparatus 40. Further, for example, a control signal intended for the rotating frame 13 transmitted by the console apparatus 40 is transmitted via wireless communication from the communication apparatus provided for the fixed frame 19 to the communication apparatus provided for the rotating frame 13. In this situation, the communication apparatus provided for the rotating frame 13 and the communication apparatus provided for the fixed frame 19 structure a communication system 500 (explained later).

The controlling apparatus 15 has processing circuitry including a Central Processing Unit (CPU) or the like and a driving mechanism such as a motor and an actuator or the like. The controlling apparatus 15 is configured to receive an input signal from an input interface 43 and to control operations of the gantry apparatus 10 and the table apparatus 30. For example, the controlling apparatus 15 is configured to control the rotation of the rotating frame 13, tilting of the gantry apparatus 10, operations of the table apparatus 30 and the tabletop 33, and/or the like. In an example, as the control to tilt the gantry apparatus 10, the controlling apparatus 15 is configured to rotate the rotating frame 13 on an axis parallel to the X-axis direction, according to inclination angle (tilt angle) information input thereto. The controlling apparatus 15 may be provided for the gantry apparatus 10 or may be provided for the console apparatus 40.

The table apparatus 30 is an apparatus on which the patient P to be imaged is placed and moved and includes a base 31, a table driving apparatus 32, the tabletop 33, and a supporting frame 34. The base 31 is a casing configured to support the supporting frame 34 so as to be movable in vertical directions. The table driving apparatus 32 is a driving mechanism configured to move the tabletop 33 on which the patient P is placed, in the long-axis directions of the tabletop 33, and includes a motor and an actuator, or the like. The tabletop 33 provided on the top face of the supporting frame 34 is a board on which the patient P is placed. In addition to the tabletop 33, the table driving apparatus 32 may be configured to move the supporting frame 34 in the long-axis directions of the tabletop 33.

The console apparatus 40 includes a memory 41, a display 42, an input interface 43, and processing circuitry 44. Although the console apparatus 40 is described as being separate from the gantry apparatus 10, the gantry apparatus 10 may include the console apparatus 40 or one or more of the constituent elements of the console apparatus 40.

The memory 41 is realized, for example, by using a semiconductor memory element such as a Random Access Memory (RAM) or a flash memory, or a hard disk, an optical disc, or the like. The memory 41 is configured to store therein the projection data and the CT image data, for example. Further, for instance, the memory 41 is configured to store therein programs used by the circuitry included in the X-ray CT apparatus 100 for realizing the functions thereof. In another example, the memory 41 may be realized by using a server group (a cloud) connected to the X-ray CT apparatus 100 via a network.

The display 42 is configured to display various types of information. For example, the display 42 is configured to display various types of images generated by the processing circuitry 44 and to display a Graphical User Interface (GUI) for receiving various types of operations from the operator. For example, the display 42 may be a liquid crystal display or a Cathode Ray Tube (CRT) display. Alternatively, the display 42 may be provided for the gantry apparatus 10. Further, the display 42 may be of a desktop type or may be configured by using a tablet terminal or the like capable of wirelessly communicating with the main body of the console apparatus 40.

The input interface 43 is configured to receive various types of input operations from the operator, to convert the received input operations into electrical signals, and to output the electrical signals to the processing circuitry 44. For example, the input interface 43 is configured to receive, from the operator, a reconstruction condition used at the time of reconstructing the CT image data, an image processing condition used at the time of generating a post-processed image from the CT image data, and the like. For example, the input interface 43 is realized by using a mouse, a keyboard, a trackball, a switch, a button, a joystick, a touchpad on which input operations can be performed by touching an operation surface thereof, a touch screen in which a display screen and a touchpad are integrally formed, contactless input circuitry using an optical sensor, audio input circuitry, and/or the like. Alternatively, the input interface 43 may be provided for the gantry apparatus 10. In another example, the input interface 43 may be configured by using a tablet terminal or the like capable of wirelessly communicating with the main body of the console apparatus 40. Further, the input interface 43 does not necessarily need to include physical operation component parts such as the mouse, the keyboard, and/or the like. For instance, possible examples of the input interface 43 include electrical signal processing circuitry configured to receive an electrical signal corresponding to an input operation from an external input mechanism provided separately from the console apparatus 40 and to output the electrical signal to the processing circuitry 44.

The processing circuitry 44 is configured to control operations of the entirety of the X-ray CT apparatus 100. For example, the processing circuitry 44 is configured to execute a system controlling function 440, a scan controlling function 441, a pre-processing function 442, a reconstruction processing function 443, and a display controlling function 444.

The system controlling function 440 is configured to control various types of functions of the processing circuitry 44 on the basis of input operations received from the operator via the input interface 43.

The scan controlling function 441 is configured to perform a scan using X-rays on the patient P. For example, the scan controlling function 441 is configured to control the scan, on the basis of an input operation received from the operator via the input interface 43. More specifically, the scan controlling function 441 is configured to control the output voltage from the high-voltage generating apparatus, by transmitting a control signal to the X-ray high-voltage apparatus 14, on the basis of an input operation. Further, the scan controlling function 441 is configured to control the data acquisition performed by the DAS 18, by transmitting a control signal to the DAS 18.

The pre-processing function 442 is configured to generate pre-processed data, by performing pre-processing processes on the X-ray detection data transmitted from the DAS 18. More specifically, the pre-processing function 442 is configured to generate the pre-processed data by performing a logarithmic conversion process and/or correcting processes such as an offset correction, a sensitivity correction, and a beam hardening correction. The data (the X-ray detection data) before the pre-processing processes and the data resulting from the pre-processing processes may collectively be referred to as projection data.

The reconstruction processing function 443 is configured to generate the CT image data by reconstructing the projection data generated by the pre-processing function 442, while using any of various types of reconstruction methods (e.g., a back projection method such as a Filtered Backprojection (FBP) method or a successive approximation method). Further, the reconstruction processing function 443 is configured to store the generated CT image data into the memory 41.

The display controlling function 444 is configured to cause the display 42 to display various types of images generated by the processing circuitry 44. For example, the display controlling function 444 is configured to cause the display 42 to display the CT image data generated by the reconstruction processing function 443.

In the X-ray CT apparatus 100 illustrated in FIG. 1, the processing functions are stored in the memory 41, in the form of computer-executable programs. The processing circuitry 44 is represented by one or more processors configured to realize the functions corresponding to the programs by reading and executing the programs from the memory 41. In other words, the processing circuitry 44 that has read the programs has the functions corresponding to the read programs.

The term "processor" used in the above explanations may denote, for example, a Central Processing Unit (CPU), a Graphics Processing Unit (GPU), or circuitry such as an Application Specific Integrated Circuit (ASIC). Further, the term "processor" may denote circuitry such as a programmable logic device. Examples of the programmable logic device include a Simple Programmable Logic Device (SPLD) and a Complex Programmable Logic Device (CPLD). Other examples of the programmable logic device include a Field Programmable Gate Array (FPGA). When the one or more processors are each a CPU, for example, the processors are configured to realize the functions by reading and executing the programs saved in the memory 41. In contrast, when the processors are each an ASIC, for example, instead of having the programs saved in the memory 41, the programs are directly incorporated in the circuitry of the one or more processors. Further, the processors in the present embodiments do not each necessarily have to be structured as a single piece of circuitry. It is also acceptable to structure one processor by combining together a plurality of pieces of independent circuitry so as to realize the functions thereof. Further, it is also acceptable to integrate two or more of the constituent elements depicted in FIG. 1 into one processor, so as to realize the functions thereof.

An overall configuration of the X-ray CT apparatus 100 to which the communication system 500 configured with the communication apparatuses according to the present embodiment is applied has thus been explained.

In the communication system 500 configured with the communication apparatuses according to the present embodiment, for example, wireless communication based on an electromagnetic near field is performed by using a ring-shaped transmission path. However, in wireless systems in which wireless communication based on an electromagnetic near field is performed by using a ring-shaped transmission path, because the absolute value of the Doppler shift amount is constant regardless of the positions of the reception antennas, there is a possibility that the abovementioned wireless system may be unable to reduce the impacts of the Doppler shift.

To cope with this situation, the communication apparatuses according to the present embodiment are configured to perform the processes described below, to make it possible to reduce impacts of changes in the Doppler shift amounts and to inhibit degradation of reception capabilities. To begin with, the communication apparatuses according to the present embodiment include the ring-shaped transmission path, a first coupler, a determining unit, and a data generating unit. The ring-shaped transmission path is disposed in one of a fixed part and a rotating part and includes a plurality of transmission paths each configured to transmit transmission data including a transmission signal and a clock signal. The first coupler is disposed in the other of the fixed part and the rotating part and is configured to receive transmission data from one of the plurality of transmission paths. The determining unit is configured to determine a regenerated clock signal based on the clock signal, in accordance with a reception position in which the first coupler receives the transmission data from the one of the transmission paths. The data generating unit is configured to generate reception data, on the basis of the transmission signal received by the first coupler and the regenerated clock signal.

Figure 2:
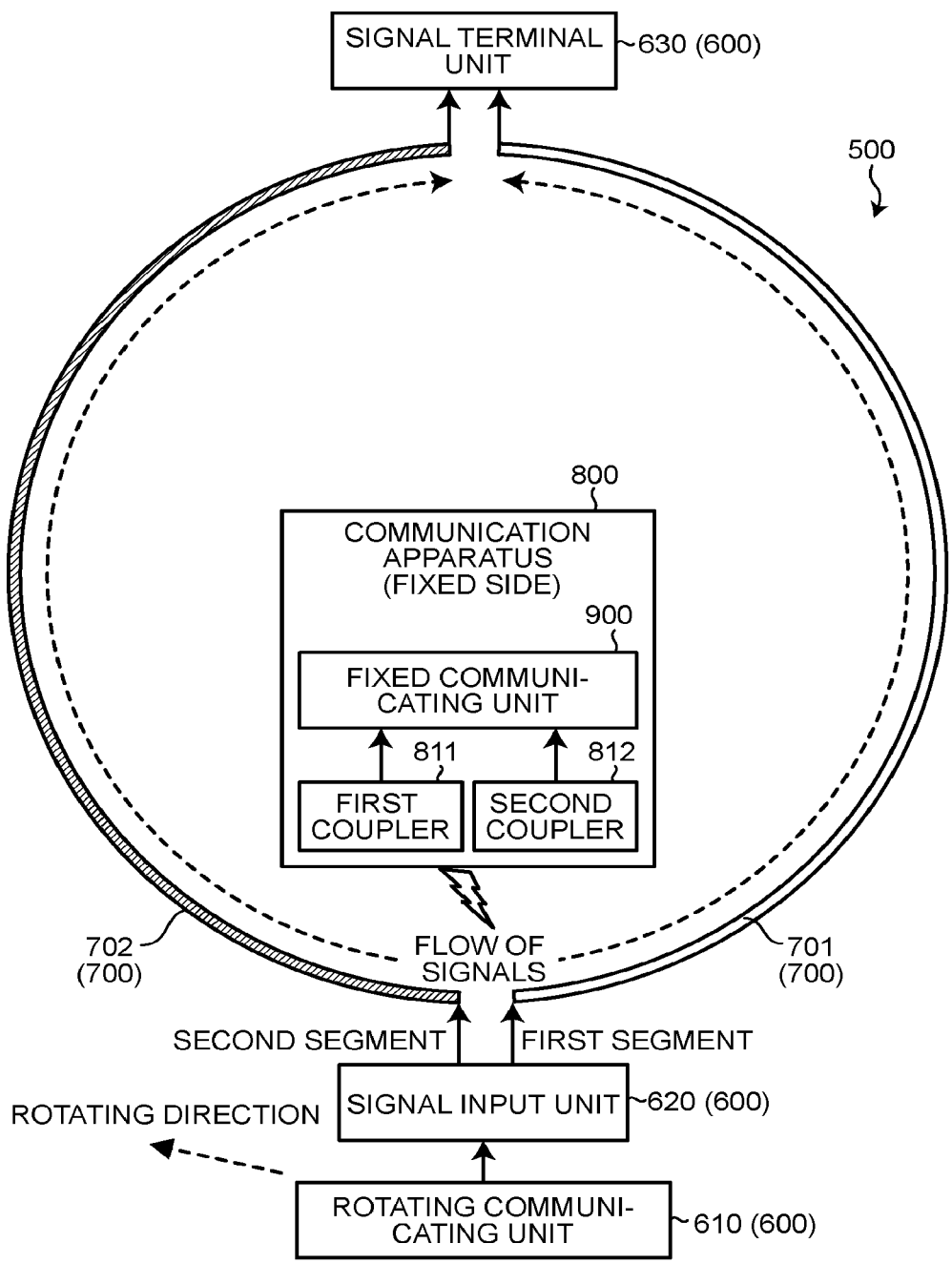
FIG. 2 is a diagram illustrating an exemplary configuration of the communication system configured with communication apparatuses according to a first embodiment.

FIG. 2 is a diagram illustrating an exemplary configuration of the communication system 500 configured with communication apparatuses 600 and 800 according to a first embodiment.

As illustrated in FIG. 2, the communication system 500 includes the communication apparatus 600 on a rotating side, a ring-shaped transmission path (hereinafter, simply a "ring transmission path") 700 and the communication apparatus 800 on a fixed side. In the example in FIG. 2, the communication apparatus 600 and the ring transmission path 700 are disposed in the rotating part (the rotating frame 13), whereas the communication apparatus 800 is disposed in the fixed part (the rotating frame 19). The communication apparatuses 600 and 800 are configured to perform communication via the ring transmission path 700. In the example in FIG. 2, the rotating directions of the rotating part, the communication apparatus 600 on the rotating side, and the ring transmission path 700 are each the clockwise direction.

The ring transmission path 700 includes the plurality of transmission paths (hereinafter, "segments") each configured to transmit the transmission data. In the example in FIG. 2, the ring transmission path 700 is divided into two segments (hereinafter, a "first segment 701" and a "second segment 702") each accounting for 180 degrees. For example, the ring transmission path 700 is divided into: the second segment 702 configured to transmit the transmission data in the rotating direction of the rotating part; and the first segment 701 configured to transmit the transmission data in the opposite direction of the rotating direction. The second segment 702 is an example of the "first transmission path", whereas the first segment 701 is an example of the "second transmission path".

The communication apparatus 600 on the rotating side includes: a rotating communicating unit 610 configured to transmit the transmission data including the transmission signal and the clock signal; a signal input unit 620 configured to input a signal (the transmission data) to an input end of each of the transmission paths (the first segment 701 and the second segment 702); and a signal terminal unit 630 for preventing the signal from being reflected at a terminal end of each of the transmission paths. More specifically, the signal input unit 620 is connected to the input end of the first segment 701 and to the input end of the second segment 702. The signal terminal unit 630 is connected to the terminal end of the first segment 701 and to the terminal end of the second segment 702.

The rotating communicating unit 610 includes an 8B/10B converting unit configured to perform, on the transmission data, encoding for clock regeneration and maintaining DC balance. The signal input unit 620 includes a differential driver and a divider for inputting the transmission data to each of the segments. Possible encoding schemes are not limited to the 8B/10B scheme. It is also acceptable to use other schemes such as 64B/66B, 128B/130B, and the like.

The communication apparatus 800 on the fixed side includes a first coupler 811 and a second coupler 812, which are antenna couplers, and a fixed communicating unit 900. The first coupler 811 and the second coupler 812 are each configured to receive signals flowing in the ring transmission path 700 by using electromagnetic field coupling. The first coupler 811 and the second coupler 812 are each configured to receive the transmission data from one of the first segment 701 and the second segment 702. The fixed communicating unit 900 is configured to determine a regenerated clock signal based on the clock signal, in accordance with a reception position in which the first coupler 811 receives the transmission data from one of the segments. Further, the fixed communicating unit 900 is configured to generate reception data, on the basis of the transmission signal included in the transmission data received by the first coupler and the regenerated clock signal.

In the example in FIG. 2, in the situation where the communication apparatus 600 and the ring transmission path 700 are disposed in the rotating part, whereas the communication apparatus 800 is disposed in the fixed part, the transmission data is a signal of the X-rays (the X-ray detection data) acquired by the data acquisition apparatus (the DAS 18). The communication apparatus 800 on the fixed side is configured to regenerate the clock signal included in the transmission data as the regenerated clock signal and to generate the reception data on the basis of the transmission data and the regenerated clock signal. For example, in the processing circuitry 44 of the console apparatus 40, the pre-processing function 442 is configured to generate the projection data by performing the pre-processing processes on the transmission data (the reception data) transmitted from the DAS 18. The reconstruction processing function 443 is configured to generate the CT image data by reconstructing the projection data generated by the pre-processing function 442.

Next, the reason why the communication apparatus 800 on the fixed side includes the second coupler 812, in addition to the first coupler 811, will be explained.

In the example in FIG. 2, when the rotating directions of the rotating part, the communication apparatus 600 on the rotating side, and the ring transmission path 700 are each the clockwise direction, when the communication apparatus 800 on the fixed side receives the transmission data from the first segment 701 while the rotating part is performing a rotating operation, because the input end of the ring transmission path 700 moves away, a negative Doppler shift (−Δf) occurs on the transmission data. Similarly, when the communication apparatus 800 on the fixed side receives the transmission data from the second segment 702, because the input end of the ring transmission path 700 moves closer, a positive Doppler shift (+Δf) occurs on the transmission data. In this situation, if the communication apparatus 800 on the fixed side had a single antenna coupler (e.g., only the first coupler 811) and a single clock regenerating unit, the frequency of the transmission data would change at the time of the input end or the terminal end of the ring transmission path 700 passing by the antenna coupler, and the clock regenerating unit would have a synchronization transition with the frequency change according to prescribed response time. Until the synchronization transition of the clock regenerating unit is completed, there would be a possibility that a frequency difference might occur between the transmission data and the regenerated clock signal, which might lower reception capabilities. In other words, at the time of the input end or the terminal end of the ring transmission path 700, due to the rotating operation, passing by the reception position in which the antenna coupler receives the transmission data, because the positive/negative sign of the Doppler shift amount would be inverted, there would be a possibility that reception capabilities might be degraded.

To cope with this situation, the communication apparatus 800 on the fixed side includes the two antenna couplers (the first coupler 811 and the second coupler 812). Further, as explained later, the communication apparatus 800 on the fixed side includes two clock regenerating units.

Next, a configuration of the communication apparatus 800 on the fixed side (which hereinafter may simply be referred to as the "communication apparatus 800") will be explained in detail.

Figure 3:
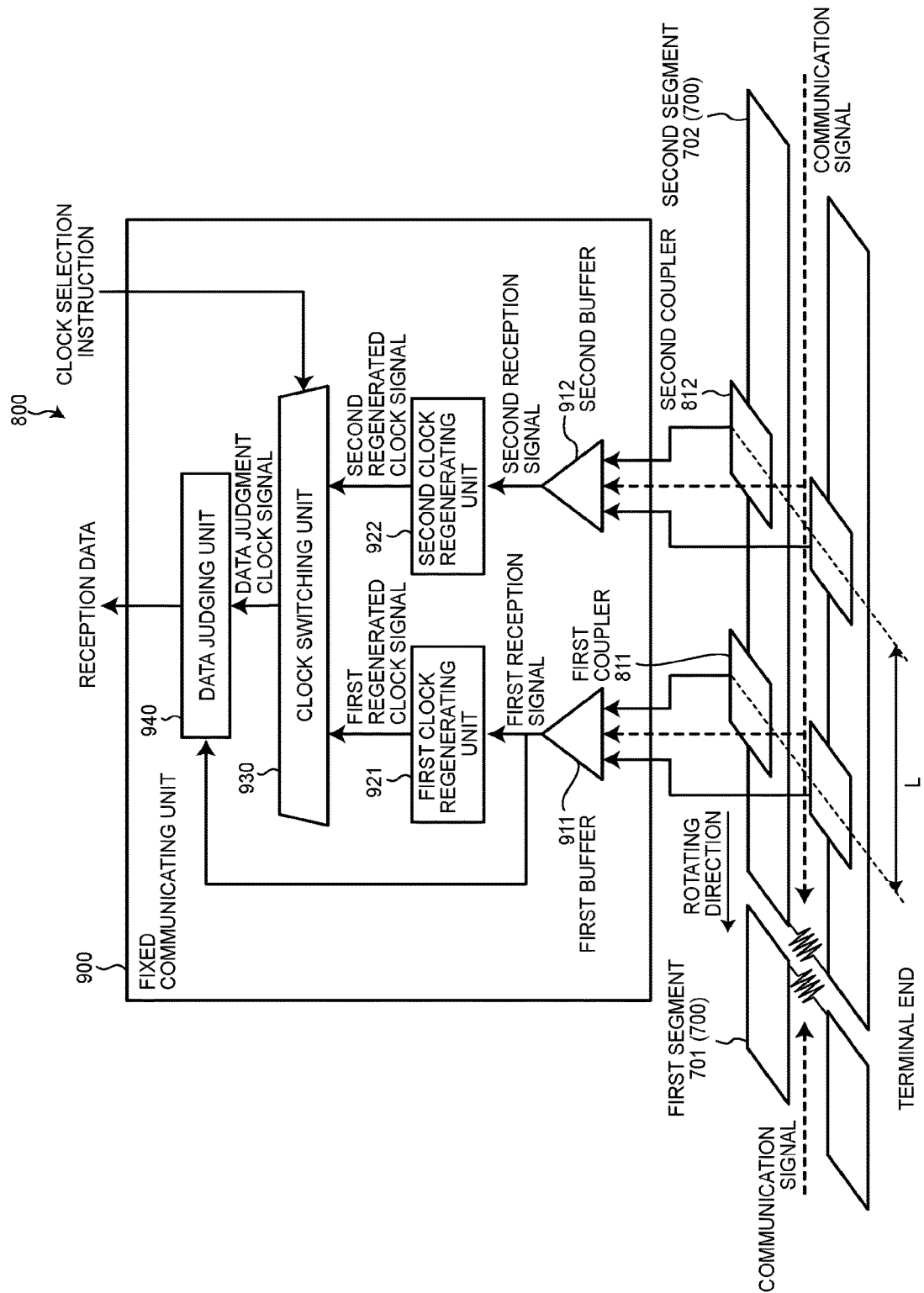
FIG. 3 is a diagram illustrating an exemplary configuration of a communication apparatus according to the first embodiment.

FIG. 3 is a diagram illustrating an exemplary configuration of the communication apparatus 800 according to the first embodiment.

As illustrated in FIG. 3, in the communication apparatus 800, the first coupler 811 is configured to receive the transmission data from one of the first segment 701 and the second segment 702 (the second segment 702 in the example in FIG. 3), as a first reception signal. The second coupler 812 is positioned apart from the first coupler 811 and is configured to receive the transmission data from the one of the segments (the second segment 702) as a second reception signal, earlier than the first coupler 811 does.

In the communication apparatus 800, the fixed communicating unit 900 includes: two differential buffers (hereinafter, a "first buffer 911" and a "second buffer 912"); two clock regenerating units (hereinafter, a "first clock regenerating unit 921" and a "second clock regenerating unit 922"); a clock switching unit 930, and a data judging unit 940 (a 10B/8B converting unit). The first clock regenerating unit 921, the second clock regenerating unit 922, and the clock switching unit 930 are examples of the "determining unit". In other words, in the communication apparatus 800, the first coupler 811 is configured to receive the transmission data from one of the first segment 701 and the second segment 702, whereas the determining unit is configured to determine the regenerated clock signal based on the clock signal, in accordance with the reception position in which the first coupler 811 receives the transmission data from the one of the segments.

The first buffer 911 is configured to amplify the transmission data received by the first coupler 811. The second buffer 912 is configured to amplify the transmission data received by the second coupler 812. The first clock regenerating unit 921 is configured to regenerate the clock signal included in the transmission data (the first reception signal) received by the first coupler 811, as a first regenerated clock signal. The second clock regenerating unit 922 is configured to regenerate the clock signal included in the transmission data (the second reception signal) received by the second coupler 812, as a second regenerated clock signal. The first clock regenerating unit 921 and the second clock regenerating unit 922 are examples of the "first regenerating unit" and the "second regenerating unit", respectively.

The clock switching unit 930 is configured to select one of the first regenerated clock signal and the second regenerated clock signal, as a data judgment clock signal. The data judging unit 940 is configured to generate the reception data, on the basis of the transmission signal included in the transmission data received by the first coupler 811 and the data judgment clock signal. The clock switching unit 930 is an example of the "switching unit". The data judging unit 940 is an example of the "generating unit".

In this situation, the isolation distance between the first coupler 811 and the second coupler 812 is set while taking response time of the second clock regenerating unit 922 into account. For example, the response time of the second clock regenerating unit 922 will be expressed as Δtr (sec), while the rotation speed of the rotating part will be expressed as v (m/sec), and an ideal distance between the first coupler 811 and the second coupler 812 taking the response time Δtr into account will be expressed as L (m). In that situation, it is possible to calculate the distance L as L=v×Δtr. In other words, the first coupler 811 and the second coupler 812 are positioned apart from each other by a distance equal to or longer than L. For example, when the rotation speed v of the rotating part is 0.2 (sec/rot), while the ring radius is 1 (m), and the response time Δtr of the clock regenerating unit is 1 (msec), the distance L is 3.14 (cm) or longer.

For example, as a first switching process, the clock switching unit 930 is configured to set the data judgment clock signal to be the first regenerated clock signal. When a division part (the input end or the terminal end) of the ring transmission path 700 has passed by the first coupler 811, the clock switching unit 930 is configured to switch the data judgment clock signal from the first regenerated clock signal into the second regenerated clock signal. When the response time Δtr of the second clock regenerating unit 922 has elapsed since the division part (the input end or the terminal end) of the ring transmission path 700 passed by the first coupler 811, the clock switching unit 930 is configured to switch the data judgment clock signal from the second regenerated clock signal into the first regenerated clock signal. In other words, the clock switching unit 930 is configured to revert the data judgment clock signal to the first regenerated clock signal, after the response time Δtr has elapsed.

In this situation, the clock switching unit 930 is configured to switch the data judgment clock signal from the first regenerated clock signal into the second regenerated clock signal, in response to a clock selection instruction output from the controlling apparatus 15 in FIG. 1.

For example, the switching timing is determined on the basis of the rotation angle of the rotating part. More specifically, when the rotation angle of the rotating part represents a division part (the input end or the terminal end) of the ring transmission path 700, the controlling apparatus 15 determines that it is switching timing and outputs a clock selection instruction. In accordance with the clock selection instruction output from the controlling apparatus 15, the clock switching unit 930 is configured to switch the data judgment clock signal from the first regenerated clock signal into the second regenerated clock signal.

In another example, it is possible to provide a sensor capable of detecting a division part (the input end or the terminal end) of the ring transmission path 700. More specifically, upon receipt of a signal indicating that the sensor has detected passing of the division part, the controlling apparatus 15 may be configured to determine that it is switching timing and to output the clock selection instruction, so that the clock switching unit 930 switches the data judgment clock signal from the first regenerated clock signal into the second regenerated clock signal, in accordance with the clock selection instruction output from the controlling apparatus 15.

In yet another example, the clock switching unit 930 may be configured to determine the switching timing without using the clock selection signal output from the controlling apparatus 15. For example, the switching timing may be determined on the basis of a phase difference between the transmission data (the first reception signal) received by the first coupler 811 and the first regenerated clock signal regenerated by the first clock regenerating unit 921. More specifically, upon detection of the phase difference between the first reception signal and the first regenerated clock signal, the clock switching unit 930 may be configured, in accordance with the phase difference, to switch the data judgment clock signal from the first regenerated clock signal into the second regenerated clock signal.

Figure 4:
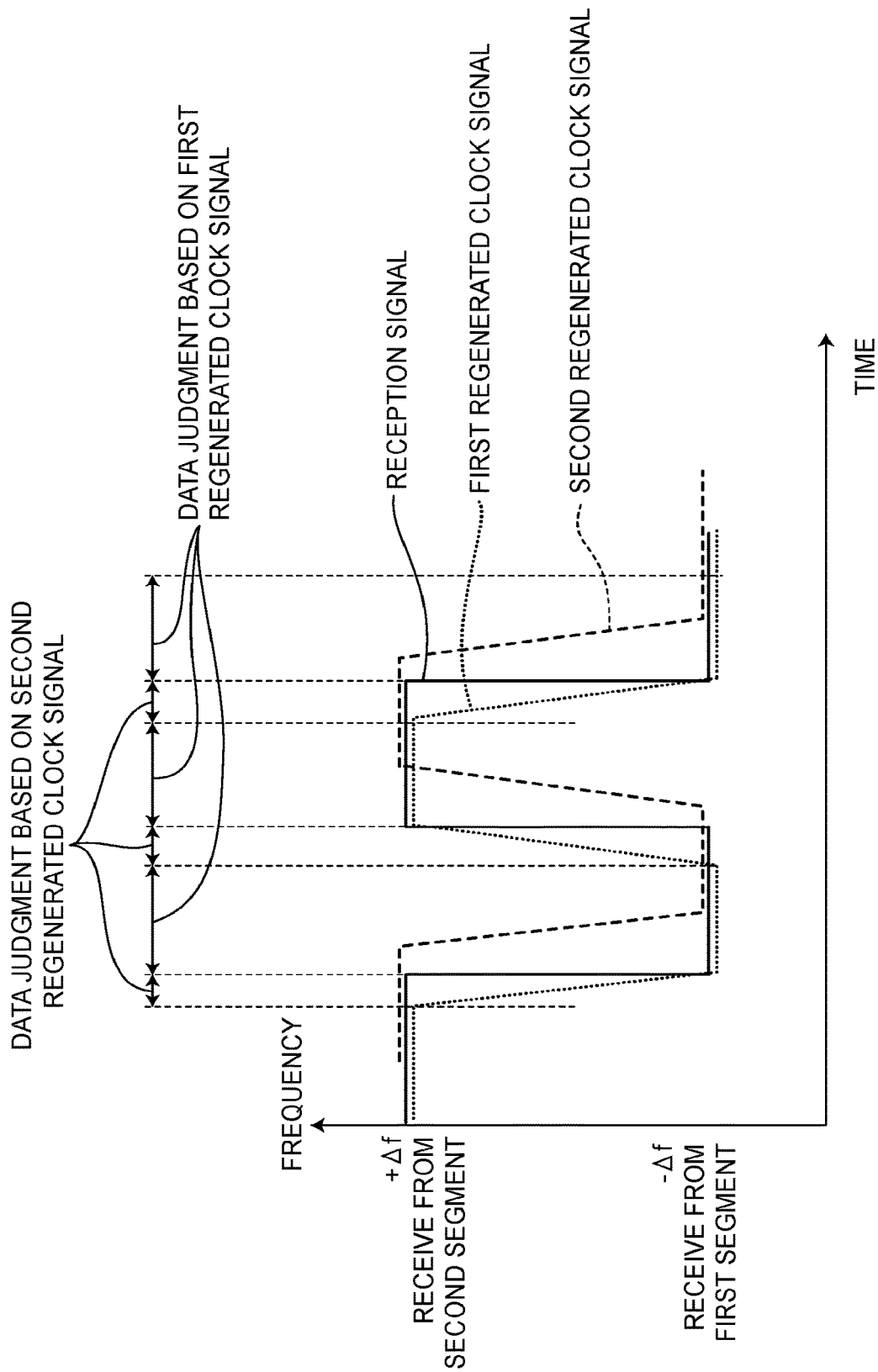
FIG. 4 is a chart for explaining an operation of the communication apparatus according to the first embodiment.

FIG. 4 is a chart for explaining an operation of the communication apparatus 800 according to the first embodiment.

While the rotating part is performing a rotating operation, when the fixed communicating unit 900 receives the transmission data from the second segment 702, because the rotating communicating unit 610 moves closer, a positive Doppler shift (+Δf) occurs on the transmission data. Accordingly, the clock switching unit 930 switches the data judgment clock signal from the first regenerated clock signal into the second regenerated clock signal. As a result, there is a time period during which the frequency of the transmission data (the first reception signal) received by the first coupler 811 is equal to the frequency of the second regenerated clock signal. In that situation, the data judging unit 940 determines that it is a time period during which a data judgment is to be made based on the second regenerated clock signal and generates reception data on the basis of the transmission data (the first reception signal) received by the first coupler 811 and the data judgment clock signal (the second regenerated clock signal).

In contrast, while the rotating part is performing a rotating operation, when the fixed communicating unit 900 receives the transmission data from the first segment 701, because the rotating communicating unit 610 moves away, a negative Doppler shift (−Δf) occurs on the transmission data. Accordingly, the clock switching unit 930 switches the data judgment clock signal from the second regenerated clock signal into the first regenerated clock signal. As a result, there is a time period during which the frequency of the transmission data (the first reception signal) received by the first coupler 811 is equal to the frequency of the first regenerated clock signal. In that situation, the data judging unit 940 determines that it is a time period during which a data judgment is to be made based on the first regenerated clock signal and generates reception data on the basis of the transmission data (the first reception signal) received by the first coupler 811 and the data judgment clock signal (the first regenerated clock signal).

Further, processes performed by the communication apparatuses 600 and 800 are performed as a result of the processing circuitry 44 illustrated in FIG. 1 invoking the programs corresponding to constituent elements of the communication apparatuses, from the memory 41. For example, the processes performed by the communication apparatuses 600 and 800 are performed as a result of the processing circuitry 44 invoking, from the memory 41, the programs corresponding to the constituent elements, namely, the rotating communicating unit 610 and the fixed communicating unit 900 (i.e., the first clock regenerating unit 921, the second clock regenerating unit 922, the clock switching unit 930, and the data judging unit 940).

Figure 5:
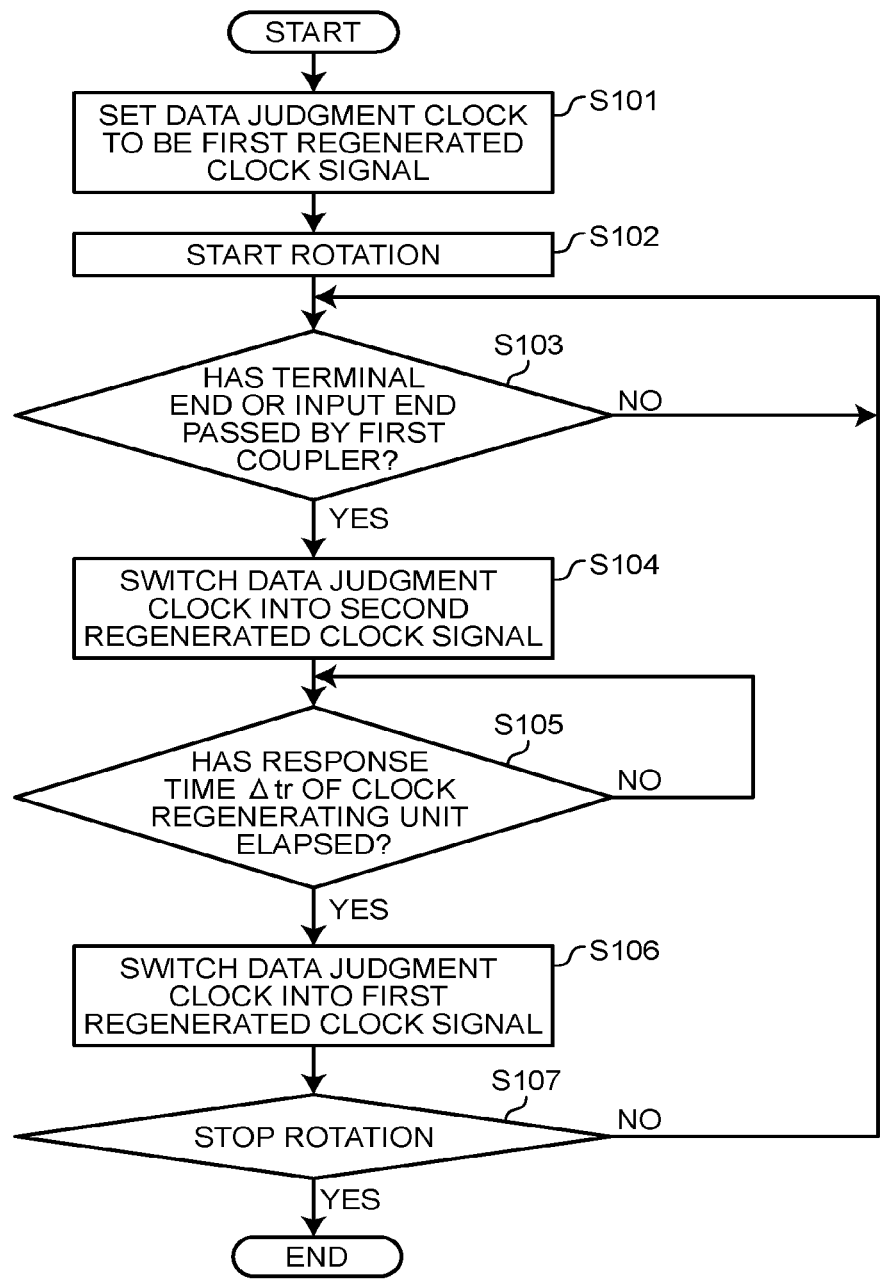
FIG. 5 is a flowchart illustrating a process performed by the communication apparatus according to the first embodiment.

FIG. 5 is a flowchart illustrating a process (the first switching process) performed by the communication apparatus 800 according to the first embodiment.

At step S101 in FIG. 5, the clock switching unit 930 sets the data judgment clock signal to be the first regenerated clock signal.

At step S102 in FIG. 5, in accordance with the control signal for rotating the rotating part (the rotating frame 13), as a control signal output from the console apparatus 40 (e.g., the system controlling function 440 of the processing circuitry 44), the controlling apparatus 15 causes the rotating part to start rotating.

At step S103 in FIG. 5, the controlling apparatus 15 judges whether or not a division part (the input end or the terminal end) of the ring transmission path 700 has passed by the first coupler 811, on the basis of the rotation angle of the rotating part, for example. When neither the input end nor the terminal end has passed by the first coupler 811, the processing in FIG. 5 returns to step S103. On the contrary, when one of the input end and the terminal end has passed by the first coupler 811, the processing in FIG. 5 proceeds to step S104.

At step S104 in FIG. 5, the controlling apparatus 15 determines that it is switching timing and outputs a clock selection instruction. In accordance with the clock selection instruction, the clock switching unit 930 switches the data judgment clock signal from the first regenerated clock signal into the second regenerated clock signal.

At step S105 in FIG. 5, the clock switching unit 930 judges whether or not the response time Δtr of the second clock regenerating unit 922 has elapsed since the data judgment clock signal was switched from the first regenerated clock signal into the second regenerated clock signal. When the response time Δtr has not elapsed, the processing in FIG. 5 returns to step S105. When the response time Δtr has elapsed, the processing in FIG. 5 proceeds to step S106.

At step S106 in FIG. 5, the clock switching unit 930 switches the data judgment clock signal from the second regenerated clock signal into the first regenerated clock signal.

At step S107 in FIG. 5, the controlling apparatus 15 judges whether or not a control signal for stopping the rotation of the rotating part has been received, as a control signal output from the console apparatus 40. When the controlling apparatus 15 has not received the control signal, the processing in FIG. 5 returns to step S103. On the contrary, when the controlling apparatus 15 has received the control signal, the processing in FIG. 5 ends.

As explained above, in the communication apparatus 800 according to the first embodiment, to begin with, the clock switching unit 930 is configured, as the first switching process, to set the data judgment clock signal to be the first regenerated clock signal. After that, when a division part (the input end or the terminal end) of the ring transmission path 700 has passed by the first coupler 811, the clock switching unit 930 is configured to switch the data judgment clock signal from the first regenerated clock signal into the second regenerated clock signal. Further, when the response time Δtr of the second clock regenerating unit 922 has elapsed since the division part (the input end or the terminal end) of the ring transmission path 700 passed by the first coupler 811, the clock switching unit 930 is configured to switch the data judgment clock signal from the second regenerated clock signal into the first regenerated clock signal. With this configuration, the communication apparatus 800 according to the first embodiment is able to reduce the impacts of changes in the Doppler shift amounts and to inhibit degradation of reception capabilities.

Second Embodiment

Figure 6:
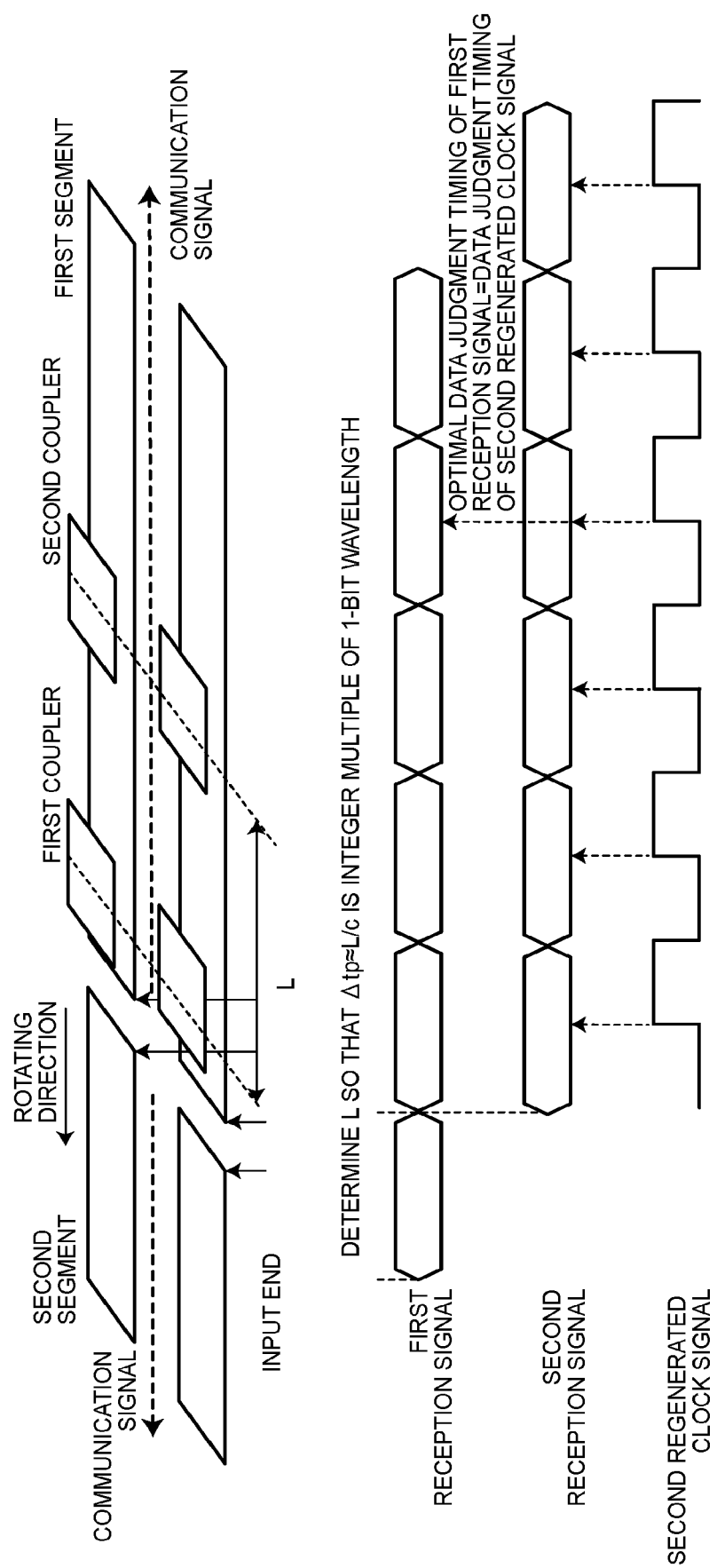
FIG. 6 is a chart for explaining an operation of a communication apparatus according to a second embodiment.

FIG. 6 is a chart for explaining an operation of the communication apparatus 800 according to a second embodiment.

In the example in FIG. 2, because the rotating directions of the rotating part, the communication apparatus 600 on the rotating side, and the ring transmission path 700 are each the clockwise direction, while both the first coupler 811 and the second coupler 812 are receiving the transmission data from the first segment 701, the transmission data input to the input end of the ring transmission path 700 is sequentially received by the first coupler 811 and the second coupler 812 in the stated order. When a signal propagation speed on the ring transmission path 700 is expressed as c (m/s), the transmission data (the second reception signal) received by the second coupler 812 has a time delay expressed as Δtp=L/c (sec), as compared to the transmission data (the first reception signal) received by the first coupler 811.

In contrast, when both the first coupler 811 and the second coupler 812 are receiving the transmission data from the second segment 702, the transmission data input to the input end of the ring transmission path 700 is sequentially received by the second coupler 812 and the first coupler 811 in the stated order. Thus, the second reception signal has a time advancement expressed as Δtp, as compared to the first reception signal.

As explained above, phase differences occur after the input end of the ring transmission path 700 passes by the first coupler 811 and the second coupler 812 and after the terminal end of the ring transmission path 700 passes by the first coupler 811 and the second coupler 812. For this reason, when a data rate DR (bit/sec) of the signal is high, reception capabilities may be degraded by the phase differences ($\pm\theta=\pm2\pi\times DR\times\Delta tp$ (rad)) associated with the time difference for receiving the reception signals. The degradation of the reception capabilities does not occur, if the condition of being an integer multiple of the wavelength c/DR (m) per bit of the signal is satisfied. By making use of this notion, in the second embodiment, the isolation distance between the first coupler 811 and the second coupler 812 is set so as to satisfy both L≥v×Δtr (m) and L; n×c/DR (m). For example, the isolation distance L=v×Δtr between the first coupler 811 and the second coupler 812 is substantially equal to an integer multiple of the wavelength of the transmission data (the reception signal) per bit.

Third Embodiment

Figure 7:
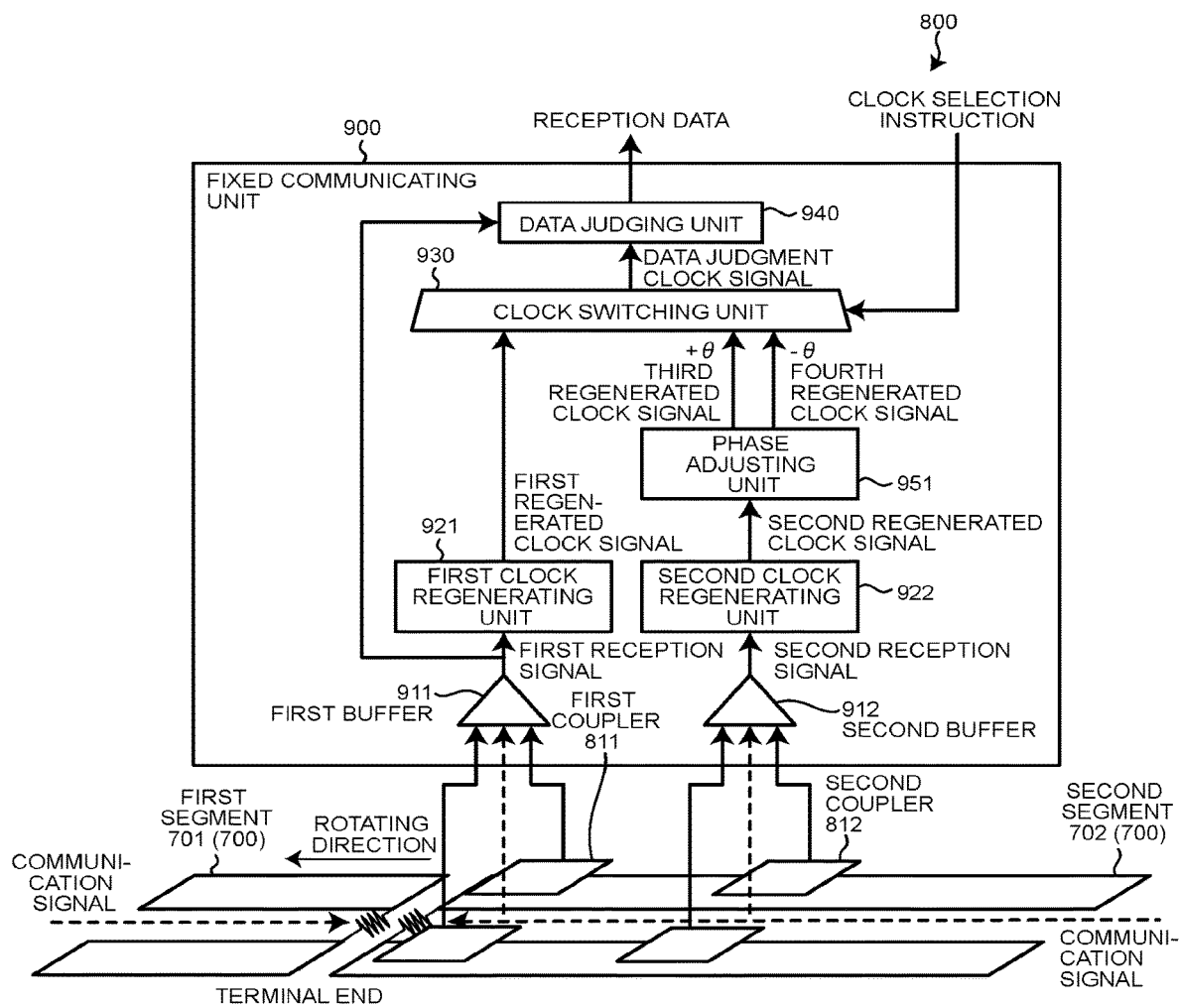
FIG. 7 is a diagram illustrating an exemplary configuration of a communication apparatus according to a third embodiment.

FIG. 7 is a diagram illustrating an exemplary configuration of the communication apparatus 800 according to a third embodiment. In the third embodiment, changes from the first embodiment or the second embodiment will be explained.

As illustrated in FIG. 7, the communication apparatus 800 further includes a phase adjusting unit 951. In the third embodiment, by further providing the phase adjusting unit 951 at a stage later than the second clock regenerating unit 922, it is possible to inhibit the degradation of the reception capabilities caused by the phase differences associated with the isolation distance between the first coupler 811 and the second coupler 812.

FIGS. 8A and 8B are charts for explaining an operation of the communication apparatus 800 according to the third embodiment.

The phase adjusting unit 951 is configured to generate a third regenerated clock signal advanced by the prescribed phase difference θ and a fourth regenerated clock signal delayed by the prescribed phase difference θ as compared to the second regenerated clock signal, the prescribed phase difference θ being determined on the basis of the isolation distance L. In FIG. 8A, the third regenerated clock signal is an example of a regenerated clock signal (the second regenerated clock signal+θ) advanced from the second regenerated clock signal by the prescribed phase difference θ. In FIG. 8B, the fourth regenerated clock signal is an example of a regenerated clock signal (the second regenerated clock signal−θ) delayed from the second regenerated clock signal by the prescribed phase difference θ.

Accordingly, when the input end being a division part of the ring transmission path 700 has passed by the first coupler 811, the clock switching unit 930 is configured to switch the data judgment clock signal from the first regenerated clock signal into the third regenerated clock signal. When the response time Δtr of the second clock regenerating unit 922 has elapsed since the input end passed by the first coupler 811, the clock switching unit 930 is configured to switch the data judgment clock signal from the third regenerated clock signal into the first regenerated clock signal. Also, when the terminal end being a division part of the ring transmission path 700 has passed by the first coupler 811, the clock switching unit 930 is configured to switch the data judgment clock signal from the first regenerated clock signal into the fourth regenerated clock signal. When the response time Δtr of the second clock regenerating unit 922 has elapsed since the terminal end passed by the first coupler 811, the clock switching unit 930 is configured to switch the data judgment clock signal from the fourth regenerated clock signal into the first regenerated clock signal.

Figure 9:
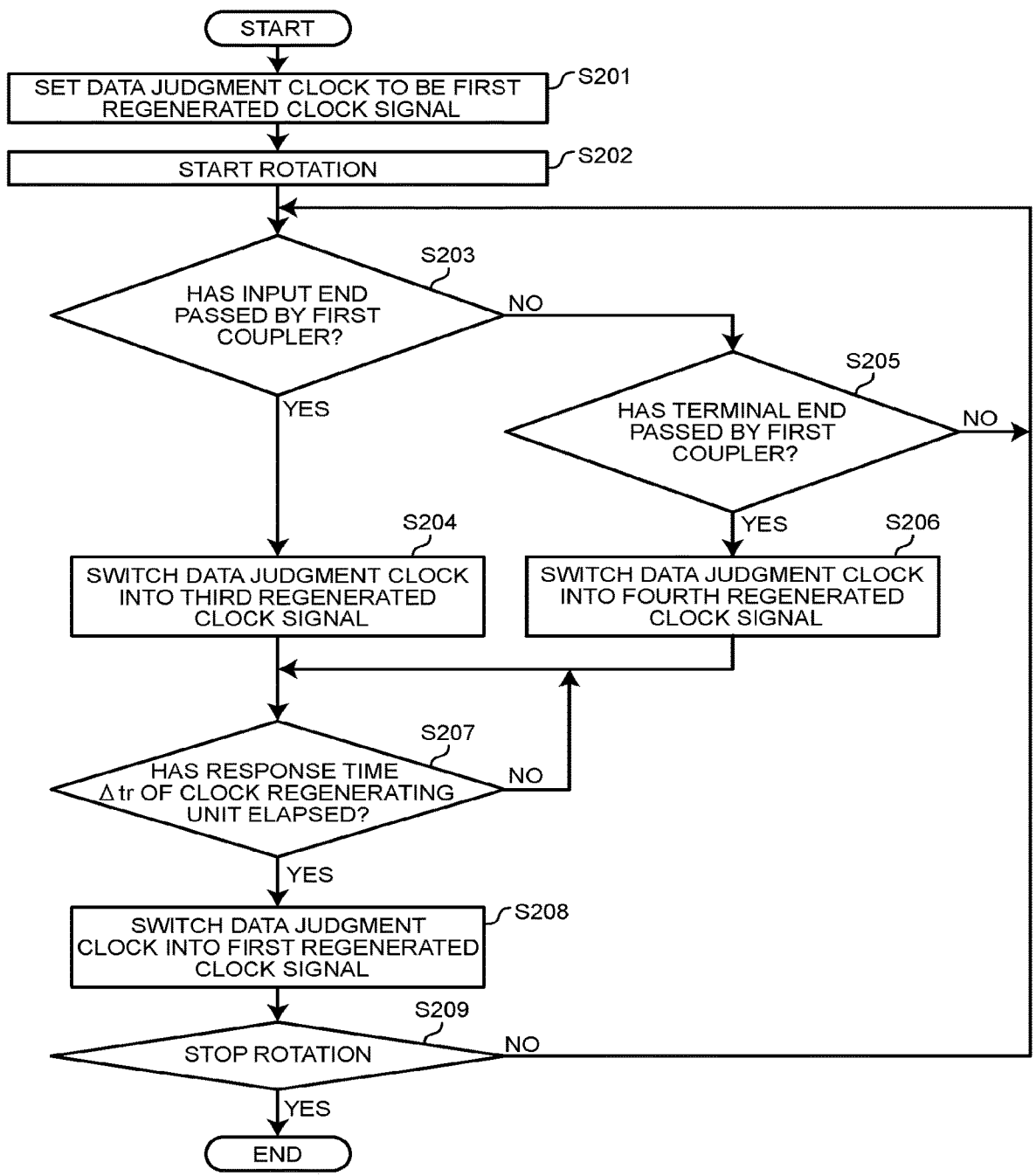
FIG. 9 is a flowchart illustrating a process performed by the communication apparatus according to the third embodiment.

FIG. 9 is a flowchart illustrating a process (the first switching process) performed by the communication apparatus 800 according to the third embodiment.

At step S201 in FIG. 9, the clock switching unit 930 sets the data judgment clock signal to be the first regenerated clock signal.

At step S202 in FIG. 9, in accordance with the control signal for rotating the rotating part (the rotating frame 13), as a control signal output from the console apparatus 40 (e.g., the system controlling function 440 of the processing circuitry 44), the controlling apparatus 15 causes the rotating part to start rotating.

At step S203 in FIG. 9, the controlling apparatus 15 judges whether or not the input end of the ring transmission path 700 has passed by the first coupler 811, on the basis of the rotation angle of the rotating part, for example. When the input end has not passed by the first coupler 811, the processing in FIG. 9 proceeds to step S205. On the contrary, when the input end has passed by the first coupler 811, the processing in FIG. 9 proceeds to step S204.

At step S204 in FIG. 9, the controlling apparatus 15 determines that it is switching timing and outputs a clock selection instruction. In accordance with the clock selection instruction, the clock switching unit 930 switches the data judgment clock signal from the first regenerated clock signal into the third regenerated clock signal.

At step S205 in FIG. 9, the controlling apparatus 15 judges whether or not the terminal end of the ring transmission path 700 has passed by the first coupler 811, on the basis of the rotation angle of the rotating part, for example. When the terminal end has not passed by the first coupler 811, the processing in FIG. 9 returns to step S203.

On the contrary, when the terminal end has passed by the first coupler 811, the processing in FIG. 9 proceeds to step S206.

At step S206 in FIG. 9, the controlling apparatus 15 determines that it is switching timing and outputs a clock selection instruction. In accordance with the clock selection instruction, the clock switching unit 930 switches the data judgment clock signal from the first regenerated clock signal into the fourth regenerated clock signal.

At step S207 in FIG. 9, the clock switching unit 930 judges whether or not the response time Δtr of the second clock regenerating unit 922 has elapsed since the data judgment clock signal was switched from the first regenerated clock signal into either the third regenerated clock signal or the fourth regenerated clock signal. When the response time Δtr has not elapsed, the processing in FIG. 9 returns to step S207. When the response time Δtr has elapsed, the processing in FIG. 9 proceeds to step S208.

At step S208 in FIG. 9, the clock switching unit 930 switches the data judgment clock signal from either the third regenerated clock signal or the fourth regenerated clock signal into the first regenerated clock signal.

At step S209 in FIG. 9, the controlling apparatus 15 judges whether or not the control signal for stopping the rotation of the rotating part has been received, as a control signal output from the console apparatus 40. When the controlling apparatus 15 has not received the control signal, the processing in FIG. 9 returns to step S203. On the contrary, when the controlling apparatus 15 has received the control signal, the processing in FIG. 9 ends.

As explained above, in the communication apparatus 800 according to the third embodiment, as the first switching process, the clock switching unit 930 is configured, to begin with, to set the data judgment clock signal to be the first regenerated clock signal. Further, when the input end of the ring transmission path 700 has passed by the first coupler 811, the clock switching unit 930 is configured to switch the data judgment clock signal from the first regenerated clock signal into the third regenerated clock signal. When the response time Δtr of the second clock regenerating unit 922 has elapsed since the input end passed by the first coupler 811, the clock switching unit 930 is configured to switch the data judgment clock signal from the third regenerated clock signal into the first regenerated clock signal. Also, when the terminal end of the ring transmission path 700 has passed by the first coupler 811, the clock switching unit 930 is configured to switch the data judgment clock signal from the first regenerated clock signal into the fourth regenerated clock signal. When the response time Δtr of the second clock regenerating unit 922 has elapsed since the terminal end passed by the first coupler 811, the clock switching unit 930 is configured to switch the data judgment clock signal from the fourth regenerated clock signal into the first regenerated clock signal. With this configuration, the communication apparatus 800 according to the third embodiment is able to reduce the impacts of changes in the Doppler shift amounts and to inhibit the degradation of the reception capabilities.

Fourth Embodiment

Figure 10:
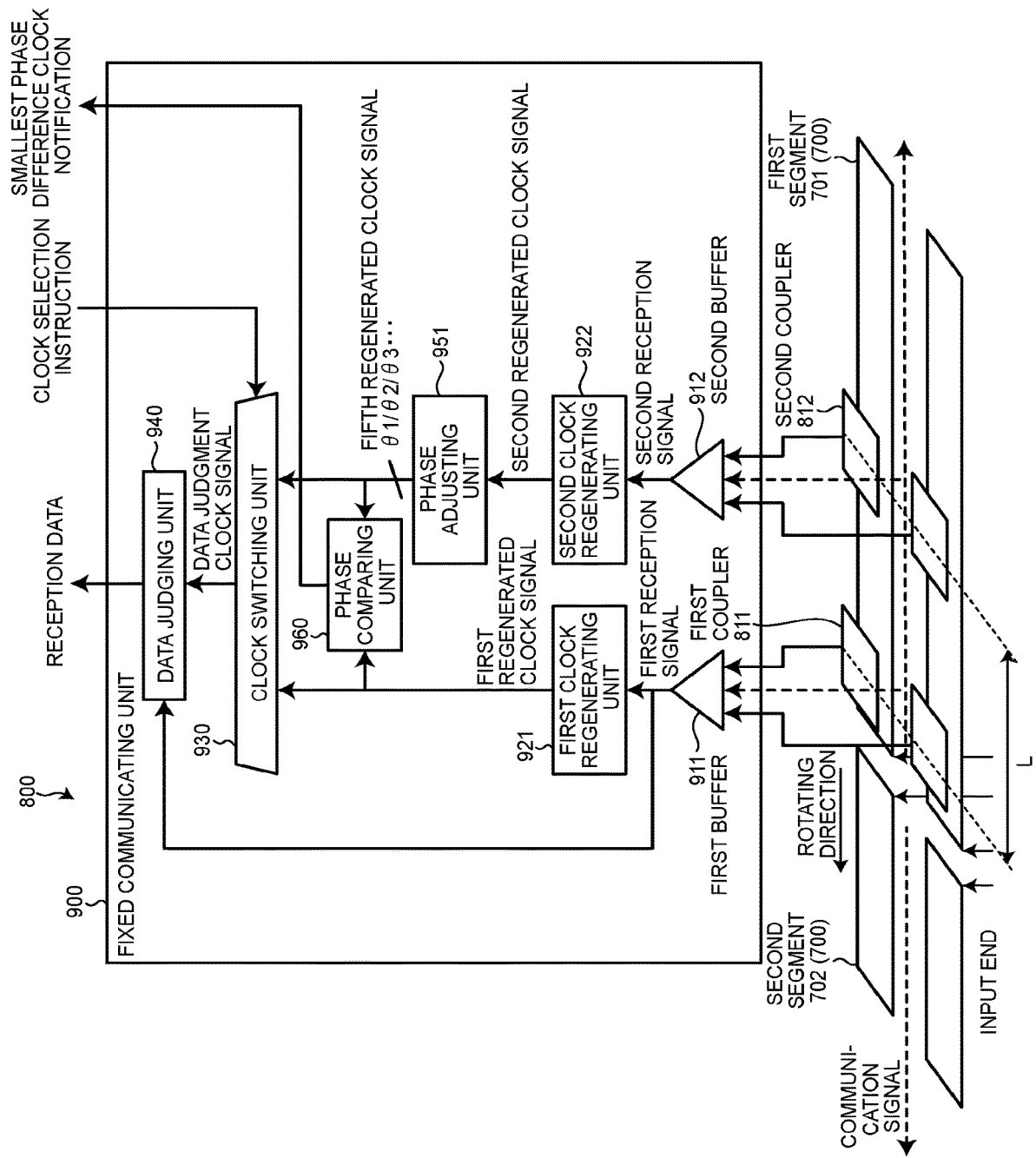
FIG. 10 is a diagram illustrating an exemplary configuration of a communication apparatus according to a fourth embodiment.

FIG. 10 is a diagram illustrating an exemplary configuration of the communication apparatus 800 according to a fourth embodiment. In the fourth embodiment, changes from the third embodiment will be explained.

As illustrated in FIG. 10, the communication apparatus 800 further includes the phase adjusting unit 951 and a phase comparing unit 960. In the third embodiment, the phase adjusting unit 951 is configured to generate the third regenerated clock signal advanced by the prescribed phase difference θ and the fourth regenerated clock signal delayed by the prescribed phase difference θ as compared to the second regenerated clock signal, the prescribed phase difference θ being determined on the basis of the isolation distance L. However, the signal propagation speed is determined by properties of dielectric members structuring the ring transmission path 700 and may not precisely be reached by calculation. In the fourth embodiment, by further providing the phase adjusting unit 951 and the phase comparing unit 960 at stages later than the second clock regenerating unit 922, it is possible to determine optimal regenerated clock signals.

Figure 11:
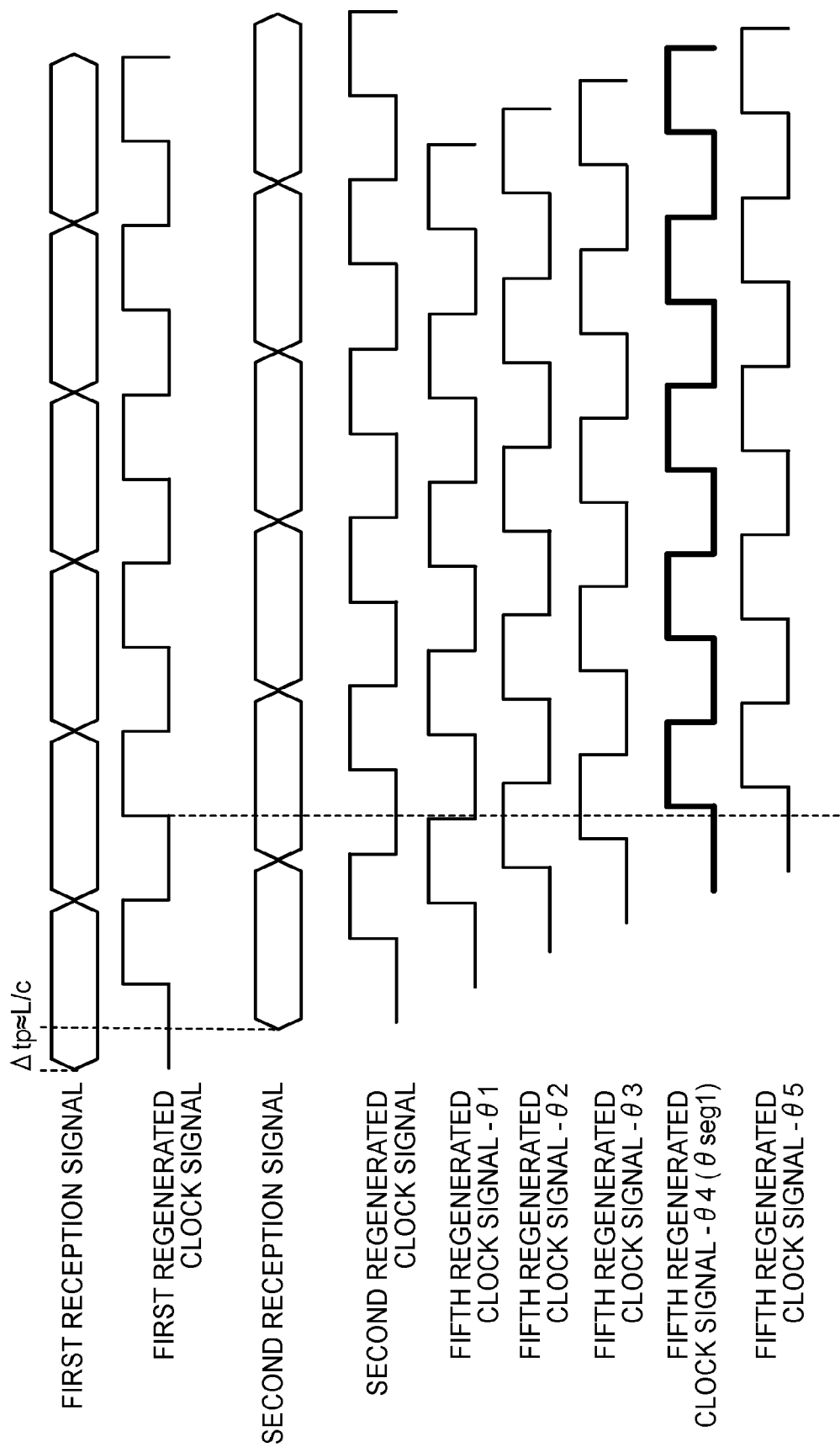
FIG. 11 is a chart for explaining an operation of the communication apparatus according to the fourth embodiment.

FIG. 11 is a chart for explaining an operation of the communication apparatus 800 according to the fourth embodiment.

In the fourth embodiment, before the rotating part starts performing the rotating operation, the first coupler 811 and the second coupler 812 are both disposed in the first segment 701 and the second segment 702. The fixed communicating unit 900 is configured to determine the phase of a regenerated clock signal having the smallest phase difference from the first regenerated clock signal, with respect to each of the segments. More specifically, the phase adjusting unit 951 is configured to generate a fifth regenerated clock signal group (in the example in FIG. 11, "a fifth regenerated clock signal-θ1", "the fifth regenerated clock signal-θ2", "the fifth regenerated clock signal-θ3", "the fifth regenerated clock signal-θ4", and "the fifth regenerated clock signal-θ5") having different phases from the second regenerated clock signal.

After that, while the first coupler 811 and the second coupler 812 are positioned in the second segment 702, the phase comparing unit 960 is configured to detect the phase differences between the first regenerated clock signal and the fifth regenerated clock signal group and to determine one of the fifth regenerated clock signals (the fifth regenerated clock signal-θ4, in the example in FIG. 11) having the smallest phase difference from the first regenerated clock signal, as a first phase difference regenerated clock signal (a fifth regenerated clock signal_θseg1).

Also, while the first coupler 811 and the second coupler 812 are positioned in the first segment 701, the phase comparing unit 960 is configured to detect the phase differences between the first regenerated clock signal and the fifth regenerated clock signal group and to determine one of the fifth regenerated clock signals having the smallest phase difference from the first regenerated clock signal, as a second phase difference regenerated clock signal (a fifth regenerated clock signal_θseg2).

Accordingly, when the input end being a division part of the ring transmission path 700 has passed by the first coupler 811, the clock switching unit 930 is configured to switch the data judgment clock signal from the first regenerated clock signal into the first phase difference regenerated clock signal (the fifth regenerated clock signal_θseg1). When the response time Δtr of the second clock regenerating unit 922 has elapsed since the input end passed by the first coupler 811, the clock switching unit 930 is configured to switch the data judgment clock signal from the first phase difference regenerated clock signal (the fifth regenerated clock signal_θseg1) into the first regenerated clock signal. Also, when the terminal end being a division part of the ring transmission path 700 has passed by the first coupler 811, the clock switching unit 930 is configured to switch the data judgment clock signal from the first regenerated clock signal into the second phase difference regenerated clock signal (the fifth regenerated clock signal_θseg2). When the response time Δtr of the second clock regenerating unit 922 has elapsed since the terminal end passed by the first coupler 811, the clock switching unit 930 is configured to switch the data judgment clock signal from the second phase difference regenerated clock signal (the fifth regenerated clock signal_θseg2) into the first regenerated clock signal.

Figure 12:
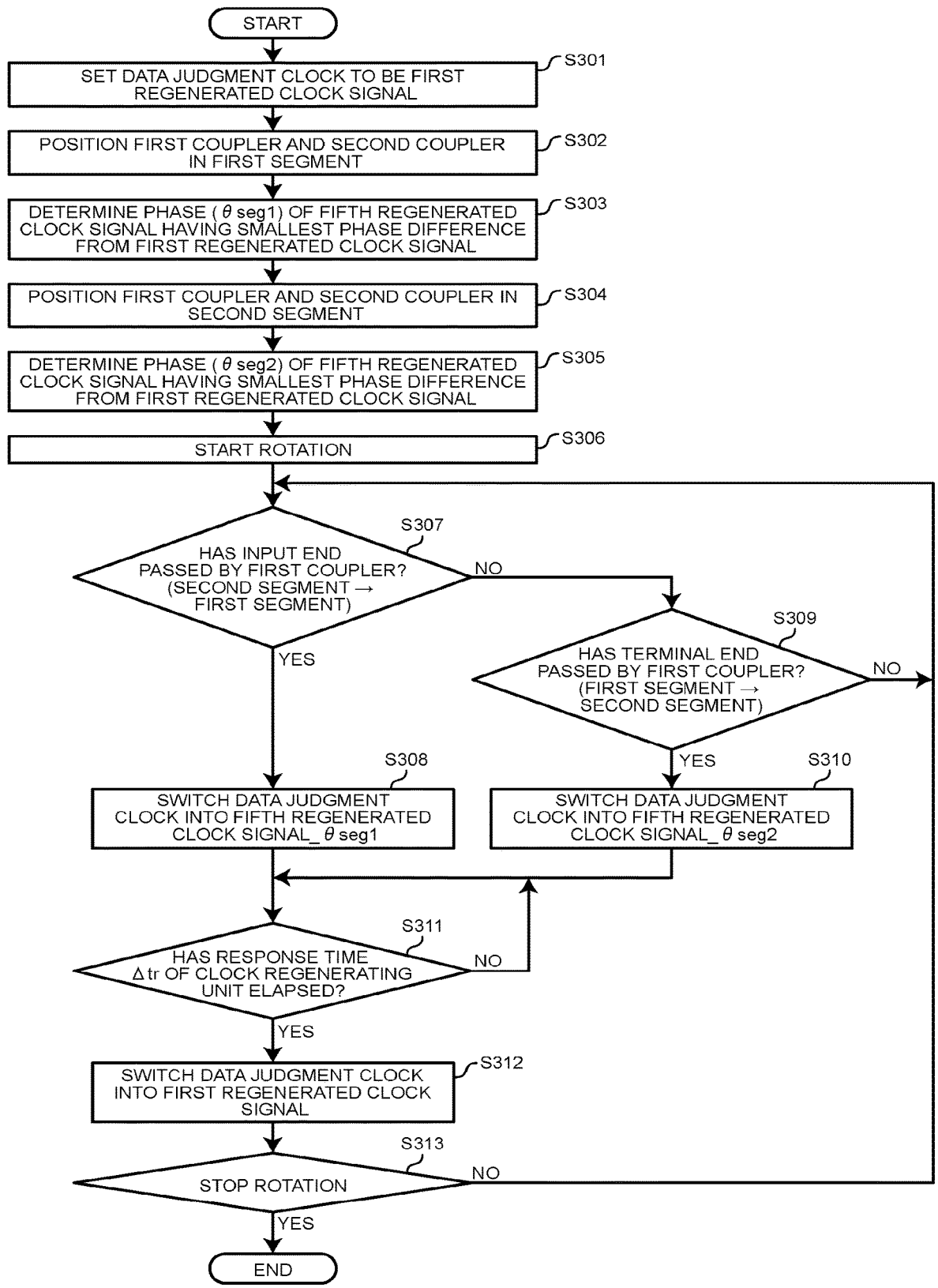
FIG. 12 is a flowchart illustrating a process performed by the communication apparatus according to the fourth embodiment.

FIG. 12 is a flowchart illustrating a process (the first switching process) performed by the communication apparatus 800 according to the fourth embodiment.

At step S301 in FIG. 12, the clock switching unit 930 sets the data judgment clock signal to be the first regenerated clock signal.

At step S302 in FIG. 12, before the rotating part starts performing the rotating operation, the first coupler 811 and the second coupler 812 are disposed in the first segment 701. In this situation, the phase adjusting unit 951 generates the fifth regenerated clock signal group having the different phases from the second regenerated clock signal.

At step S303 in FIG. 12, the phase comparing unit 960 detects, while the first coupler 811 and the second coupler 812 are positioned in the second segment 702, the phase differences between the first regenerated clock signal and the fifth regenerated clock signal group and further determines one of the fifth regenerated clock signals having the smallest phase difference from the first regenerated clock signal as the first phase difference regenerated clock signal (the fifth regenerated clock signal_θseg1).

Further, at step S304 in FIG. 12, the first coupler 811 and the second coupler 812 are disposed in the second segment 702. In this situation, the phase adjusting unit 951 generates the fifth regenerated clock signal group having the different phases from the second regenerated clock signal.

At step S305 in FIG. 12, the phase comparing unit 960 detects, while the first coupler 811 and the second coupler 812 are positioned in the first segment 701, the phase differences between the first regenerated clock signal and the fifth regenerated clock signal group and further determines one of the fifth regenerated clock signals having the smallest phase difference from the first regenerated clock signal as the second phase difference regenerated clock signal (the fifth regenerated clock signal_θseg2).

At step S306 in FIG. 12, in accordance with the control signal for rotating the rotating part (the rotating frame 13), as a control signal output from the console apparatus 40 (e.g., the system controlling function 440 of the processing circuitry 44), the controlling apparatus 15 causes the rotating part to start rotating.

At step S307 in FIG. 12, the controlling apparatus 15 judges whether or not the input end of the ring transmission path 700 has passed by the first coupler 811, on the basis of the rotation angle of the rotating part, for example. In other words, the controlling apparatus 15 judges whether or not the positioning state of the first coupler 811 is switched from being at the second segment 702 to being at the first segment 701. When the input end has not passed by the first coupler 811, the processing in FIG. 12 proceeds to step S309. On the contrary, when the input end has passed by the first coupler 811, the processing in FIG. 12 proceeds to step S308.

At step S308 in FIG. 12, the controlling apparatus 15 determines that it is switching timing and outputs a clock selection instruction. In accordance with the clock selection instruction, the clock switching unit 930 switches the data judgment clock signal from the first regenerated clock signal into the first phase difference regenerated clock signal (the fifth regenerated clock signal_θseg1).

At step S309 in FIG. 12, the controlling apparatus 15 judges whether or not the terminal end of the ring transmission path 700 has passed by the first coupler 811, on the basis of the rotation angle of the rotating part, for example. In other words, the controlling apparatus 15 judges whether or not the positioning state of the first coupler 811 switches from being at the first segment 701 to being at the second segment 702. When the terminal end has not passed by the first coupler 811, the processing in FIG. 12 returns to step S307. On the contrary, when the terminal end has passed by the first coupler 811, the processing in FIG. 12 proceeds to step S310.

At step S310 in FIG. 12, the controlling apparatus 15 determines that it is switching timing and outputs a clock selection instruction. In accordance with the clock selection instruction, the clock switching unit 930 switches the data judgment clock signal from the first regenerated clock signal into the second phase difference regenerated clock signal (the fifth regenerated clock signal_θseg2).

At step S311 in FIG. 12, the clock switching unit 930 judges whether or not the response time Δtr of the second clock regenerating unit 922 has elapsed since the data judgment clock signal was switched from the first regenerated clock signal into either the first phase difference regenerated clock signal (the fifth regenerated clock signal_θseg1) or the second phase difference regenerated clock signal (the fifth regenerated clock signal_θseg2). When the response time Δtr has not elapsed, the processing in FIG. 12 returns to step S311. When the response time Δtr has elapsed, the processing in FIG. 12 proceeds to step S312.

At step S312 in FIG. 12, the clock switching unit 930 switches the data judgment clock signal from either the first phase difference regenerated clock signal (the fifth regenerated clock signal_θseg1) or the second phase difference regenerated clock signal (the fifth regenerated clock signal_θseg2) into the first regenerated clock signal.

At step S313 in FIG. 12, the controlling apparatus 15 judges whether or not the control signal for stopping the rotation of the rotating part has been received, as a control signal output from the console apparatus 40. When the controlling apparatus 15 has not received the control signal, the processing in FIG. 12 returns to step S307. On the contrary, when the controlling apparatus 15 has received the control signal, the processing in FIG. 12 ends.

As explained above, in the communication apparatus 800 according to the fourth embodiment, as the first switching process, the clock switching unit 930 is configured, to begin with, to set the data judgment clock signal to be the first regenerated clock signal. Further, when the input end of the ring transmission path 700 has passed by the first coupler 811, the clock switching unit 930 is configured to switch the data judgment clock signal from the first regenerated clock signal into the first phase difference regenerated clock signal (the fifth regenerated clock signal_θseg1). When the response time Δtr of the second clock regenerating unit 922 has elapsed since the input end passed by the first coupler 811, the clock switching unit 930 is configured to switch the data judgment clock signal from the first phase difference regenerated clock signal (the fifth regenerated clock signal_θseg1) into the first regenerated clock signal. Also, when the terminal end of the ring transmission path 700 has passed by the first coupler 811, the clock switching unit 930 is configured to switch the data judgment clock signal from the first regenerated clock signal into the second phase difference regenerated clock signal (the fifth regenerated clock signal_θseg2). When the response time Δtr of the second clock regenerating unit 922 has elapsed since the terminal end passed by the first coupler 811, the clock switching unit 930 is configured to switch the data judgment clock signal from the second phase difference regenerated clock signal (the fifth regenerated clock signal_θseg2) into the first regenerated clock signal. With this configuration, the communication apparatus 800 according to the fourth embodiment is able to reduce the impacts of changes in the Doppler shift amounts and to inhibit the degradation of the reception capabilities.

Fifth Embodiment

Figure 13:
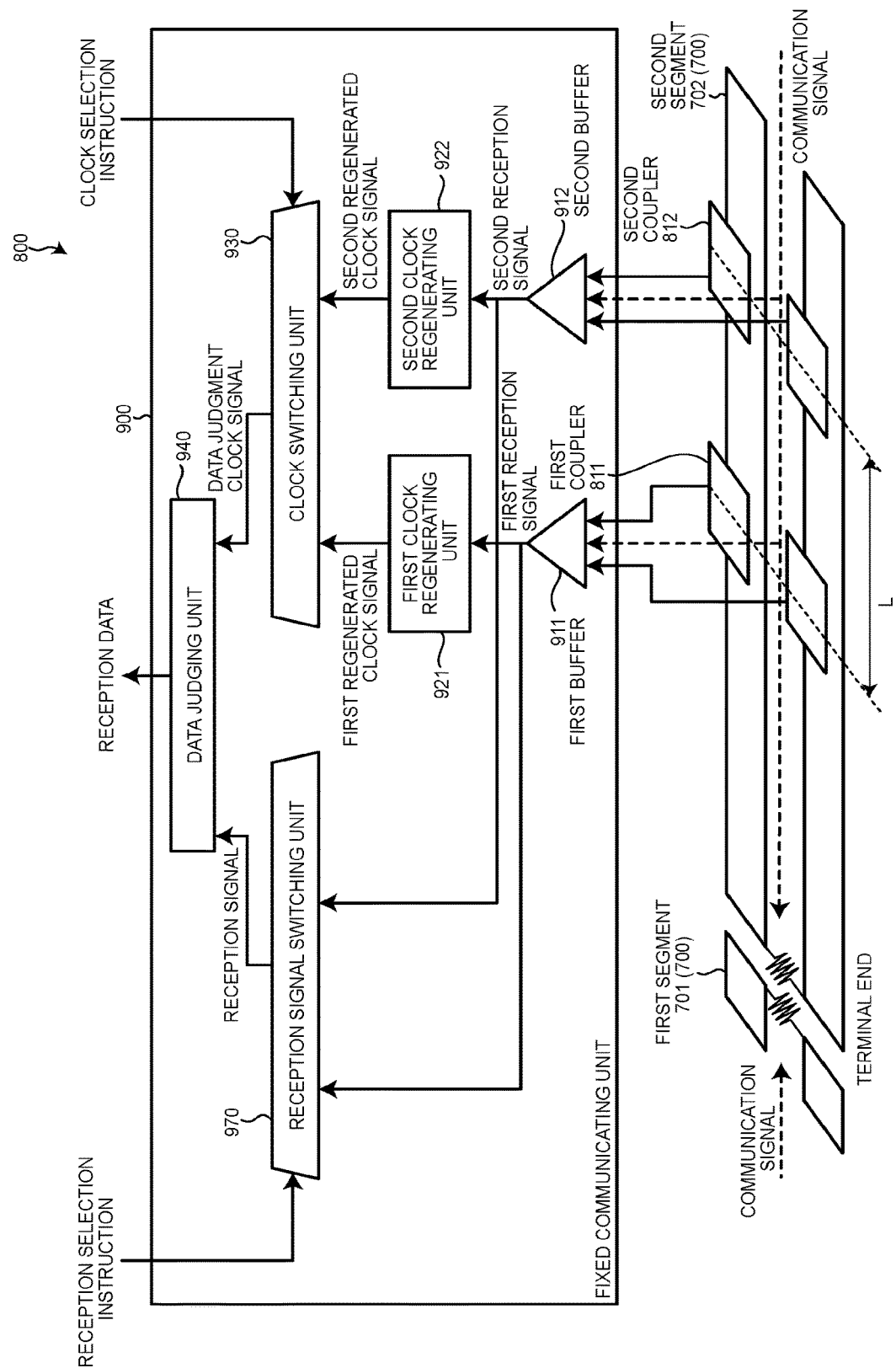
FIG. 13 is a diagram illustrating an exemplary configuration of a communication apparatus according to a fifth embodiment.

FIG. 13 is a diagram illustrating an exemplary configuration of the communication apparatus 800 according to a fifth embodiment. In the fifth embodiment, changes from the first embodiment or the second embodiment will be explained.

As illustrated in FIG. 13, the communication apparatus 800 further includes a reception signal switching unit 970. The first embodiment was described on the premise that the rotating directions of the rotating part, the rotating communicating unit 610, and the ring transmission path 700 are each the single direction (the clockwise direction in the example in FIG. 2). In the fifth embodiment, by further providing the reception signal switching unit 970 so as to be able to make the data judgment not only with the transmission data (the first reception signal) received by the first coupler 811 but also with the transmission data (the second reception signal) received by the second coupler 812, it is possible to address the rotations in both directions.

On the basis of the rotating direction, the reception signal switching unit 970 is configured to select transmission data (a reception signal) from between the transmission data (the first reception signal) received by the first coupler 811 and the transmission data (the second reception signal) received by the second coupler 812. The reception signal switching unit 970 is an example of the "transmission data switching unit".

Figure 14A:
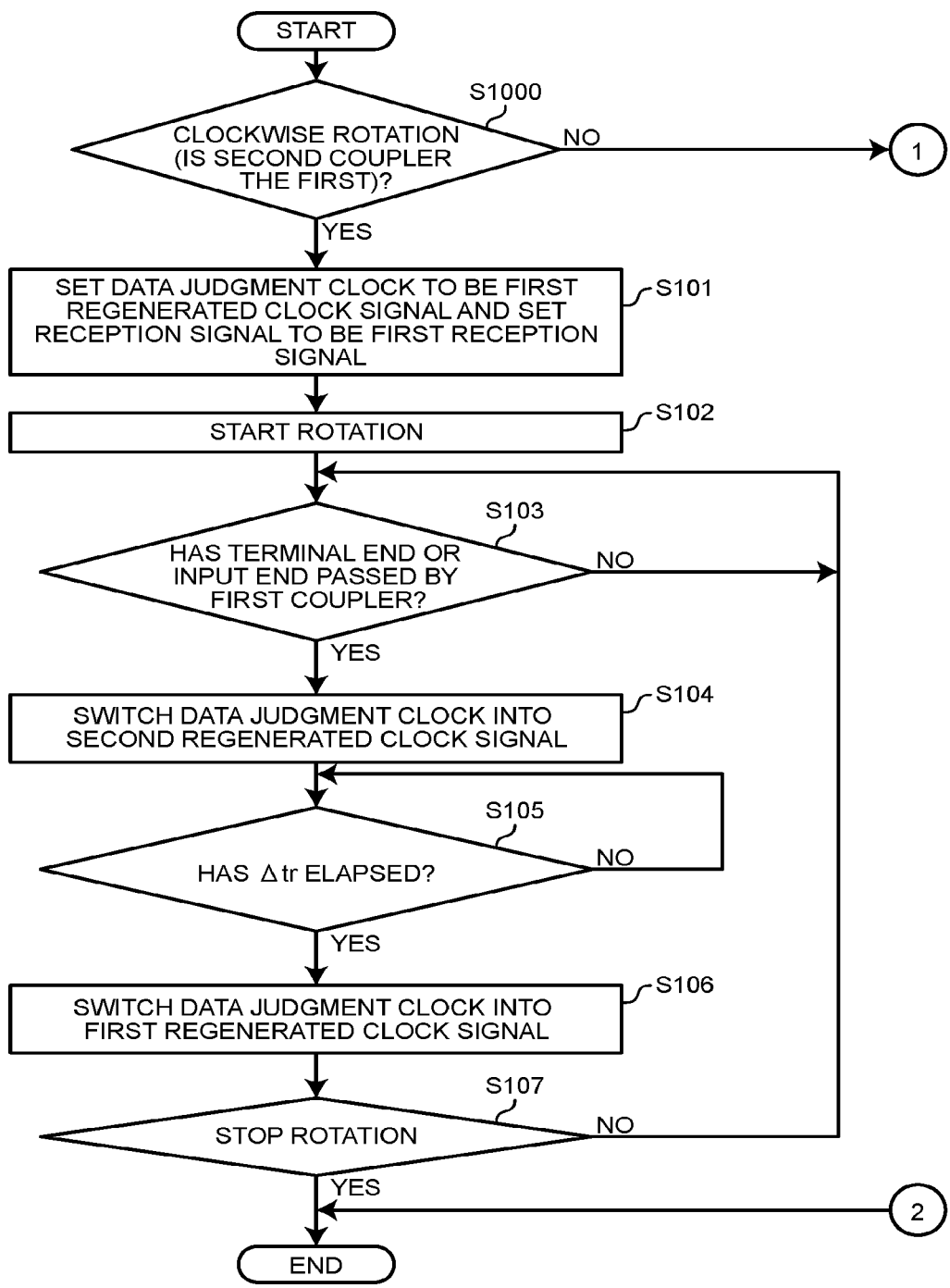
FIG. 14A is a flowchart illustrating processes performed by the communication apparatus according to the fifth embodiment.
Figure 14B:
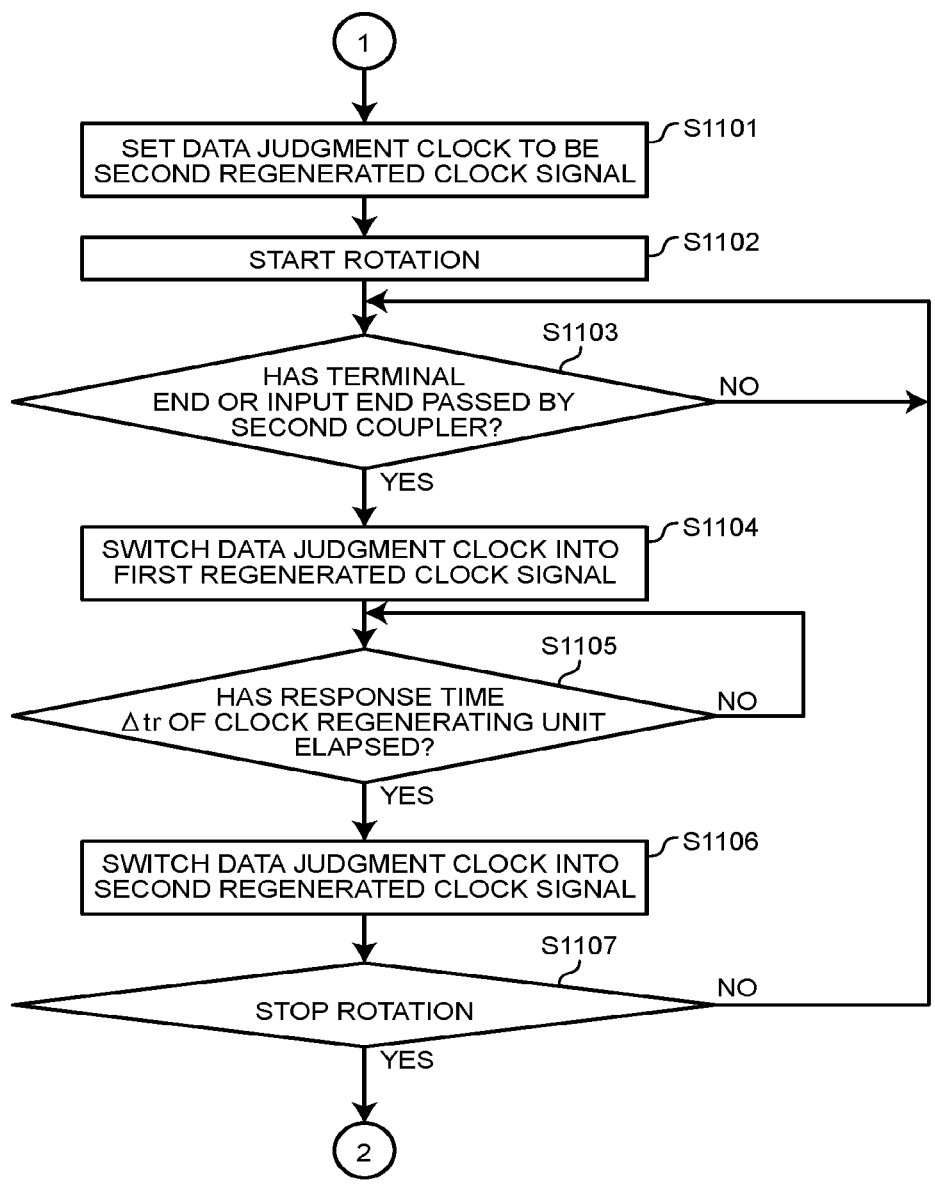
FIG. 14B is another flowchart illustrating the processes performed by the communication apparatus according to the fifth embodiment.

FIGS. 14A and 14B are flowcharts illustrating processes (the first switching process and a second switching process) performed by the communication apparatus 800 according to the fifth embodiment.

At step S1000 in FIG. 14A, the controlling apparatus 15 judges whether a control signal for setting the rotating direction of the rotating part to be the clockwise direction (a configuration in which the second coupler 812 is to receive the transmission data earlier) has been received or a control signal for setting the rotating direction of the rotating part to be the counterclockwise direction (a configuration in which the first coupler 811 is to receive the transmission data earlier) has been received, as a control signal output from the console apparatus 40. When the controlling apparatus 15 has received the control signal for setting the rotating direction of the rotating part to be the clockwise direction, the processing in FIG. 14A proceeds to the first switching process (steps S101 through S107 in FIG. 14A). On the contrary, when the controlling apparatus 15 has received the control signal for setting the rotating direction of the rotating part to be the counterclockwise direction, the processing in FIG. 14A proceeds to the second switching process (steps S1101 through S1107 in FIG. 14B).

While the reception signal switching unit 970 is selecting the transmission data received by the first coupler 811, the clock switching unit 930 performs the first switching process (steps S101 through S107 in FIG. 14A). The first switching process in the fifth embodiment (steps S101 through S107 in FIG. 14A) corresponds to the first switching process in the first embodiment (steps S101 through S107 in FIG. 5).

More specifically, to begin with, in the first switching process in the fifth embodiment, at step S101 in FIG. 14A, the clock switching unit 930 sets the data judgment clock signal to be the first regenerated clock signal. The reception signal switching unit 970 sets the reception signal to be received, as the transmission data (the first reception signal) received by the first coupler 811. After that, at steps S102 through S107 in FIG. 14A, the same processes as those at steps S102 through S107 in FIG. 5 are performed.

While the reception signal switching unit 970 is selecting the transmission data received by the second coupler 812, the clock switching unit 930 performs the second switching process (steps S1101 through S1107 in FIG. 14B).

More specifically, to begin with, at step S1101 in FIG. 14B, the clock switching unit 930 sets the data judgment clock signal to be the second regenerated clock signal. The reception signal switching unit 970 sets the reception signal to be received, as the transmission data (the second reception signal) received by the second coupler 812.

At step S1102 in FIG. 14B, in accordance with the control signal for rotating the rotating part (the rotating frame 13), as a control signal output from the console apparatus 40 (e.g., the system controlling function 440 of the processing circuitry 44), the controlling apparatus 15 causes the rotating part to start rotating.

At step S1103 in FIG. 14B, the controlling apparatus 15 judges whether or not a division part (the input end or the terminal end) of the ring transmission path 700 has passed by the second coupler 812, on the basis of the rotation angle of the rotating part, for example. When neither the input end nor the terminal end has passed by the second coupler 812, the processing in FIG. 14B returns to step S1103. On the contrary, when one of the input end and the terminal end has passed by the second coupler 812, the processing in FIG. 14B proceeds to step S1104.

At step S1104 in FIG. 14B, the controlling apparatus 15 determines that it is switching timing and outputs a clock selection instruction. In accordance with the clock selection instruction, the clock switching unit 930 switches the data judgment clock signal from the second regenerated clock signal into the first regenerated clock signal.

At step S1105 in FIG. 14B, the clock switching unit 930 judges whether or not the response time Δtr of the first clock regenerating unit 921 has elapsed since the data judgment clock signal was switched from the second regenerated clock signal into the first regenerated clock signal. When the response time Δtr has not elapsed, the processing in FIG. 14B returns to step S1105. When the response time Δtr has elapsed, the processing in FIG. 14B proceeds to step S1106.

At step S1106 in FIG. 14B, the clock switching unit 930 switches the data judgment clock signal from the first regenerated clock signal into the second regenerated clock signal.

At step S1107 in FIG. 14B, the controlling apparatus 15 judges whether or not the control signal for stopping the rotation of the rotating part has been received, as a control signal output from the console apparatus 40. When the controlling apparatus 15 has not received the control signal, the processing in FIG. 14B returns to step S1103. On the contrary, when the controlling apparatus 15 has received the control signal, the processing in FIG. 14B ends.

As explained above, the communication apparatus 800 according to the fifth embodiment is able to realize the advantageous effects of the first embodiment or the second embodiment and is also able to address the rotations in both directions.

Sixth Embodiment

Figure 15:
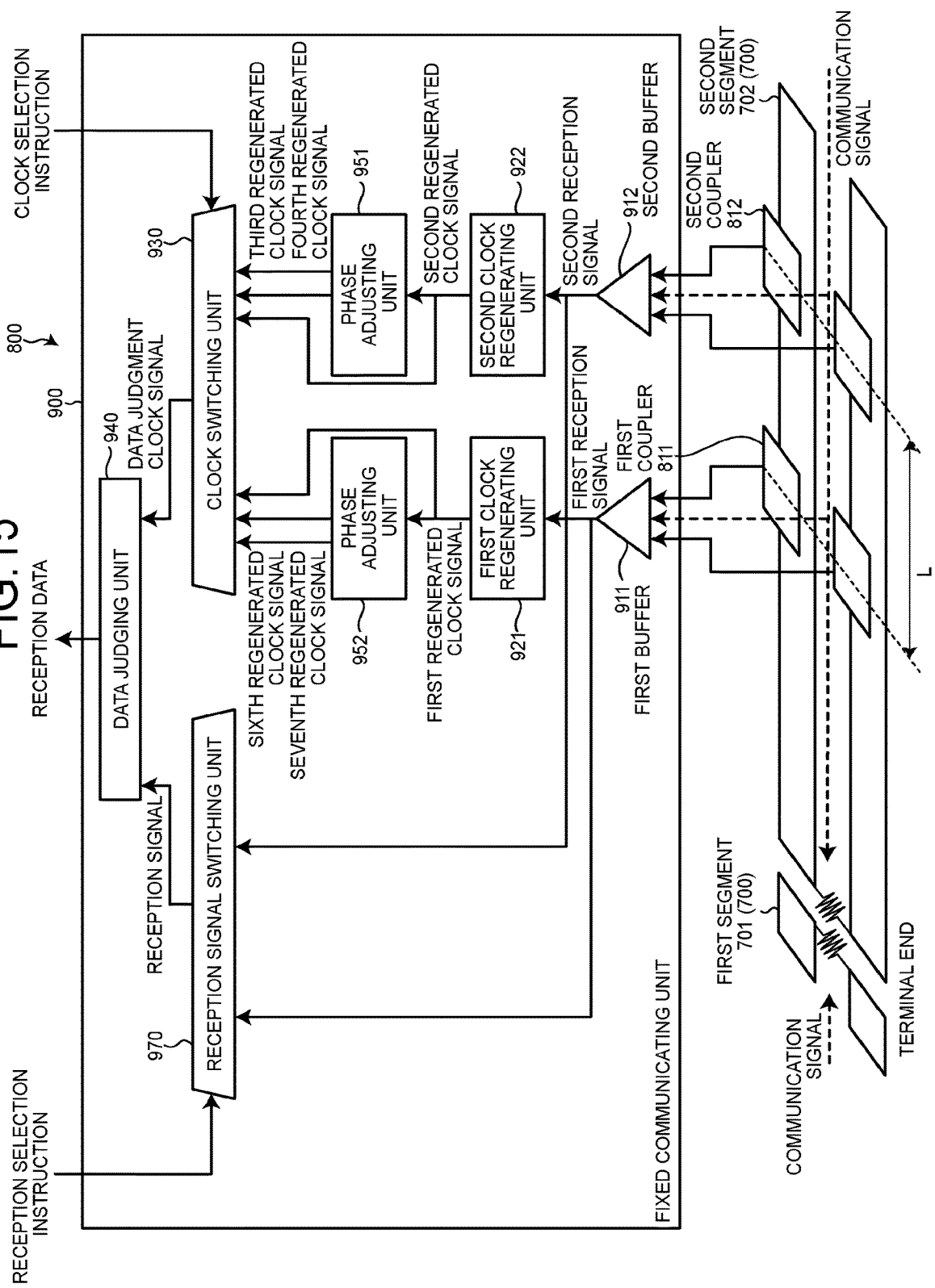
FIG. 15 is a diagram illustrating an exemplary configuration of a communication apparatus according to a sixth embodiment.

FIG. 15 is a diagram illustrating an exemplary configuration of the communication apparatus 800 according to a sixth embodiment. In the sixth embodiment, changes from the third embodiment will be explained.

As illustrated in FIG. 15, the communication apparatus 800 further includes the reception signal switching unit 970 and a phase adjusting unit 952. In the sixth embodiment, by further providing the reception signal switching unit 970 and the phase adjusting unit 952 so as to be able to make the data judgment not only with the transmission data (the first reception signal) received by the first coupler 811, but also with the transmission data (the second reception signal) received by the second coupler 812, it is possible to address the rotations in both directions.

On the basis of the rotating direction, the reception signal switching unit 970 is configured to select transmission data (a reception signal) from between the transmission data (the first reception signal) received by the first coupler 811 and the transmission data (the second reception signal) received by the second coupler 812. The reception signal switching unit 970 is an example of the "transmission data switching unit".

The phase adjusting unit 952 is configured to generate a sixth regenerated clock signal advanced by the prescribed phase difference θ and a seventh regenerated clock signal delayed by the prescribed phase difference θ as compared to the first regenerated clock signal, the prescribed phase difference θ being determined on the basis of the isolation distance L.

Figure 16A:
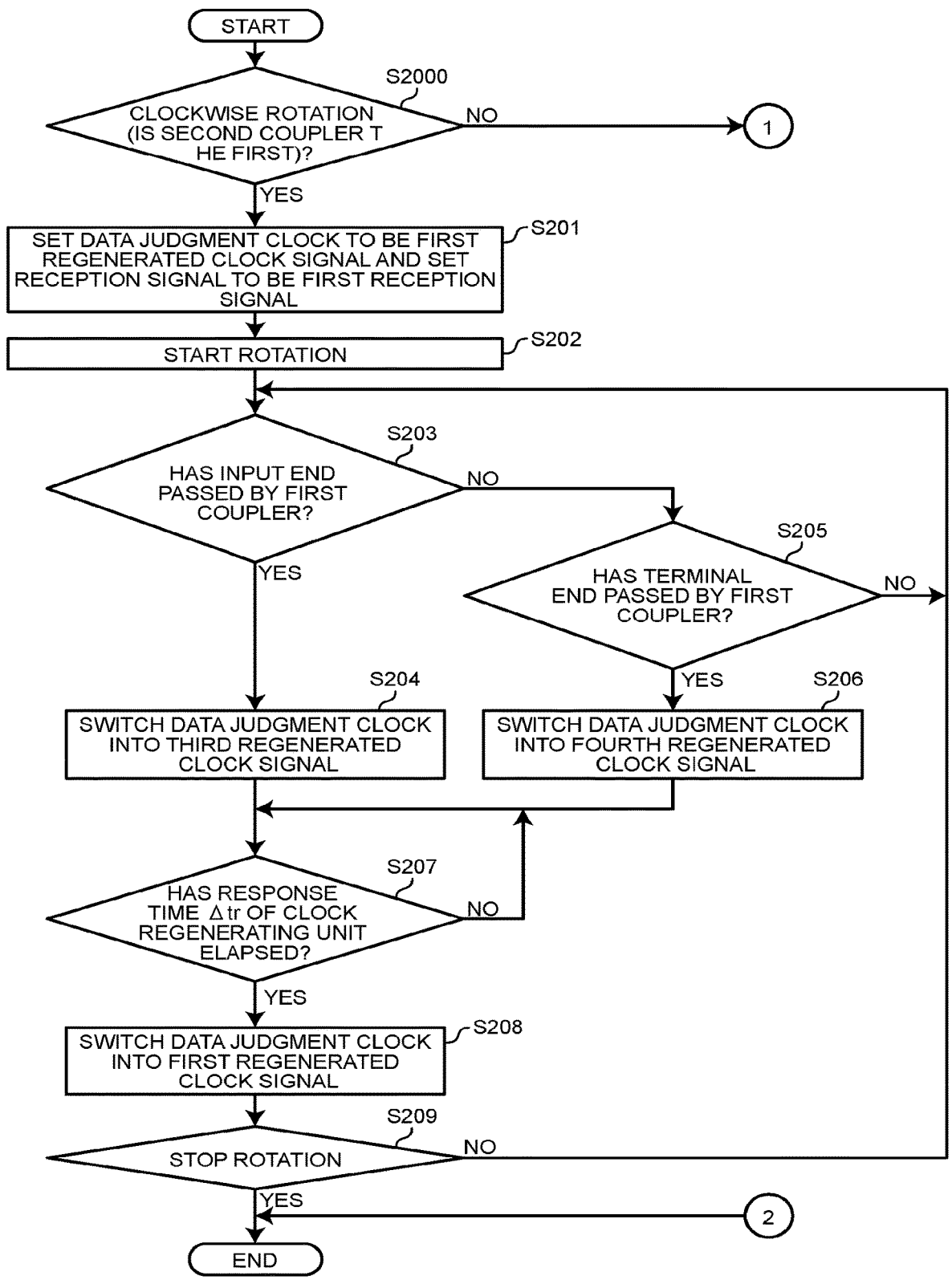
FIG. 16A is a flowchart illustrating processes performed by the communication apparatus according to the sixth embodiment.
Figure 16B:
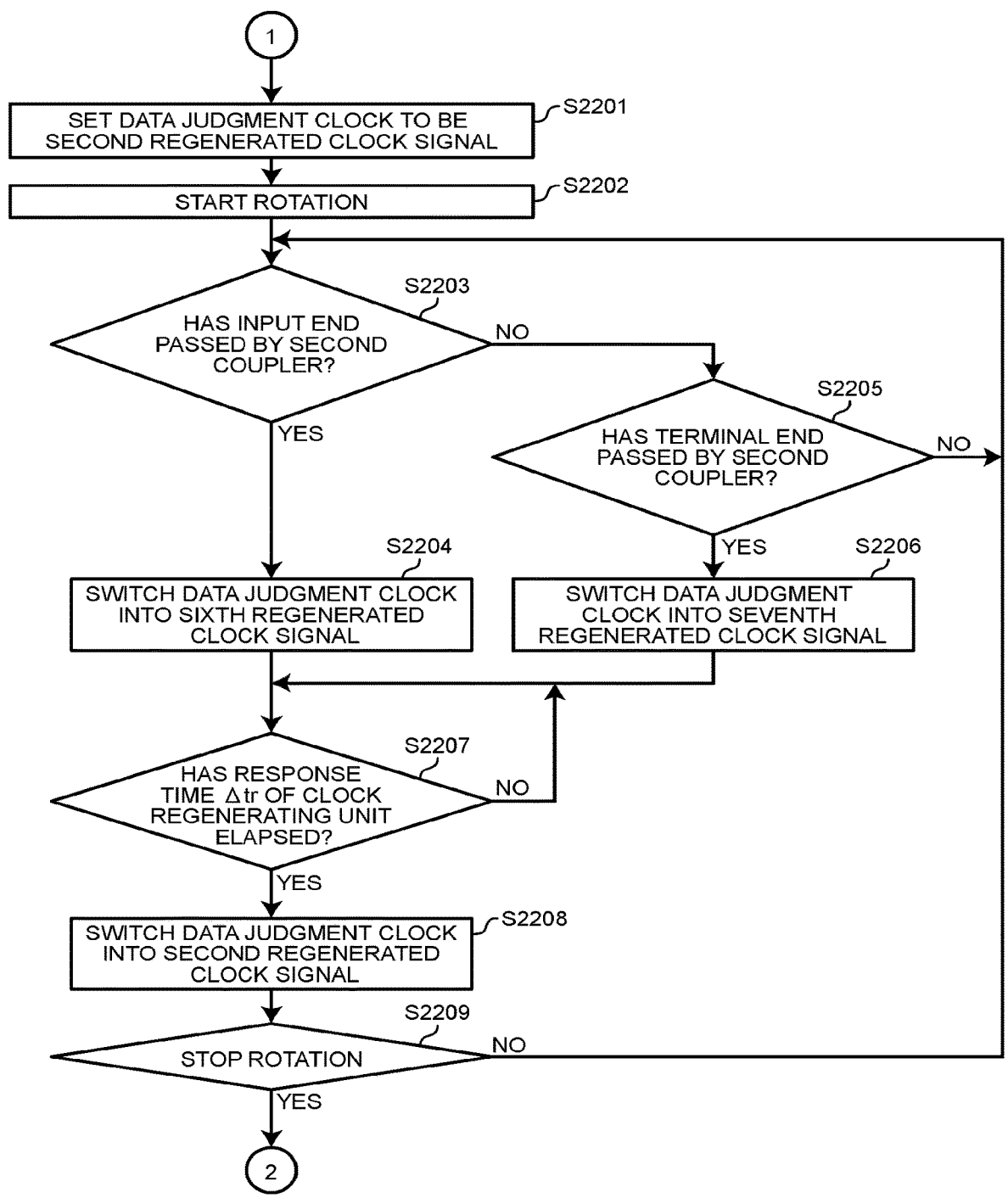
FIG. 16B is another flowchart illustrating the processes performed by the communication apparatus according to the sixth embodiment.

FIG. 16A and FIG. 16B are flowcharts illustrating processes (the first switching process and the second switching process) performed by the communication apparatus 800 according to the sixth embodiment.

At step S2000 in FIG. 16A, the controlling apparatus 15 judges whether a control signal for setting the rotating direction of the rotating part to be the clockwise direction (a configuration in which the second coupler 812 is to receive the transmission data earlier) has been received or a control signal for setting the rotating direction of the rotating part to be the counterclockwise direction (a configuration in which the first coupler 811 is to receive the transmission data earlier) has been received, as a control signal output from the console apparatus 40. When the controlling apparatus 15 has received the control signal for setting the rotating direction of the rotating part to be the clockwise direction, the processing in FIG. 16A proceeds to the first switching process (steps S201 through S209 in FIG. 16A). On the contrary, when the controlling apparatus 15 has received the control signal for setting the rotating direction of the rotating part to be the counterclockwise direction, the processing in FIG. 16A proceeds to the second switching process (steps S2201 through S2209 in FIG. 16B).

While the reception signal switching unit 970 is selecting the transmission data received by the first coupler 811, the clock switching unit 930 performs the first switching process (steps S201 through S209 in FIG. 16A). The first switching process in the sixth embodiment (steps S201 through S209 in FIG. 16A) corresponds to the first switching process in the third embodiment (steps S201 through S209 in FIG. 9).

More specifically, to begin with, in the first switching process in the sixth embodiment, at step S201 in FIG. 16A, the clock switching unit 930 sets the data judgment clock signal to be the first regenerated clock signal. The reception signal switching unit 970 sets the reception signal to be received, as the transmission data (the first reception signal) received by the first coupler 811. After that, at steps S202 through S209 in FIG. 16A, the same processes as those at steps S202 through S209 in FIG. 9 are performed.

While the reception signal switching unit 970 is selecting the transmission data received by the second coupler 812, the clock switching unit 930 performs the second switching process (steps S2201 through S2209 in FIG. 16B).

More specifically, to begin with, at step S2201 in FIG. 16B, the clock switching unit 930 sets the data judgment clock signal to be the second regenerated clock signal. The reception signal switching unit 970 sets the reception signal to be received, as the transmission data (the second reception signal) received by the second coupler 812.

At step S2202 in FIG. 16B, in accordance with the control signal for rotating the rotating part (the rotating frame 13), as a control signal output from the console apparatus 40 (e.g., the system controlling function 440 of the processing circuitry 44), the controlling apparatus 15 causes the rotating part to start rotating.

At step S2203 in FIG. 16B, the controlling apparatus 15 judges whether or not the input end of the ring transmission path 700 has passed by the second coupler 812, on the basis of the rotation angle of the rotating part, for example. When the input end has not passed by the second coupler 812, the processing in FIG. 16B proceeds to step S2205. On the contrary, when the input end has passed by the second coupler 812, the processing in FIG. 16B proceeds to step S2204.

At step S2204 in FIG. 16B, the controlling apparatus 15 determines that it is switching timing and outputs a clock selection instruction. In accordance with the clock selection instruction, the clock switching unit 930 switches the data judgment clock signal from the second regenerated clock signal into the sixth regenerated clock signal.

At step S2205 in FIG. 16B, the controlling apparatus 15 judges whether or not the terminal end of the ring transmission path 700 has passed by the second coupler 812, on the basis of the rotation angle of the rotating part, for example. When the terminal end has not passed by the second coupler 812, the processing in FIG. 16B returns to step S2203.

On the contrary, when the terminal end has passed by the second coupler 812, the processing in FIG. 16B proceeds to step S2206.

At step S2206 in FIG. 16B, the controlling apparatus 15 determines that it is switching timing and outputs a clock selection instruction. In accordance with the clock selection instruction, the clock switching unit 930 switches the data judgment clock signal from the second regenerated clock signal into the seventh regenerated clock signal.

At step S2207 in FIG. 16B, the clock switching unit 930 judges whether or not the response time $\Delta tr$ of the first clock regenerating unit 921 has elapsed since the data judgment clock signal was switched from the second regenerated clock signal into either the sixth regenerated clock signal or the seventh regenerated clock signal. When the response time $\Delta tr$ has not elapsed, the processing in FIG. 16B returns to step S2207. When the response time $\Delta tr$ has elapsed, the processing in FIG. 16B proceeds to step S2208.

At step S2208 in FIG. 16B, the clock switching unit 930 switches the data judgment clock signal from either the sixth regenerated clock signal or the seventh regenerated clock signal into the second regenerated clock signal.

At step S2209 in FIG. 16B, the controlling apparatus 15 judges whether or not the control signal for stopping the rotation of the rotating part has been received, as a control signal output from the console apparatus 40. When the controlling apparatus 15 has not received the control signal, the processing in FIG. 16B returns to step S203. On the contrary, when the controlling apparatus 15 has received the control signal, the processing in FIG. 16B ends.

As explained above, the communication apparatus 800 according to the sixth embodiment is able to realize the advantageous effects of the third embodiment and is also able to address the rotations in both directions.

Seventh Embodiment

Figure 17:
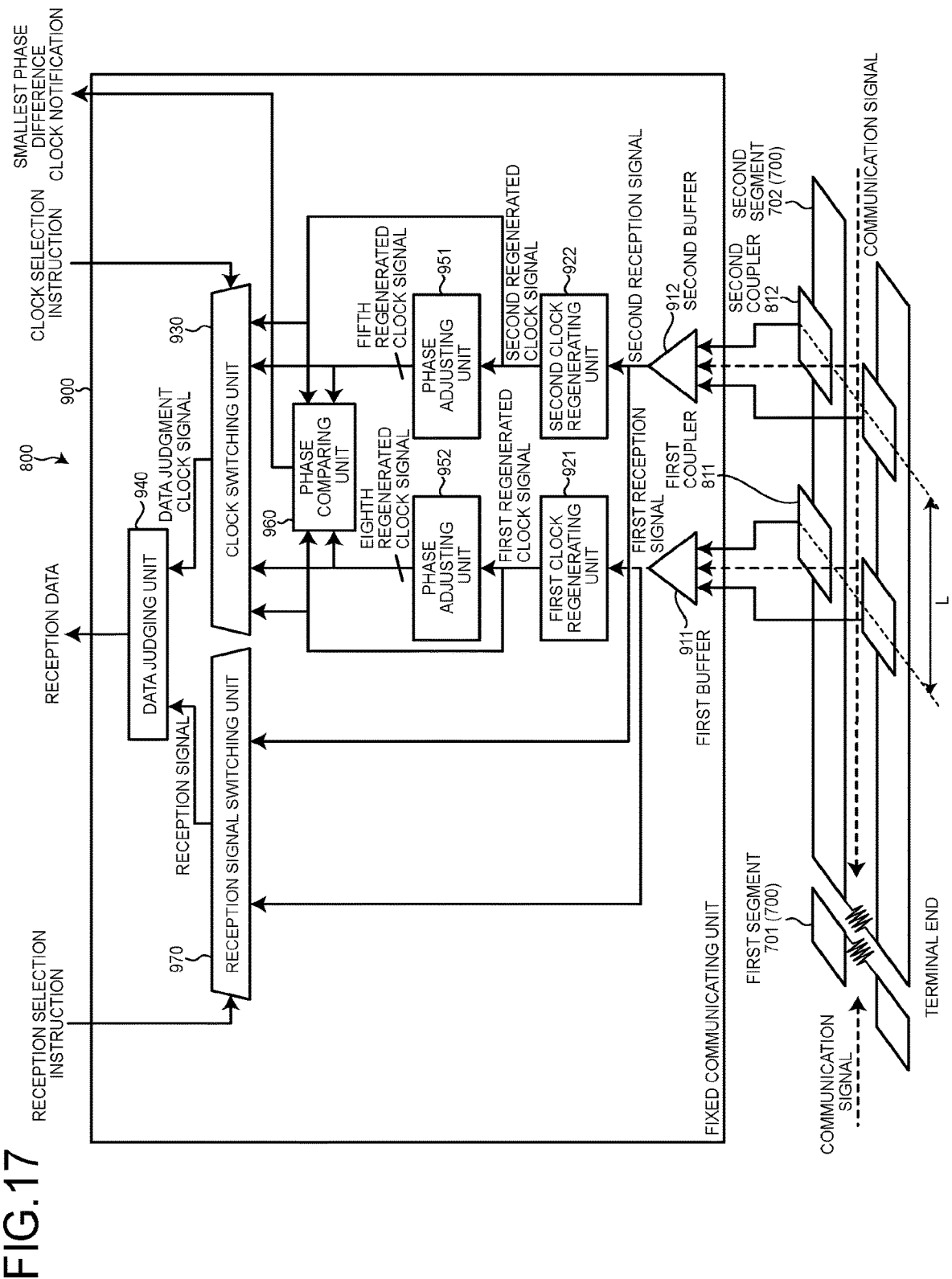
FIG. 17 is a diagram illustrating an exemplary configuration of a communication apparatus according to a seventh embodiment.

FIG. 17 is a diagram illustrating an exemplary configuration of the communication apparatus 800 according to a seventh embodiment. In the seventh embodiment, changes from the fourth embodiment will be explained.

As illustrated in FIG. 17, the communication apparatus 800 further includes the reception signal switching unit 970 and the phase adjusting unit 952. In the seventh embodiment, by further providing the reception signal switching unit 970 and the phase adjusting unit 952 so as to be able to make the data judgment not only with the transmission data (the first reception signal) received by the first coupler 811, but also with the transmission data (the second reception signal) received by the second coupler 812, it is possible to address the rotations in both directions.

On the basis of the rotating direction, the reception signal switching unit 970 is configured to select transmission data (a reception signal) from between the transmission data (the first reception signal) received by the first coupler 811 and the transmission data (the second reception signal) received by the second coupler 812. The reception signal switching unit 970 is an example of the "transmission data switching unit".

Before the rotating part starts performing the rotating operation, the phase adjusting unit 952 is configured to generate an eighth regenerated clock signal group having different phases from the first regenerated clock signal.

While the first coupler 811 and the second coupler 812 are positioned in the second segment 702, the phase comparing unit 960 is configured to detect the phase differences between the first regenerated clock signal and the eighth regenerated clock signal group and to determine one of eighth regenerated clock signals having the smallest phase difference from the first regenerated clock signal as a third phase difference regenerated clock signal (an eighth regenerated clock signal_θseg2). After that, the phase comparing unit 960 is configured to output the third phase difference regenerated clock signal (the eighth regenerated clock signal_θseg2) to the controlling apparatus 15 as a smallest phase difference clock notification.

While the first coupler 811 and the second coupler 812 are positioned in the first segment 701, the phase comparing unit 960 is configured to detect the phase differences between the first regenerated clock signal and the eighth regenerated clock signal group and to determine one of the eighth regenerated clock signals having the smallest phase difference from the first regenerated clock signal as a fourth phase difference regenerated clock signal (an eighth regenerated clock signal_θseg1). After that, the phase comparing unit 960 is configured to output the fourth phase difference regenerated clock signal (the eighth regenerated clock signal_θseg1) to the controlling apparatus 15 as a smallest phase difference clock notification.

Figure 18A:
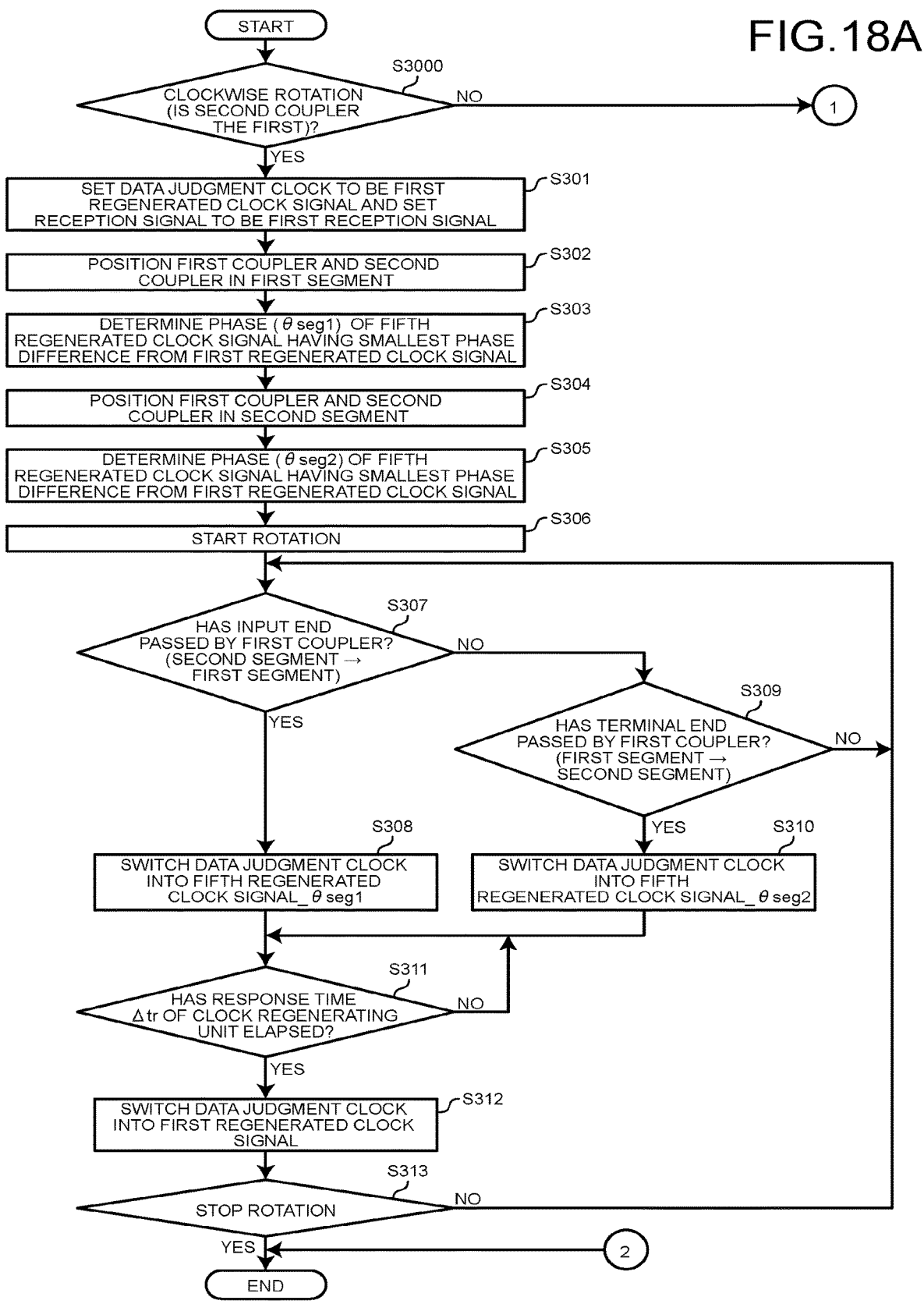
FIG. 18A is a flowchart illustrating a process performed by the communication apparatus according to the seventh embodiment.
Figure 18B:
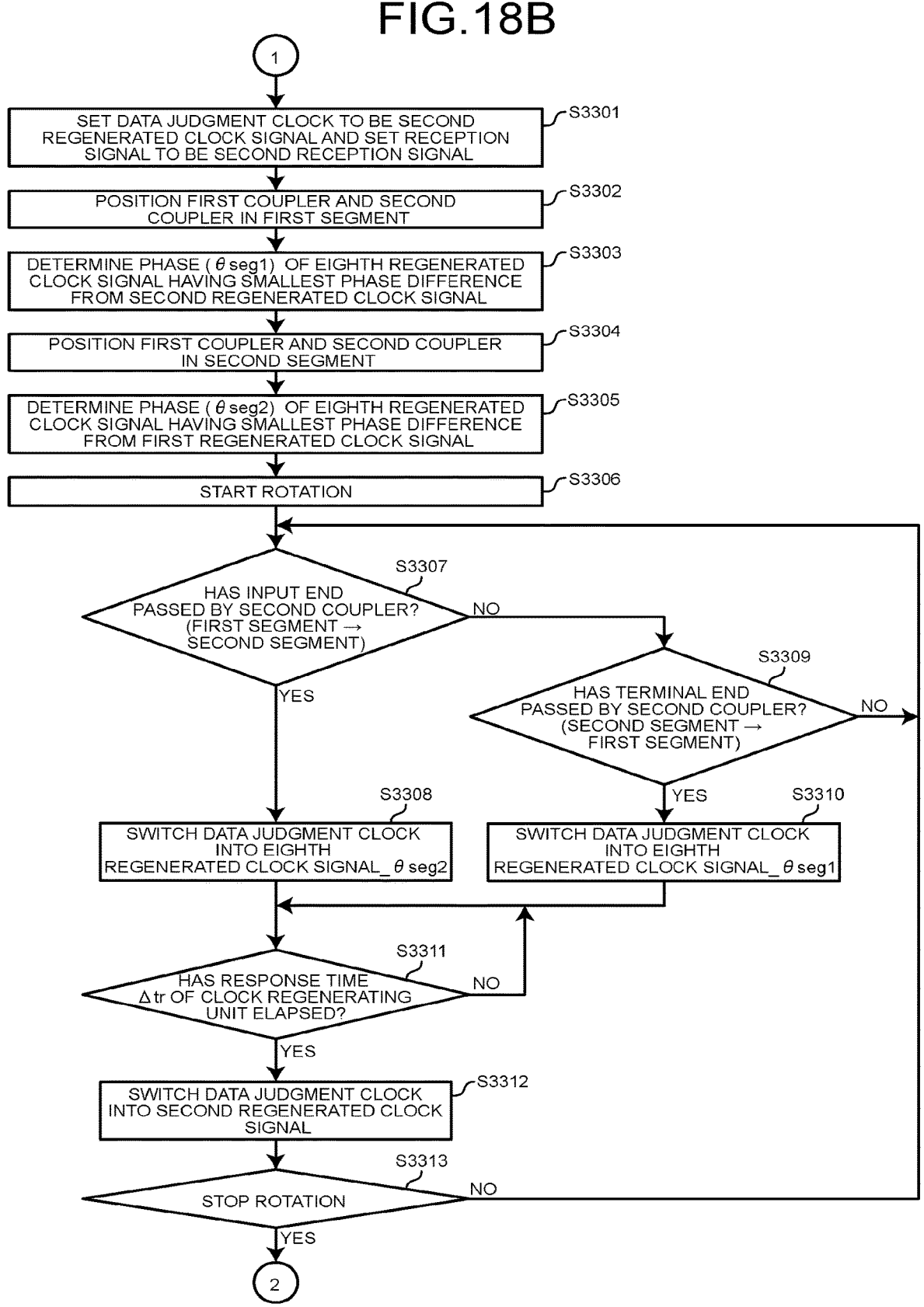
FIG. 18B is another flowchart illustrating the process performed by the communication apparatus according to the seventh embodiment.

FIGS. 18A and 18B are flowcharts illustrating a process performed by the communication apparatus 800 according to the seventh embodiment.

At step S3000 in FIG. 18A, the controlling apparatus 15 judges whether a control signal for setting the rotating direction of the rotating part to be the clockwise direction (a configuration in which the second coupler 812 is to receive the transmission data earlier) has been received or a control signal for setting the rotating direction of the rotating part to be the counterclockwise direction (a configuration in which the first coupler 811 is to receive the transmission data earlier) has been received, as a control signal output from the console apparatus 40. When the controlling apparatus 15 has received the control signal for setting the rotating direction of the rotating part to be the clockwise direction, the processing in FIG. 18A proceeds to the first switching process (steps S301 through S313 in FIG. 18A). On the contrary, when the controlling apparatus 15 has received the control signal for setting the rotating direction of the rotating part to be the counterclockwise direction, the processing in FIG. 18A proceeds to the second switching process (steps S3301 through S3313 in FIG. 18B).

While the reception signal switching unit 970 is selecting the transmission data received by the first coupler 811, the clock switching unit 930 performs the first switching process (steps S301 through S313 in FIG. 18A). The first switching process in the seventh embodiment (steps S301 through S313 in FIG. 18A) corresponds to the first switching process in the fourth embodiment (steps S301 through S313 in FIG. 12).

More specifically, to begin with, in the first switching process in the seventh embodiment, at step S301 in FIG. 18A, the clock switching unit 930 sets the data judgment clock signal to be the first regenerated clock signal. The reception signal switching unit 970 sets the reception signal to be received, as the transmission data (the first reception signal) received by the first coupler 811. After that, at steps S302 through S313 in FIG. 18A, the same processes as those at steps S302 through S313 in FIG. 12 are performed.

While the reception signal switching unit 970 is selecting the transmission data received by the second coupler 812, the clock switching unit 930 performs the second switching process (steps S3301 through S3313 in FIG. 18B).

More specifically, to begin with, at step S3301 in FIG. 18B, the clock switching unit 930 sets the data judgment clock signal to be the second regenerated clock signal. The reception signal switching unit 970 sets the reception signal to be received, as the transmission data (the second reception signal) received by the second coupler 812.

At step S3302 in FIG. 18B, before the rotating part starts performing the rotating operation, the first coupler 811 and the second coupler 812 are disposed in the first segment 701. In this situation, the phase adjusting unit 951 generates the eighth regenerated clock signal group having the different phases from the first regenerated clock signal.

At step S3303 in FIG. 18B, the phase comparing unit 960 detects, while the first coupler 811 and the second coupler 812 are positioned in the second segment 702, the phase differences between the first regenerated clock signal and the eighth regenerated clock signal group and further determines one of the eighth regenerated clock signals having the smallest phase difference from the second regenerated clock signal as the third phase difference regenerated clock signal (the eighth regenerated clock signal_θseg2).

Also, at step S3304 in FIG. 18B, the first coupler 811 and the second coupler 812 are disposed in the second segment 702. In this situation, the phase adjusting unit 951 is configured to generate the eighth regenerated clock signal group having the different phases from the first regenerated clock signal.

At step S3305 in FIG. 18B, the phase comparing unit 960 detects, while the first coupler 811 and the second coupler 812 are positioned in the first segment 701, the phase differences between the first regenerated clock signal and the eighth regenerated clock signal group and further determines one of the eighth regenerated clock signals having the smallest phase difference from the first regenerated clock signal as the fourth phase difference regenerated clock signal (the eighth regenerated clock signal_θseg1).

At step S3306 in FIG. 18B, in accordance with the control signal for rotating the rotating part (the rotating frame 13), as a control signal output from the console apparatus 40 (e.g., the system controlling function 440 of the processing circuitry 44), the controlling apparatus 15 causes the rotating part to start rotating.

At step S3307 in FIG. 18B, the controlling apparatus 15 judges whether or not the input end of the ring transmission path 700 has passed by the second coupler 812, on the basis of the rotation angle of the rotating part, for example. In other words, the controlling apparatus 15 judges whether or not the positioning state of the second coupler 812 is switched from being at the first segment 701 to being at the second segment 702. When the input end has not passed by the second coupler 812, the processing in FIG. 18B proceeds to step S3309. On the contrary, when the input end has passed by the second coupler 812, the processing in FIG. 18B proceeds to step S3308.

At step S3308 in FIG. 18B, the controlling apparatus 15 determines that it is switching timing and outputs a clock selection instruction. In accordance with the clock selection instruction, the clock switching unit 930 switches the data judgment clock signal from the second regenerated clock signal into the third phase difference regenerated clock signal (the eighth regenerated clock signal_θseg2).

At step S3309 in FIG. 18B, the controlling apparatus 15 judges whether or not the terminal end of the ring transmission path 700 has passed by the second coupler 812, on the basis of the rotation angle of the rotating part, for example. In other words, the controlling apparatus 15 judges whether or not the positioning state of the second coupler 812 is switched from being at the second segment 702 to being at the first segment 701. When the terminal end has not passed by the second coupler 812, the processing in FIG. 18B proceeds to step S3307. On the contrary, when the terminal end has passed by the second coupler 812, the processing in FIG. 18B proceeds to step S3310.

At step S3310 in FIG. 18B, the controlling apparatus 15 determines that it is switching timing and outputs a clock selection instruction. In accordance with the clock selection instruction, the clock switching unit 930 switches the data judgment clock signal from the second regenerated clock signal into the fourth phase difference regenerated clock signal (the eighth regenerated clock signal_θseg1).

At step S3311 in FIG. 18B, the clock switching unit 930 judges whether or not the response time Δtr of the first clock regenerating unit 921 has elapsed since the data judgment clock signal was switched from the second regenerated clock signal into either the third phase difference regenerated clock signal (the eighth regenerated clock signal_θseg2) or the fourth phase difference regenerated clock signal (the eighth regenerated clock signal_θseg1). When the response time Δtr has not elapsed, the processing in FIG. 18B returns to step S3311. When the response time Δtr has elapsed, the processing in FIG. 18B proceeds to step S3312.

At step S3312 in FIG. 18B, the clock switching unit 930 switches the data judgment clock signal from either the third phase difference regenerated clock signal (the eighth regenerated clock signal_θseg2) or the fourth phase difference regenerated clock signal (the eighth regenerated clock signal_θseg1) into the second regenerated clock signal.

At step S3313 in FIG. 18B, the controlling apparatus 15 judges whether or not the control signal for stopping the rotation of the rotating part has been received, as a control signal output from the console apparatus 40. When the controlling apparatus 15 has not received the control signal, the processing in FIG. 18B returns to step S3307. On the contrary, when the controlling apparatus 15 has received the control signal, the processing in FIG. 18B ends.

As explained above, the communication apparatus 800 according to the seventh embodiment is able to realize the advantageous effects of the fourth embodiment and is also able to address the rotations in both directions.

Eighth Embodiment

Figure 19:
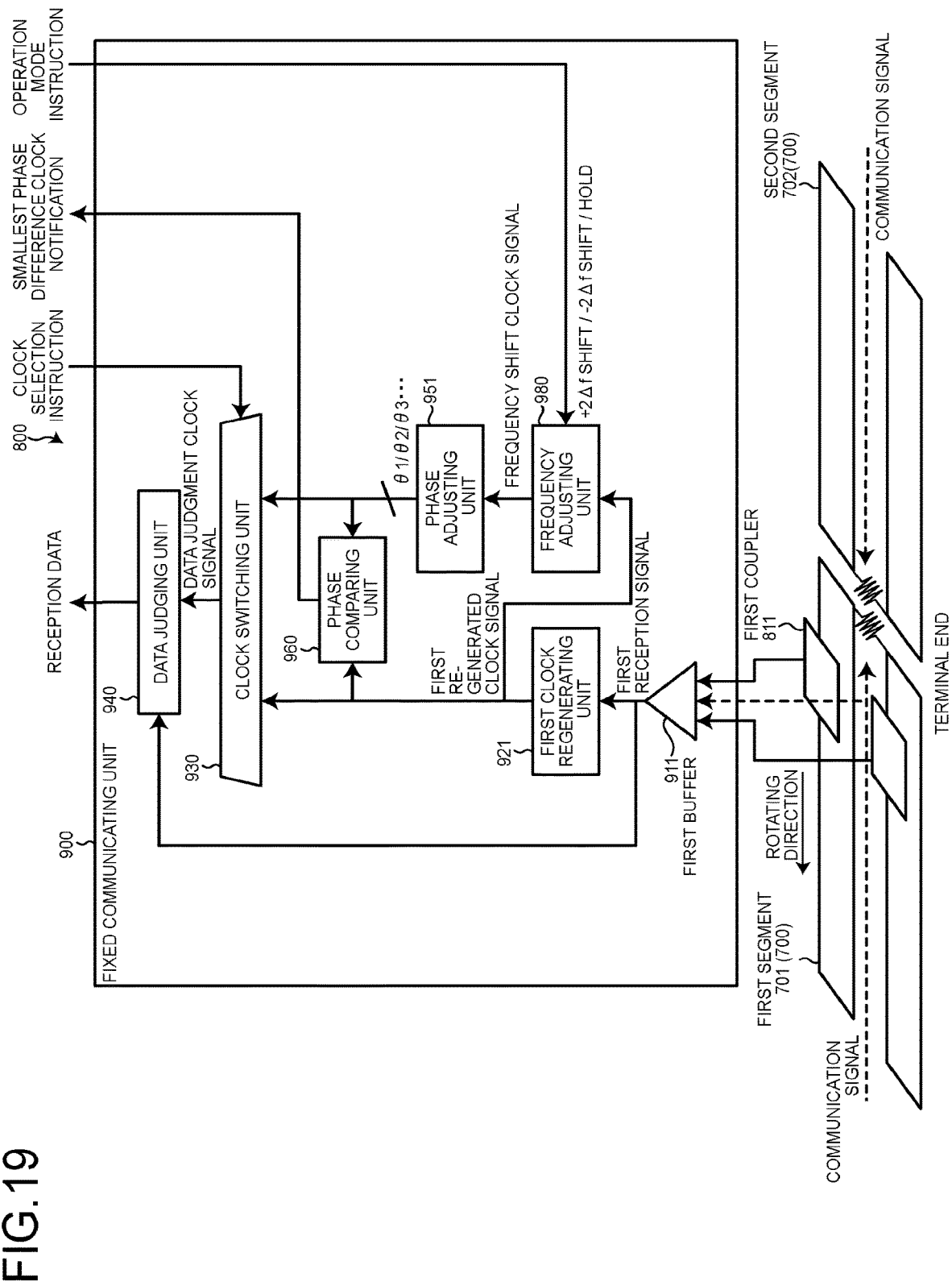
FIG. 19 is a diagram illustrating an exemplary configuration of a communication apparatus according to an eighth embodiment.
Figure 20:
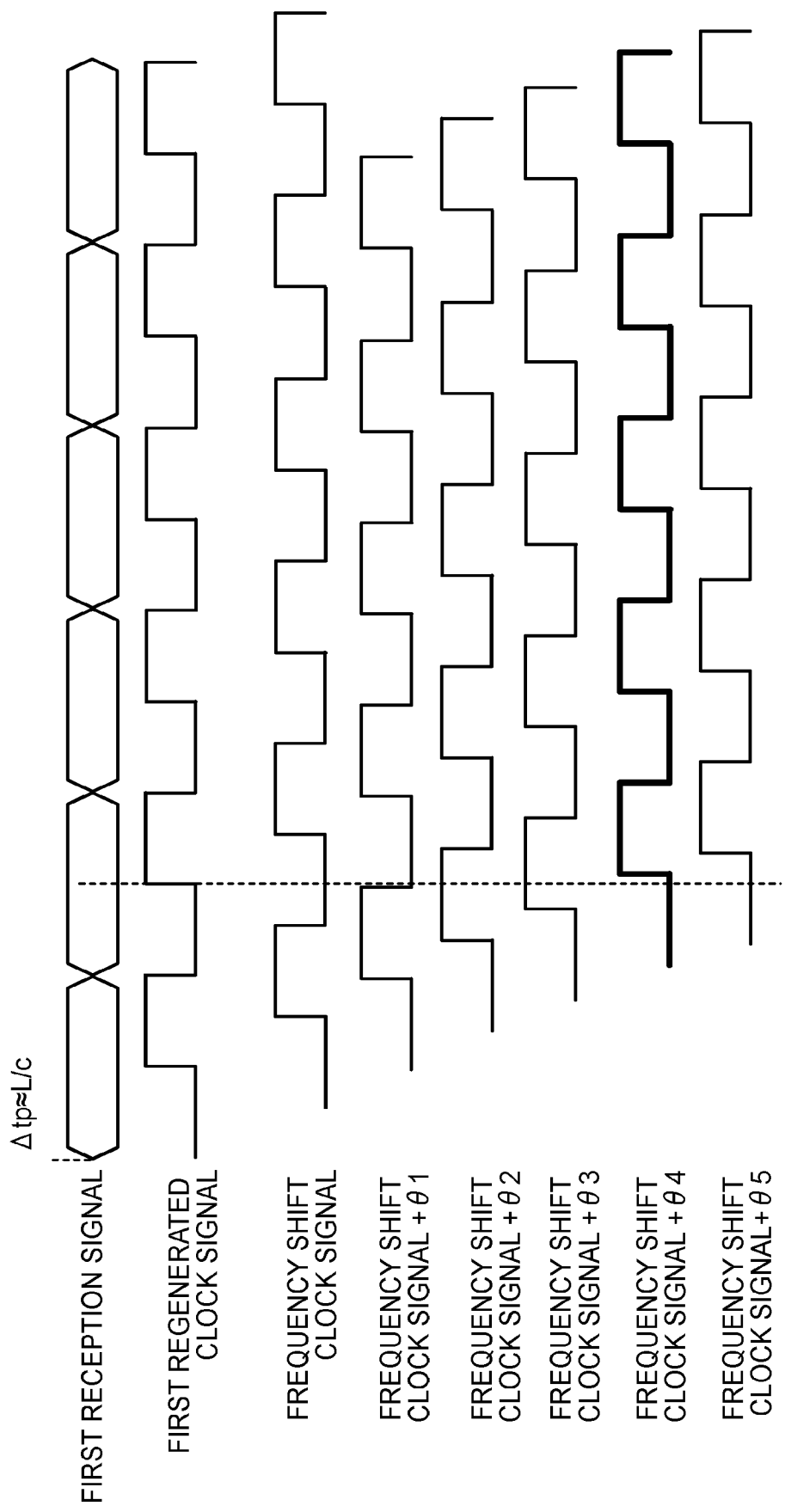
FIG. 20 is a chart for explaining an operation of the communication apparatus according to the eighth embodiment.

FIG. 19 is a diagram illustrating an exemplary configuration of the communication apparatus 800 according to an eighth embodiment. FIG. 20 is a chart for explaining an operation of the communication apparatus 800 according to the eighth embodiment.

In the first to the seventh embodiments, the examples were explained in which the two couplers (i.e., the first coupler 811 and the second coupler 812) are installed in the fixed communicating unit 900. In the eighth embodiment, even when a single coupler is used, it is possible to reduce the impacts of changes in the Doppler shift amounts and to inhibit the degradation of the reception capabilities.

As illustrated in FIG. 19, the communication apparatus 800 includes only the first coupler 811. The first coupler 811 is configured to receive the transmission data from one of the first segment 701 and the second segment 702 (the second segment 702 in the example in FIG. 19), as a first reception signal.

In the communication apparatus 800, the fixed communicating unit 900 includes a single differential buffer (hereinafter, the "first buffer 911"), a single clock regenerating unit (hereinafter, the "first clock regenerating unit 921"), the clock switching unit 930, the data judging unit 940, the phase adjusting unit 951, the phase comparing unit 960, and a frequency adjusting unit 980. The first clock regenerating unit 921, the clock switching unit 930, the data judging unit 940, the phase adjusting unit 951, the phase comparing unit 960, and the frequency adjusting unit 980 are examples of the "determining unit" and are configured to determine a regenerated clock signal based on the clock signal, in accordance with a reception position in which the first coupler 811 receives the transmission data (the first reception signal) from one of the first segment 701 and the second segment 702. The data judging unit 940 is configured to generate reception data on the basis of the transmission signal included in the transmission data received by the first coupler 811 and the regenerated clock signal.

FIG. 20 is a chart for explaining an operation of the communication apparatus 800 according to the eighth embodiment.

The first buffer 911 is configured to amplify the transmission data received by the first coupler 811. The first clock regenerating unit 921 is configured to regenerate the clock signal included in the transmission data received by the first coupler 811, as a first regenerated clock signal. The first clock regenerating unit 921 is an example of the "first regenerating unit".

The frequency adjusting unit 980 is configured to generate a frequency shift clock signal having a prescribed frequency difference as compared to the first regenerated clock signal. Details of the frequency shift clock signal will be explained later. The phase adjusting unit 951 is configured to generate a frequency shift clock signal group having different phases from the frequency shift clock signal.

While the first coupler 811 is positioned in the second segment 702, the phase comparing unit 960 is configured to detect the phase differences between the first regenerated clock signal and the frequency shift clock signal group and to determine one of the frequency shift clock signals having the smallest phase difference from the first regenerated clock signal as a phase difference regenerated clock signal (the frequency shift clock signal+θ4, in the example in FIG. 20). After that, the phase comparing unit 960 is configured to output the phase difference regenerated clock signal to the controlling apparatus 15 as a smallest phase difference clock notification.

While the first coupler 811 is positioned in the first segment 701, the phase comparing unit 960 is configured to detect the phase differences between the first regenerated clock signal and the frequency shift clock signal group and to determine one of the frequency shift clock signals having the smallest phase difference from the first regenerated clock signal as a phase difference regenerated clock signal. After that, the phase comparing unit 960 is configured to output the phase difference regenerated clock signal to the controlling apparatus 15 as a smallest phase difference clock notification.

The clock switching unit 930 is configured to select one of the first phase difference regenerated clock signal and the second phase difference regenerated clock signal, as the data judgment clock signal. The data judging unit 940 is configured to generate reception data, on the basis of the transmission signal included in the transmission data received by the first coupler 811 and the data judgment clock signal. The clock switching unit 930 is an example of the "switching unit". The data judging unit 940 is an example of the "generating unit".

The frequency adjusting unit 980 is configured to determine the prescribed frequency difference on the basis of at least one selected from among the reception position of the first coupler 811, the rotating direction, the rotation speed v of the rotating part, and the data rate of the transmission signal.

For example, the frequency adjusting unit 980 has a first operation mode (a +2Δf shift mode), a second operation mode (a −2Δf shift mode), and a third operation mode (a hold mode). The +2Δf shift mode is a mode in which, from the first regenerated clock signal, a second regenerated clock signal is generated by increasing the frequency with a shift of +2Δf serving as the prescribed frequency difference. The −2Δf shift mode is a mode in which, from the first regenerated clock signal, a second regenerated clock signal is generated by decreasing the frequency with a shift of −2Δf serving as the prescribed frequency difference. The hold mode is a mode in which the frequency of the second regenerated clock signal is held. For a time period during which the clock switching unit 930 is selecting the data judgment clock signal, the frequency adjusting unit 980 is configured to operate in the hold mode.

Figure 21:
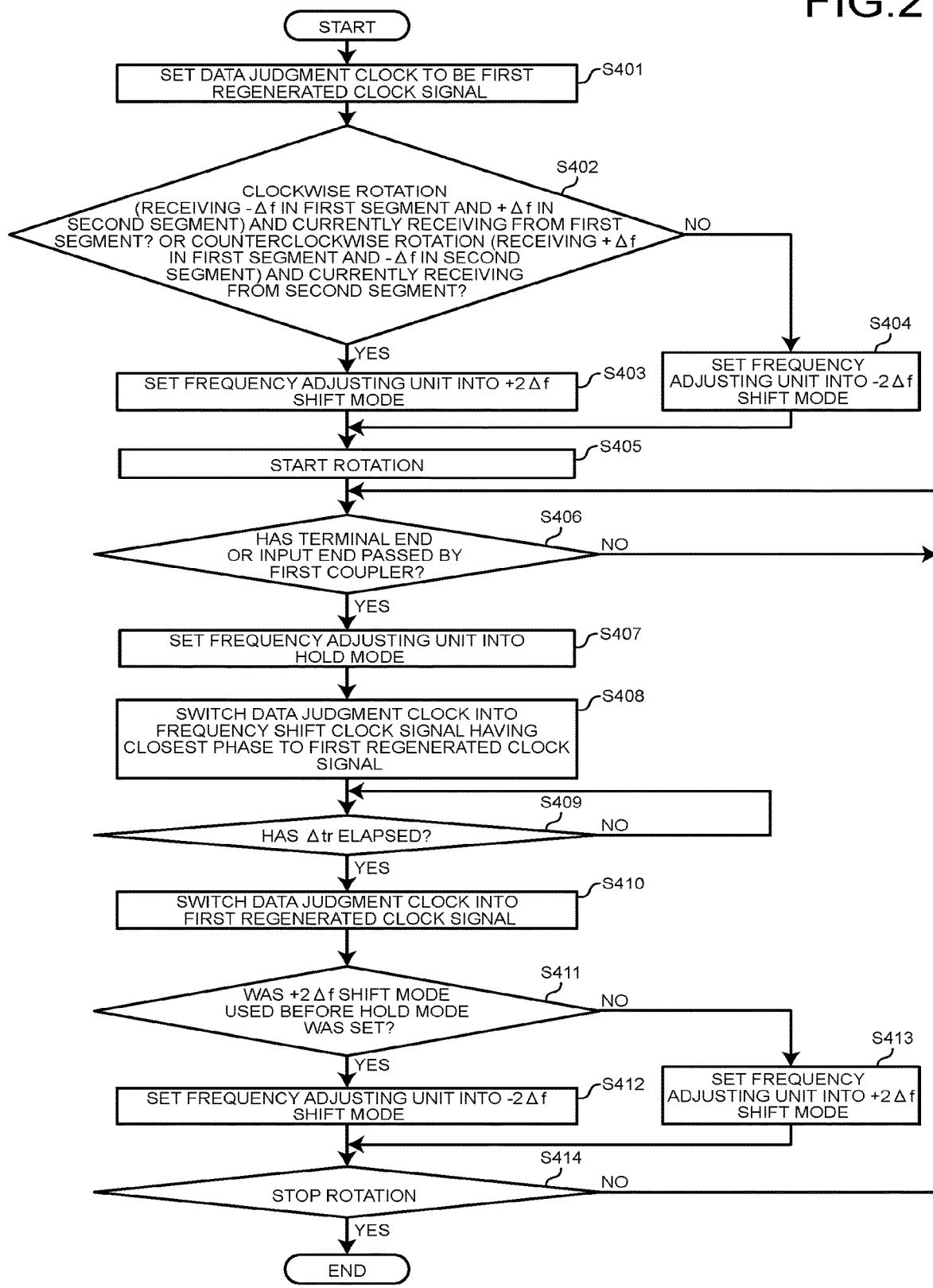
FIG. 21 is a flowchart illustrating a process performed by the communication apparatus according to the eighth embodiment.

FIG. 21 is a flowchart illustrating a process performed by the communication apparatus 800 according to the eighth embodiment.

At step S401 in FIG. 21, the clock switching unit 930 sets the data judgment clock signal to be the first regenerated clock signal.

At step S402 in FIG. 21, the controlling apparatus 15 judges whether a control signal for setting the rotating direction of the rotating part to be the clockwise direction has been received or a control signal for setting the rotating direction of the rotating part to be the counterclockwise direction has been received, as a control signal (the operation mode instruction in FIG. 19) output from the console apparatus 40. In this situation, when the rotating direction of the rotating part is set to be the clockwise direction, the configuration is such that the transmission data is received in the first segment 701 with the occurrence of a negative Doppler shift (−Δf), whereas the transmission data is received in the second segment 702 with the occurrence of a positive Doppler shift (+Δf). In contrast, when the rotating direction of the rotating part is set to be the counterclockwise direction, the configuration is such that the transmission data is received in the first segment 701 with the occurrence of the positive Doppler shift (+Δf), whereas the transmission data is received in the second segment 702 with the occurrence of the negative Doppler shift (−Δf). When the controlling apparatus 15 receives the operation mode instruction for setting the rotating direction of the rotating part to be the clockwise direction, the processing in FIG. 21 proceeds to step S403. On the contrary, when the controlling apparatus 15 receives the operation mode instruction for setting the rotating direction of the rotating part to be the counterclockwise direction, the processing in FIG. 21 proceeds to step S404.

At step S403 in FIG. 21, upon receipt of the control signal for setting the rotating direction of the rotating part to be the clockwise direction, as a control signal (an operation mode instruction) output from the console apparatus 40, the controlling apparatus 15 sets the frequency adjusting unit 980 into the +2Δf shift mode.

At step S404 in FIG. 21, upon receipt of the control signal for setting the rotating direction of the rotating part to be the counterclockwise direction, as a control signal (an operation mode instruction) output from the console apparatus 40, the controlling apparatus 15 sets the frequency adjusting unit 980 into the −2Δf shift mode.

At step S405 in FIG. 21, in accordance with the control signal for rotating the rotating part (the rotating frame 13), as a control signal output from the console apparatus 40 (e.g., the system controlling function 440 of the processing circuitry 44), the controlling apparatus 15 causes the rotating part to start rotating.

At step S406 in FIG. 21, the controlling apparatus 15 judges whether or not a division part (the input end or the terminal end) of the ring transmission path 700 has passed by the first coupler 811, on the basis of the rotation angle of the rotating part, for example. When neither the input end nor the terminal end has passed by the first coupler 811, the processing in FIG. 21 returns to step S406. On the contrary, when one of the input end and the terminal end has passed by the first coupler 811, the processing in FIG. 21 proceeds to step S407.

At step S407 in FIG. 21, when one of the input end and the terminal end has passed by the first coupler 811, the controlling apparatus 15 sets the frequency adjusting unit 980 into the hold mode. In other words, the frequency adjusting unit 980 operates in the hold mode for the time period during which the clock switching unit 930 is selecting the data judgment clock signal.

At step S408 in FIG. 21, the controlling apparatus 15 determines that it is switching timing and outputs a smallest phase difference clock selection instruction. In accordance with the smallest phase difference clock selection instruction, the clock switching unit 930 switches the data judgment clock signal from the first regenerated clock signal into one of the frequency shift clock signals (the phase difference regenerated clock signal) having the smallest phase difference from the first regenerated clock signal.

At step S409 in FIG. 21, the clock switching unit 930 judges whether or not the response time Δtr of the first clock regenerating unit 921 has elapsed since the data judgment clock signal was switched from the first regenerated clock signal into the phase difference regenerated clock signal. When the response time Δtr has not elapsed, the processing in FIG. 21 returns to step S409. When the response time Δtr has elapsed, the processing in FIG. 21 proceeds to step S410.

At step S410 in FIG. 21, the clock switching unit 930 switches the data judgment clock signal from the phase difference regenerated clock signal into the first regenerated clock signal.

At step S411 in FIG. 21, the controlling apparatus 15 judges whether or not the +2Δf shift mode was used before the hold mode was set. When the +2Δf shift mode was used before the mode was set, the processing in FIG. 21 proceeds to step S412. At step S412 in FIG. 21, the controlling apparatus 15 sets the frequency adjusting unit 980 into the −2Δf shift mode. In contrast, when the −2Δf shift mode was used before the mode was set, the processing in FIG. 21 proceeds to step S413. At step S413 in FIG. 21, the controlling apparatus 15 sets the frequency adjusting unit 980 into the +2Δf shift mode.

At step S414 in FIG. 21, the controlling apparatus 15 judges whether or not the control signal for stopping the rotation of the rotating part has been received, as a control signal output from the console apparatus 40. When the controlling apparatus 15 has not received the control signal, the processing in FIG. 21 returns to step S406. On the contrary, when the controlling apparatus 15 has received the control signal, the processing in FIG. 21 ends.

As explained above, even when being configured with the single coupler, the communication apparatus 800 according to the eighth embodiment is able to reduce the impacts of changes in the Doppler shift amounts and to inhibit the degradation of the reception capabilities.

Other Embodiments

A number of embodiments have thus been explained. It is also possible to carry out the present disclosure in various different forms other than the embodiments described above.

In the embodiments described above, the ring is divided into the two segments (the first segment 701 and the second segment 702) each accounting for 180 degrees. However, the present disclosure is also similarly applicable to other configurations in which the ring is divided into an arbitrary number of segments, e.g., the ring is divided into four segments each accounting for 90 degrees. It is also acceptable to divide the ring into segments having mutually-different angles. Further, in the embodiments described above, the communication apparatus 600 on the rotating side is configured to output mutually the same pieces of transmission data to the segments. However, it is also acceptable to output mutually-different pieces of transmission data to the segments.

Figure 22:
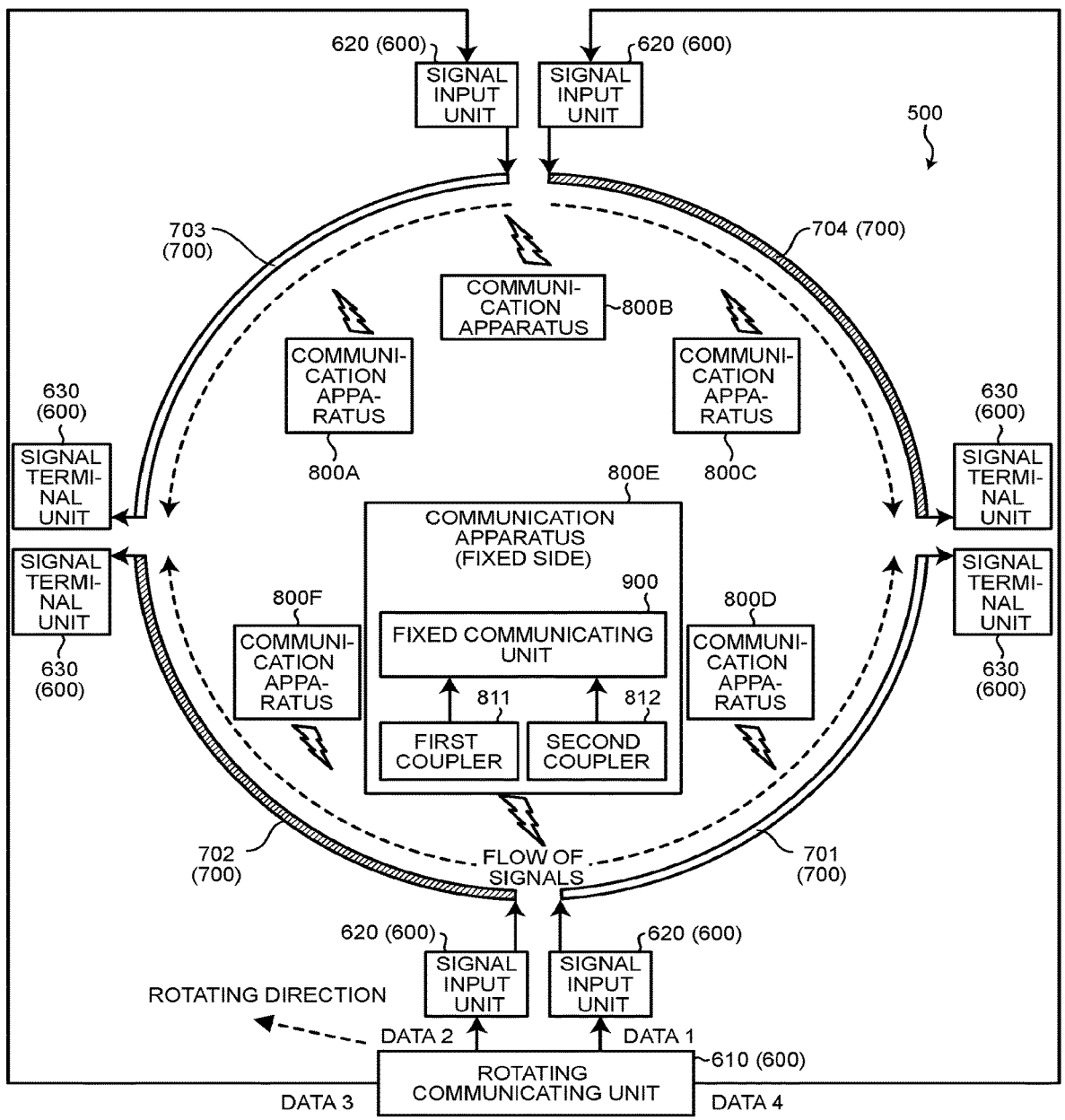
FIG. 22 is a diagram illustrating an exemplary configuration of a communication system configured with communication apparatuses according to another embodiment.

FIG. 22 is a diagram illustrating an exemplary configuration of the communication system 500 configured with the communication apparatuses 600 and 800 according to another embodiment. FIG. 22 illustrates a configuration in which, for example, the ring of the ring transmission path 700 is divided into four segments (segments 701 to 704) each accounting for 90 degrees. For instance, the ring transmission path 700 is divided into the segments 702 and 704 configured to transmit the transmission data in the rotating direction of the rotating part and the segments 701 and 703 configured to transmit the transmission data in the opposite direction of the rotating direction. The segments 702, 703, 704, and 701 are examples of the "first transmission path", the "second transmission path", the "third transmission path", and the "fourth transmission path", respectively.

The communication apparatus 600 on the rotating side includes: the rotating communicating unit 610 configured to transmit the transmission data; the signal input units 620 each configured to input a signal (the transmission data) to the input end of a corresponding one of the segments (the segments 701 to 704); and the signal terminal units 630 each for preventing the signal from being reflected at the terminal end of a corresponding one of the segments. Further, the rotating communicating unit 610 is configured to output mutually-different pieces of transmission data (data 1 to 4) to the segments (the segments 701 to 704). In this situation, if the couplers of the communication apparatus 800 were positioned so as to overlap with mutually-different segments, because the couplers would receive signals obtained by combining mutually-different pieces of data, a data error would occur. To cope with this situation, communication apparatuses 800 are provided in a quantity larger than the number of segments, so that at least one fixed side communication apparatus 800 is positioned in each segment at every rotation angle. For instance, in the configuration in which the ring transmission path 700 is divided into the fourth segments (the segments 701 to 704), six communication apparatuses 800 are provided, namely, communication apparatuses 800A, 800B, 800C, 800D, 800E, and 800F. Further, the rotating communicating unit 610 is configured to transmit the transmission data, after appending a sequence number and an error detection code to the transmission data. The error detection code is a code being added so as to be able to detect, on the reception side, an error occurring at the time of transmitting the data. In the example in FIG. 22, the communication apparatuses 800A, 800B, 800C, 800D, 800E, and 800F are connected to one another, while the communication apparatus 800E is configured to monitor the transmission data of each of the communication apparatuses 800. In this situation, the fixed communicating unit 900 of the communication apparatus 800E is configured to monitor the transmission data of the communication apparatuses 800A, 800B, 800C, 800D, 800E, and 800F and to discard certain transmission data having a duplicate sequence number appended thereto, which would cause a data error.

With the configuration and the operation described above, it is possible to increase the data transmission speed between the communication apparatus 600 on the rotating side and the fixed communication apparatus 800E up to approximately fourfold, as compared to the configuration in which the segments transmit mutually the same piece of data. Further, although the segments (the segments 701 to 704) are configured to transmit the mutually-different pieces of data (data 1 to 4) in the above example, another configuration is also acceptable in which the segments 701 and 702 transmit data 1, whereas the segments 703 and 704 transmit data 2, for example. In that situation, the data transmission speed between the communication apparatus 600 on the rotating side and the fixed communication apparatus 800E is approximately twice as fast as in the configuration in which the segments are configured to transmit mutually the same piece of data.

More specifically, in FIG. 22, in the communication apparatuses 800A, 800B, 800C, 800D, 800E, and 800F, the first coupler 811 and the second coupler 812 are configured to receive transmission data from one of the segments 701 to 704. For example, when the first coupler 811 and the second coupler 812 in the communication apparatus 800D receive transmission data (data 1) from the segment 701, the first coupler 811 and the second coupler 812 in the communication apparatus 800A receive transmission data (data 3) from the segment 703. Also, for example, when the first couplers 811 and the second couplers 812 in the communication apparatuses 800E and 800F receive transmission data (data 2) from the segment 702, the first couplers 811 and the second couplers 812 in the communication apparatuses 800B and 800C receive transmission data (data 4) from the segment 704. In this situation, in FIG. 22, the transmission data (data 2) received by the communication apparatuses 800E and 800F is transmission data having duplicate sequence numbers appended thereto, which would cause a data error. At the time depicted in the drawing, the communication apparatus 800E is receiving this piece of transmission data at the input end. Accordingly, the transmission data (data 2) received by the communication apparatus 800E is discarded under the control of the communication apparatus 800E. Similarly, in FIG. 22, the transmission data (data 4) received by the communication apparatuses 800B and 800C is transmission data having duplicate sequence numbers appended thereto, which would cause a data error. At the time depicted in the drawing, the communication apparatus 800B is receiving this piece of transmission data at the input end. Accordingly, the transmission data (data 4) received by the communication apparatus 800B is discarded under the control of the communication apparatus 800E.

In this situation, in the communication apparatuses 800A, 800B, 800C, 800D, 800E, and 800F, when a division part (the input end or the terminal end) of the ring transmission path 700 has passed by the first coupler 811, the clock switching unit 930 is configured to switch the data judgment clock signal from the first regenerated clock signal into the second regenerated clock signal. Further, when the response time Δtr of the second clock regenerating unit 922 has elapsed since the division part (the input end or the terminal end) of the ring transmission path 700 passed by the first coupler 811, the clock switching unit 930 is configured to switch the data judgment clock signal from the second regenerated clock signal into the first regenerated clock signal. Further, the data judging unit 940 is configured to generate reception data, on the basis of the transmission signal included in the transmission data received by the first coupler 811 and the data judgment clock signal.

With the configurations and the operations of the functional units described above, even with the configuration in which the ring is divided into the plurality of segments, so that the mutually-different pieces of data are transmitted with respect to the different segments, it is possible to inhibit the degradation of the reception capabilities which may be caused by the changes in the Doppler shift amounts. Further, it is also possible to realize an increase in the data transmission speed between the communication apparatus 600 on the rotating side and the fixed communication apparatus 800E. As a result, for example, when the transmission data is the signal of the X-rays (the X-ray detection data) acquired by the data acquisition apparatus (the DAS 18), it is also possible to realize an increase in the speed of the process performed by the processing circuitry 44 of the console apparatus 40 for generating the CT image data on the basis of the transmission data (the reception data) transmitted from the DAS 18.

In the above embodiments, the example was explained in which the communication apparatus 600 and the ring transmission path 700 are disposed in the rotating part (the rotating frame 13), whereas the communication apparatus 800 is disposed in the fixed part (the fixed frame 19), while the transmission data is the signal of the X-rays acquired by the data acquisition apparatus (the DAS 18), possible embodiments are not limited to this example.

For instance, when the communication apparatus 600 and the ring transmission path 700 are disposed in the fixed part, while the communication apparatus 800 is disposed in the rotating part, the transmission data is a control signal transmitted to the rotating part by the console apparatus 40 of the X-ray CT apparatus 100.

The constituent elements of the apparatuses illustrated in the drawings of the present embodiments are based on functional concepts. Thus, it is not necessarily required to physically configure the constituent elements as indicated in the drawings. In other words, specific modes of distribution and integration of the apparatuses are not limited to those illustrated in the drawings. It is acceptable to functionally or physically distribute or integrate all or a part of the apparatuses in any arbitrary units, depending on various loads and the status of use. Further, all or an arbitrary part of the processing functions performed by the apparatuses may be realized by a CPU and a program analyzed and executed by the CPU or may be realized as hardware using wired logic.

Further, it is possible to realize any of the methods explained in the present embodiments, by causing a computer such as a personal computer or a workstation to execute a program prepared in advance. It is possible to distribute the program via a network such as the Internet. Further, it is also possible to record the program onto a non-transitory computer-readable recording medium such as a hard disk, a flexible disc (FD), a Compact Disc Read-Only Memory (CD-ROM), a Magneto Optical (MO) disc, or a Digital Versatile Disc (DVD) and to have the program executed as being read from the recording medium by a computer.

According to at least one aspect of the embodiments described above, it is possible to reduce the impacts of changes in the Doppler shift amounts and to inhibit the degradation of the reception capabilities.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In relation to the embodiments described above, the following notes are presented as a number of aspects and selected characteristics of the present disclosure:

Note 1:

A communication apparatus including:
- a ring-shaped transmission path which is disposed in one of a fixed part and a rotating part and includes a plurality of transmission paths each configured to transmit transmission data including a transmission signal and a clock signal;
- a first coupler disposed in the other of the fixed part and the rotating part and configured to receive the transmission data from one of the plurality of transmission paths;
- a determining unit configured to determine a regenerated clock signal based on the clock signal in accordance with a reception position in which the first coupler receives the transmission data from the one of the transmission paths; and a data generating unit configured to generate reception data on the basis of the transmission signal received by the first coupler and the regenerated clock signal.

Note 2:

The ring-shaped transmission path may be divided into a first transmission path configured to transmit the transmission data in a rotating direction of the rotating part and a second transmission path configured to transmit the transmission data in an opposite direction of the rotating direction,
- the first coupler may be configured to receive the transmission data from one of the first transmission path and the second transmission path, and
- the determining unit may be configured to determine the regenerated clock signal based on the clock signal in accordance with the reception position in which the first coupler receives the transmission data from the one of the transmission paths.

Note 3:

The communication apparatus may further include:
- a second coupler disposed in the other of the fixed part and the rotating part while being positioned apart from the first coupler and configured to receive the transmission data from the one of the transmission paths earlier than the first coupler does, and
the determining unit may include:
a first regenerating unit configured to regenerate the clock signal included in the transmission data received by the first coupler, as a first regenerated clock signal,
a second regenerating unit configured to regenerate the clock signal included in the transmission data received by the second coupler, as a second regenerated clock signal, and
a clock signal switching unit configured to select one of the first regenerated clock signal and the second regenerated clock signal as a data judgment clock signal, and
the data generating unit may be configured to generate the reception data on the basis of the transmission signal received by the first coupler and the data judgment clock signal.

Note 4:
As a first switching process,
the clock signal switching unit may be configured to set the data judgment clock signal to be the first regenerated clock signal,
the clock signal switching unit may be configured, when a division part of the ring-shaped transmission path has passed by the first coupler, to switch the data judgment clock signal from the first regenerated clock signal into the second regenerated clock signal, and
the clock signal switching unit may be configured, when response time of the second regenerating unit has elapsed since the division part of the ring-shaped transmission path passed by the first coupler, to switch the data judgment clock signal from the second regenerated clock signal into the first regenerated clock signal.

Note 5:
An isolation distance between the first coupler and the second coupler may be equal to or longer than a distance calculated from response time of the second regenerating unit and a rotation speed of the rotating part.

Note 6:
The isolation distance may be substantially equal to an integer multiple of a wavelength of the transmission data per bit.

Note 7:
The communication apparatus may further include:
a phase adjusting unit configured to generate a third regenerated clock signal advanced by a prescribed phase difference and a fourth regenerated clock signal delayed by the prescribed phase difference as compared to the second regenerated clock signal, the prescribed phase difference being determined on the basis of the isolation distance, and
as the first switching process,
the clock signal switching unit may be configured to set the data judgment clock signal to be the first regenerated clock signal,
the clock signal switching unit may be configured, when an input end being the division part of the ring-shaped transmission path has passed by the first coupler, to switch the data judgment clock signal from the first regenerated clock signal into the third regenerated clock signal, and may be configured, when the response time of the second regenerating unit has elapsed since the input end passed by the first coupler, to switch the data judgment clock signal from the third regenerated clock signal into the first regenerated clock signal, and
the clock signal switching unit may be configured, when a terminal end being the division part of the ring-shaped transmission path has passed by the first coupler, to switch the data judgment clock signal from the first regenerated clock signal into the fourth regenerated clock signal, and may be configured, when the response time of the second regenerating unit has elapsed since the terminal end passed by the first coupler, to switch the data judgment clock signal from the fourth regenerated clock signal into the first regenerated clock signal.

Note 8:
The communication apparatus may further include:
a phase adjusting unit configured to generate a fifth regenerated clock signal group having different phases from the second regenerated clock signal; and
a phase comparing unit configured, while the first coupler and the second coupler are positioned in the first transmission path, to detect phase differences between the first regenerated clock signal and the fifth regenerated clock signal group, to further determine a fifth regenerated clock signal having a smallest phase difference from the first regenerated clock signal as a first phase difference regenerated clock signal, also configured, while the first coupler and the second coupler are positioned in the second transmission path, to detect phase differences between the first regenerated clock signal and the fifth regenerated clock signal group, and to further determine a fifth regenerated clock signal having a smallest phase difference from the first regenerated clock signal as a second phase difference regenerated clock signal, and
as the first switching process,
the clock signal switching unit may be configured to set the data judgment clock signal to be the first regenerated clock signal,
the clock signal switching unit may be configured, when an input end being the division part of the ring-shaped transmission path has passed by the first coupler, to switch the data judgment clock signal from the first regenerated clock signal into the first phase difference regenerated clock signal, and may be configured, when the response time of the second regenerating unit has elapsed since the input end passed by the first coupler, to switch the data judgment clock signal from the first phase difference regenerated clock signal into the first regenerated clock signal, and
the clock signal switching unit may be configured, when a terminal end being the division part of the ring-shaped transmission path has passed by the first coupler, to switch the data judgment clock signal from the first regenerated clock signal into the second phase difference regenerated clock signal, and may be configured, when the response time of the second regenerating unit has elapsed since the terminal end passed by the first coupler, to switch the data judgment clock signal from the second phase difference regenerated clock signal into the first regenerated clock signal.

Note 9:
The communication apparatus may further include:
a transmission data switching unit configured, on the basis of the rotating direction, to select one of the transmission data received by the first coupler and the transmission data received by the second coupler, and the clock signal switching unit may be configured to perform the first switching process while the transmission data switching unit is selecting the transmission data received by the first coupler, and as a second switching process performed while the transmission data switching unit is selecting the transmission data received by the second coupler, the clock signal switching unit may be configured to set the data judgment clock signal to be the second regenerated clock signal, and the clock signal switching unit may be configured, when the division part of the ring-shaped transmission path has passed by the second coupler, to switch the data judgment clock signal from the second regenerated clock signal into the first regenerated clock signal, and may be configured, when the response time of the second regenerating unit has elapsed since the division part of the ring-shaped transmission path passed by the second coupler, to switch the data judgment clock signal from the first regenerated clock signal into the second regenerated clock signal.

Note 10:

The communication apparatus may further include:

a transmission data switching unit configured, on the basis of the rotating direction, to select one of the transmission data received by the first coupler and the transmission data received by the second coupler, and the phase adjusting unit may be configured to generate a sixth regenerated clock signal advanced by the prescribed phase difference and a seventh regenerated clock signal delayed by the prescribed phase difference as compared to the first regenerated clock signal, the prescribed phase difference being determined on the basis of the isolation distance, the clock signal switching unit may be configured to perform the first switching process while the transmission data switching unit is selecting the transmission data received by the first coupler, and as a second switching process performed while the transmission data switching unit is selecting the transmission data received by the second coupler, the clock signal switching unit may be configured to set the data judgment clock signal to be the second regenerated clock signal, the clock signal switching unit may be configured, when an input end being the division part of the ring-shaped transmission path has passed by the second coupler, to switch the data judgment clock signal from the second regenerated clock signal into the sixth regenerated clock signal, and may be configured, when the response time of the second regenerating unit has elapsed since the input end passed by the second coupler, to switch the data judgment clock signal from the sixth regenerated clock signal into the first regenerated clock signal, and the clock signal switching unit may be configured, when a terminal end being the division part of the ring-shaped transmission path has passed by the second coupler, to switch the data judgment clock signal from the first regenerated clock signal into the seventh regenerated clock signal, and may be configured, when the response time of the second regenerating unit has elapsed since the terminal end passed by the second coupler, to switch the data judgment clock signal from the seventh regenerated clock signal into the first regenerated clock signal.

Note 11:

The communication apparatus may further include:

a transmission data switching unit configured, on the basis of the rotating direction, to select one of the transmission data received by the first coupler and the transmission data received by the second coupler, and the phase adjusting unit may be configured to generate an eighth regenerated clock signal group having different phases from the second regenerated clock signal, the phase comparing unit may be configured, while the first coupler and the second coupler are positioned in the first transmission path, to detect phase differences between the first regenerated clock signal and the eighth regenerated clock signal group, to further determine an eighth regenerated clock signal having a smallest phase difference from the first regenerated clock signal as a third phase difference regenerated clock signal, and may be configured, while the first coupler and the second coupler are positioned in the second transmission path, to detect phase differences between the first regenerated clock signal and the eighth regenerated clock signal group, and to further determine an eighth regenerated clock signal having a smallest phase difference from the first regenerated clock signal as a fourth phase difference regenerated clock signal, the clock signal switching unit may be configured to perform the first switching process while the transmission data switching unit is selecting the transmission data received by the first coupler, and as a second switching process performed while the transmission data switching unit is selecting the transmission data received by the second coupler, the clock signal switching unit may be configured to set the data judgment clock signal to be the first regenerated clock signal, the clock signal switching unit may be configured, when the input end being the division part of the ring-shaped transmission path has passed by the second coupler, to switch the data judgment clock signal from the first regenerated clock signal into the third phase difference regenerated clock signal, and may be configured, when the response time of the second regenerating unit has elapsed since the input end passed by the second coupler, to switch the data judgment clock signal from the third phase difference regenerated clock signal into the first regenerated clock signal, and the clock signal switching unit may be configured, when the terminal end being the division part of the ring-shaped transmission path has passed by the second coupler, to switch the data judgment clock signal from the first regenerated clock signal into the fourth phase difference regenerated clock signal, and may be configured, when the response time of the second regenerating unit has elapsed since the terminal end passed by the second coupler, to switch the data judgment clock signal from the fourth phase difference regenerated clock signal into the first regenerated clock signal.

Note 12:

The determining unit may include:

a first regenerating unit configured to regenerate the clock signal included in the transmission data received by the first coupler as a first regenerated clock signal;

a frequency adjusting unit configured to generate a second regenerated clock signal having a prescribed frequency difference as compared to the first regenerated clock signal;

a phase adjusting unit configured to generate a third regenerated clock signal group having different phases from the second regenerated clock signal;

a phase comparing unit configured, while the first coupler is positioned in the first transmission path, to detect phase differences between the first regenerated clock signal and the third regenerated clock signal group, to further determine a third regenerated clock signal having a smallest phase difference from the first regenerated clock signal as a first phase difference regenerated clock signal, also configured, while the first coupler is positioned in the second transmission path, to detect phase differences between the first regenerated clock signal and the third regenerated clock signal group, and to further determine a third regenerated clock signal having a smallest phase difference from the first regenerated clock signal as a second phase difference regenerated clock signal; and a clock signal switching unit configured to select one of the first phase difference regenerated clock signal and the second phase difference regenerated clock signal, as the data judgment clock signal, and the data generating unit may be configured to generate the reception data on the basis of the transmission signal received by the first coupler and the data judgment clock signal.

Note 13:

The frequency adjusting unit may be configured to determine the prescribed frequency difference on the basis of at least one selected from among the reception position of the first coupler, the rotating direction, a rotation speed of the rotating part, and a data rate of the transmission signal.

Note 14:

The frequency adjusting unit may have:

a first operation mode in which a second regenerated clock signal is generated from the first regenerated clock signal by increasing a frequency thereof by the prescribed frequency difference;

a second operation mode in which a second regenerated clock signal is generated from the first regenerated clock signal by decreasing the frequency thereof by the prescribed frequency difference; and a third operation mode in which a frequency of the second regenerated clock signal is maintained, and the frequency adjusting unit may be configured to operate in the third operation mode while the clock signal switching unit is selecting the data judgment clock signal.

Note 15:

The rotating part may include an X-ray tube, an X-ray detector configured to detect X-rays emitted from the X-ray tube, and a data acquisition apparatus configured to acquire a signal of the X-rays detected by the X-ray detector, and the transmission data may be the signal of the X-rays acquired by the data acquisition apparatus.

Note 16:

The rotating part may include an X-ray tube, an X-ray detector configured to detect X-rays emitted from the X-ray tube, and a data acquisition apparatus configured to acquire a signal of the X-rays detected by the X-ray detector, and the transmission data may be a control signal transmitted to the rotating part by a console apparatus of an X-ray Computed Tomography (CT) apparatus.

Note 17:

The ring-shaped transmission path may be divided into: a first transmission path configured to transmit the transmission data from a first input end to a first terminal end in a rotating direction of the rotating part; a second transmission path configured to transmit the transmission data from a second input end to the first terminal end in an opposite direction of the rotating direction; a third transmission path configured to transmit the transmission data from the second input end to a second terminal end in the rotating direction of the rotating part; and a fourth transmission path configured to transmit the transmission data from the first input end to the second terminal end in the opposite direction of the rotating direction, and the first coupler may be configured to receive the transmission data from one selected from among the first transmission path, the second transmission path, the third transmission path, and the fourth transmission path.

Note 18:

An X-ray Computed Tomography (CT) apparatus including:

a rotating part that includes an X-ray tube, an X-ray detector configured to detect X-rays emitted from the X-ray tube, and a data acquisition apparatus configured to acquire a signal of the X-rays detected by the X-ray detector;

a fixed part configured to cause the rotating part to rotate;

a ring-shaped transmission path which is disposed in one of the fixed part and the rotating part and includes a plurality of transmission paths each configured to transmit transmission data including a transmission signal and a clock signal;

a first coupler disposed in the other of the fixed part and the rotating part and configured to receive the transmission data from one of the plurality of transmission paths;

a determining unit configured to determine a regenerated clock signal based on the clock signal in accordance with a reception position in which the first coupler receives the transmission data from the one of the transmission paths; and a data generating unit configured to generate reception data on the basis of the transmission signal received by the first coupler and the regenerated clock signal.

Note 19:

A communication method employing a communication apparatus provided with a ring-shaped transmission path which is disposed in one of a fixed part and a rotating part and includes a plurality of transmission paths each configured to transmit transmission data including a transmission signal and a clock signal, and provided with a first coupler which is disposed in the other of the fixed part and the rotating part and is configured to receive the transmission data from one of the plurality of transmission paths, the communication method including:

determining a regenerated clock signal based on the clock signal in accordance with a reception position in which the first coupler receives the transmission data from the one of the transmission paths; and generating reception data on the basis of the transmission signal received by the first coupler and the regenerated clock signal.

Note 20:

A program for implementing a communication method employing a communication apparatus provided with a ring-shaped transmission path which is disposed in one of a fixed part and a rotating part and includes a plurality of transmission paths each configured to transmit transmission data including a transmission signal and a clock signal, and provided with a first coupler which is disposed in the other of the fixed part and the rotating part and is configured to receive the transmission data from one of the plurality of transmission paths, the program being configured to cause a computer to execute:
  determining a regenerated clock signal based on the clock signal in accordance with a reception position in which the first coupler receives the transmission data from the one of the transmission paths; and
  generating reception data on the basis of the transmission signal received by the first coupler and the regenerated clock signal.

What is claimed is:

1. A communication apparatus comprising:
  a ring-shaped transmission path which is disposed in one of a fixed part and a rotating part and includes a plurality of transmission paths each configured to transmit transmission data including a transmission signal and a clock signal;
  a first coupler disposed in the other of the fixed part and the rotating part and configured to receive the transmission data from one of the plurality of transmission paths;
  a determining unit configured to determine a regenerated clock signal based on the clock signal in accordance with a reception position in which the first coupler receives the transmission data from the one of the transmission paths; and
  a generating unit configured to generate reception data on a basis of the transmission signal received by the first coupler and the regenerated clock signal.

2. The communication apparatus according to claim 1, wherein
  the ring-shaped transmission path is divided into a first transmission path configured to transmit the transmission data in a rotating direction of the rotating part and a second transmission path configured to transmit the transmission data in an opposite direction of the rotating direction,
  the first coupler is configured to receive the transmission data from one of the first transmission path and the second transmission path, and
  the determining unit is configured to determine the regenerated clock signal based on the clock signal in accordance with the reception position in which the first coupler receives the transmission data from the one of the transmission paths.

3. The communication apparatus according to claim 2, further comprising:
  a second coupler disposed in the other of the fixed part and the rotating part while being positioned apart from the first coupler and configured to receive the transmission data from the one of the transmission paths earlier than the first coupler does, wherein
  the determining unit includes
    a first regenerating unit configured to regenerate the clock signal included in the transmission data received by the first coupler, as a first regenerated clock signal,
    a second regenerating unit configured to regenerate the clock signal included in the transmission data received by the second coupler, as a second regenerated clock signal, and
    a switching unit configured to select one of the first regenerated clock signal and the second regenerated clock signal as a data judgment clock signal, and
  the generating unit is configured to generate the reception data on a basis of the transmission signal received by the first coupler and the data judgment clock signal.

4. The communication apparatus according to claim 3, wherein
  as a first switching process,
    the switching unit is configured to set the data judgment clock signal to be the first regenerated clock signal,
    the switching unit is configured, when a division part of the ring-shaped transmission path has passed by the first coupler, to switch the data judgment clock signal from the first regenerated clock signal into the second regenerated clock signal, and
    the switching unit is configured, when response time of the second regenerating unit has elapsed since the division part of the ring-shaped transmission path passed by the first coupler, to switch the data judgment clock signal from the second regenerated clock signal into the first regenerated clock signal.

5. The communication apparatus according to claim 3, wherein an isolation distance between the first coupler and the second coupler is equal to or longer than a distance calculated from response time of the second regenerating unit and a rotation speed of the rotating part.

6. The communication apparatus according to claim 5, wherein the isolation distance is substantially equal to an integer multiple of a wavelength of the transmission data per bit.

7. The communication apparatus according to claim 5, further comprising:
  a phase adjusting unit configured to generate a third regenerated clock signal advanced by a prescribed phase difference and a fourth regenerated clock signal delayed by the prescribed phase difference as compared to the second regenerated clock signal, the prescribed phase difference being determined on a basis of the isolation distance, wherein
  as the first switching process,
    the switching unit is configured to set the data judgment clock signal to be the first regenerated clock signal,
    the switching unit is configured, when an input end being the division part of the ring-shaped transmission path has passed by the first coupler, to switch the data judgment clock signal from the first regenerated clock signal into the third regenerated clock signal, and is configured, when the response time of the second regenerating unit has elapsed since the input end passed by the first coupler, to switch the data judgment clock signal from the third regenerated clock signal into the first regenerated clock signal, and
    the switching unit is configured, when a terminal end being the division part of the ring-shaped transmission path has passed by the first coupler, to switch the data judgment clock signal from the first regenerated clock signal into the fourth regenerated clock signal, and is configured, when the response time of the second regenerating unit has elapsed since the terminal end passed by the first coupler, to switch the data judgment clock signal from the fourth regenerated clock signal into the first regenerated clock signal.

8. The communication apparatus according to claim 5, further comprising:

a phase adjusting unit configured to generate a fifth
regenerated clock signal group having different phases
from the second regenerated clock signal; and a phase comparing unit configured, while the first coupler
and the second coupler are positioned in the first
transmission path, to detect phase differences between
the first regenerated clock signal and the fifth regenerated clock signal group, to further determine a fifth
regenerated clock signal having a smallest phase difference from the first regenerated clock signal as a first
phase difference regenerated clock signal, also configured, while the first coupler and the second coupler are
positioned in the second transmission path, to detect
phase differences between the first regenerated clock
signal and the fifth regenerated clock signal group, and
to further determine a fifth regenerated clock signal
having a smallest phase difference from the first regenerated clock signal as a second phase difference regenerated clock signal, wherein as the first switching process, the switching unit is configured to set the data judgment
clock signal to be the first regenerated clock signal, the switching unit is configured, when an input end
being the division part of the ring-shaped transmission path has passed by the first coupler, to switch the
data judgment clock signal from the first regenerated
clock signal into the first phase difference regenerated clock signal, and is configured, when the
response time of the second regenerating unit has
elapsed since the input end passed by the first
coupler, to switch the data judgment clock signal
from the first phase difference regenerated clock
signal into the first regenerated clock signal, and the switching unit is configured, when a terminal end
being the division part of the ring-shaped transmission path has passed by the first coupler, to switch the
data judgment clock signal from the first regenerated
clock signal into the second phase difference regenerated clock signal, and is configured, when the
response time of the second regenerating unit has
elapsed since the terminal end passed by the first
coupler, to switch the data judgment clock signal
from the second phase difference regenerated clock
signal into the first regenerated clock signal.

9. The communication apparatus according to claim 4, further comprising:

a transmission data switching unit configured, on a basis
of the rotating direction, to select one of the transmission data received by the first coupler and the transmission data received by the second coupler, wherein the switching unit is configured to perform the first
switching process while the transmission data switching unit is selecting the transmission data received by
the first coupler, and as a second switching process performed while the transmission data switching unit is selecting the transmission data received by the second coupler, the switching unit is configured to set the data judgment
clock signal to be the second regenerated clock
signal, and the switching unit is configured, when the division part
of the ring-shaped transmission path has passed by
the second coupler, to switch the data judgment
clock signal from the second regenerated clock signal into the first regenerated clock signal, and is
configured, when the response time of the first regenerating unit has elapsed since the division part of the
ring-shaped transmission path passed by the second
coupler, to switch the data judgment clock signal
from the first regenerated clock signal into the second regenerated clock signal.

10. The communication apparatus according to claim 7, further comprising:

a transmission data switching unit configured, on a basis
of the rotating direction, to select one of the transmission data received by the first coupler and the transmission data received by the second coupler, wherein the phase adjusting unit is configured to generate a sixth
regenerated clock signal advanced by the prescribed
phase difference and a seventh regenerated clock signal
delayed by the prescribed phase difference as compared
to the first regenerated clock signal, the prescribed
phase difference being determined on a basis of the
isolation distance, the switching unit is configured to perform the first
switching process while the transmission data switching unit is selecting the transmission data received by
the first coupler, and as a second switching process performed while the transmission data switching unit is selecting the transmission data received by the second coupler, the switching unit is configured to set the data judgment
clock signal to be the second regenerated clock signal, the switching unit is configured, when an input end being
the division part of the ring-shaped transmission path
has passed by the second coupler, to switch the data
judgment clock signal from the second regenerated
clock signal into the sixth regenerated clock signal, and
is configured, when the response time of the first
regenerating unit has elapsed since the input end passed
by the second coupler, to switch the data judgment
clock signal from the sixth regenerated clock signal
into the first regenerated clock signal, and the switching unit is configured, when a terminal end
being the division part of the ring-shaped transmission
path has passed by the second coupler, to switch the
data judgment clock signal from the first regenerated
clock signal into the seventh regenerated clock signal,
and is configured, when the response time of the first
regenerating unit has elapsed since the terminal end
passed by the second coupler, to switch the data judgment clock signal from the seventh regenerated clock
signal into the first regenerated clock signal.

11. The communication apparatus according to claim 8, further comprising:

a transmission data switching unit configured, on a basis
of the rotating direction, to select one of the transmission data received by the first coupler and the transmission data received by the second coupler, wherein the phase adjusting unit is configured to generate an
eighth regenerated clock signal group having different
phases from the second regenerated clock signal, the phase comparing unit is configured, while the first
coupler and the second coupler are positioned in the
first transmission path, to detect phase differences
between the first regenerated clock signal and the
eighth regenerated clock signal group, to further determine an eighth regenerated clock signal having a
smallest phase difference from the first regenerated
clock signal as a third phase difference regenerated
clock signal, and is configured, while the first coupler
and the second coupler are positioned in the second
transmission path, to detect phase differences between
the first regenerated clock signal and the eighth regenerated clock signal group, and to further determine an eighth regenerated clock signal having a smallest phase difference from the first regenerated clock signal as a fourth phase difference regenerated clock signal, the switching unit is configured to perform the first switching process while the transmission data switching unit is selecting the transmission data received by the first coupler, and as a second switching process performed while the transmission data switching unit is selecting the transmission data received by the second coupler, the switching unit is configured to set the data judgment clock signal to be the first regenerated clock signal, the switching unit is configured, when the input end being the division part of the ring-shaped transmission path has passed by the second coupler, to switch the data judgment clock signal from the first regenerated clock signal into the third phase difference regenerated clock signal, and is configured, when the response time of the first regenerating unit has elapsed since the input end passed by the second coupler, to switch the data judgment clock signal from the third phase difference regenerated clock signal into the first regenerated clock signal, and the switching unit is configured, when the terminal end being the division part of the ring-shaped transmission path has passed by the second coupler, to switch the data judgment clock signal from the first regenerated clock signal into the fourth phase difference regenerated clock signal, and is configured, when the response time of the first regenerating unit has elapsed since the terminal end passed by the second coupler, to switch the data judgment clock signal from the fourth phase difference regenerated clock signal into the first regenerated clock signal.

12. The communication apparatus according to claim 2, wherein the determining unit includes:

a first regenerating unit configured to regenerate the clock signal included in the transmission data received by the first coupler as a first regenerated clock signal;

a frequency adjusting unit configured to generate a frequency shift clock signal having a prescribed frequency difference as compared to the first regenerated clock signal;

a phase adjusting unit configured to generate a frequency shift clock signal group having different phases from the frequency shift clock signal;

a phase comparing unit configured to detect phase differences between the first regenerated clock signal and the frequency shift clock signal group and to determine a frequency shift clock signal having a smallest phase difference from the first regenerated clock signal as a phase difference regenerated clock signal; and a switching unit configured to switch the data judgment clock signal from the first regenerated clock signal into the phase difference regenerated clock signal, wherein the generating unit is configured to generate the reception data on a basis of the transmission signal received by the first coupler and the data judgment clock signal.

13. The communication apparatus according to claim 12, wherein the frequency adjusting unit is configured to determine the prescribed frequency difference on a basis of at least one selected from among the reception position of the first coupler, the rotating direction, a rotation speed of the rotating part, and a data rate of the transmission signal.

14. The communication apparatus according to claim 12, wherein the frequency adjusting unit has:

a first operation mode in which a second regenerated clock signal is generated from the first regenerated clock signal by increasing a frequency thereof by the prescribed frequency difference;

a second operation mode in which a second regenerated clock signal is generated from the first regenerated clock signal by decreasing the frequency thereof by the prescribed frequency difference; and a third operation mode in which a frequency of the second regenerated clock signal is maintained, and the frequency adjusting unit is configured to operate in the third operation mode while the switching unit is selecting the data judgment clock signal.

15. The communication apparatus according to claim 1, wherein the rotating part includes an X-ray tube, an X-ray detector configured to detect X-rays emitted from the X-ray tube, and a data acquisition apparatus configured to acquire a signal of the X-rays detected by the X-ray detector, and the transmission data is the signal of the X-rays acquired by the data acquisition apparatus.

16. The communication apparatus according to claim 1, wherein the rotating part includes an X-ray tube, an X-ray detector configured to detect X-rays emitted from the X-ray tube, and a data acquisition apparatus configured to acquire a signal of the X-rays detected by the X-ray detector, and the transmission data is a control signal transmitted to the rotating part by a console apparatus of an X-ray Computed Tomography (CT) apparatus.

17. The communication apparatus according to claim 1, wherein the ring-shaped transmission path is divided into: a first transmission path configured to transmit the transmission data from a first input end to a first terminal end in a rotating direction of the rotating part; a second transmission path configured to transmit the transmission data from a second input end to the first terminal end in an opposite direction of the rotating direction; a third transmission path configured to transmit the transmission data from the second input end to a second terminal end in the rotating direction of the rotating part; and a fourth transmission path configured to transmit the transmission data from the first input end to the second terminal end in the opposite direction of the rotating direction, and the first coupler is configured to receive the transmission data from one selected from among the first transmission path, the second transmission path, the third transmission path, and the fourth transmission path.

18. An X-ray Computed Tomography (CT) apparatus comprising:

a rotating part that includes an X-ray tube, an X-ray detector configured to detect X-rays emitted from the X-ray tube, and a data acquisition apparatus configured to acquire a signal of the X-rays detected by the X-ray detector;

a fixed part configured to cause the rotating part to rotate;

a ring-shaped transmission path which is disposed in one of the fixed part and the rotating part and includes a plurality of transmission paths each configured to transmit transmission data including a transmission signal and a clock signal;
a first coupler disposed in the other of the fixed part and the rotating part and configured to receive the transmission data from one of the plurality of transmission paths;
a determining unit configured to determine a regenerated clock signal based on the clock signal in accordance with a reception position in which the first coupler receives the transmission data from the one of the transmission paths; and
a generating unit configured to generate reception data on a basis of the transmission signal received by the first coupler and the regenerated clock signal.

19. A communication method employing a communication apparatus provided with a ring-shaped transmission path which is disposed in one of a fixed part and a rotating part and includes a plurality of transmission paths each configured to transmit transmission data including a transmission signal and a clock signal, and provided with a first coupler which is disposed in the other of the fixed part and the rotating part and is configured to receive the transmission data from one of the plurality of transmission paths, the communication method comprising:
   determining a regenerated clock signal based on the clock signal in accordance with a reception position in which the first coupler receives the transmission data from the one of the transmission paths; and
   generating reception data on a basis of the transmission signal received by the first coupler and the regenerated clock signal.

* * * * *